United States Patent
Siercks et al.

(10) Patent No.: US 10,655,962 B2
(45) Date of Patent: May 19, 2020

(54) SURVEYING SYSTEM

(71) Applicant: HEXAGON TECHNOLOGY CENTER GMBH, Heerbrugg (CH)

(72) Inventors: Knut Siercks, Mörschwil (CH); Bernhard Metzler, Dornbirn (AT); Elmar Vincent Van Der Zwan, Altstätten (CH); Thomas Fidler, Dornbirn (AT); Roman Parys, Rebstein (CH); Alexander Velizhev, St. Gallen (CH); Jochen Scheja, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 344 days.

(21) Appl. No.: 15/373,226

(22) Filed: Dec. 8, 2016

(65) Prior Publication Data
US 2017/0091922 A1   Mar. 30, 2017

Related U.S. Application Data

(63) Continuation of application No. 15/308,827, filed as application No. PCT/EP2014/059138 on May 5, 2014, now Pat. No. 10,234,287.

(51) Int. Cl.
*G01C 15/00* (2006.01)
*G06T 7/00* (2017.01)
(Continued)

(52) U.S. Cl.
CPC .......... *G01C 15/006* (2013.01); *G01C 11/02* (2013.01); *G01C 11/04* (2013.01); *G01C 15/002* (2013.01);
(Continued)

(58) Field of Classification Search
CPC .................. G01C 15/006; G06T 7/579
(Continued)

(56) References Cited

U.S. PATENT DOCUMENTS 6,246,468 B1 * 6/2001 Dimsdale ............ G01B 11/002
356/4.02
8,045,762 B2 10/2011 Otani et al.
(Continued)

FOREIGN PATENT DOCUMENTS

AU  2014200772 A1  3/2014
CN  101153796 A    4/2008
(Continued)

OTHER PUBLICATIONS

A. Gruen et al "Photogrammerty & Machine Vision" Mar. 25, 2010.
(Continued)

*Primary Examiner* — Jeffery A Williams
(74) *Attorney, Agent, or Firm* — Maschoff Brennan

(57) ABSTRACT

A system is disclosed that comprises a camera module and a control and evaluation unit. The camera module is designed to be attached to the surveying pole and comprises at least one camera for capturing images. The control and evaluation unit has stored a program with program code so as to control and execute a functionality in which a series of images of the surrounding is captured with the at least one camera; a SLAM-evaluation with a defined algorithm using the series of images is performed, wherein a reference point field is built up and poses for the captured images are determined; and, based on the determined poses, a point cloud comprising 3D-positions of points of the surrounding can be computed by forward intersection using the series of images, particularly by using dense matching algorithm.

20 Claims, 26 Drawing Sheets

(51) Int. Cl.

| | | |
|---|---|---|
| *G01S 19/14* | (2010.01) | |
| *G01S 19/13* | (2010.01) | |
| *H04N 5/225* | (2006.01) | |
| *G06T 7/579* | (2017.01) | |
| *G06T 7/70* | (2017.01) | |
| *H04N 5/232* | (2006.01) | |
| *H04N 5/247* | (2006.01) | |
| *G01C 11/02* | (2006.01) | |
| *G01C 11/04* | (2006.01) | |

(52) U.S. Cl.
CPC .............. *G01S 19/13* (2013.01); *G01S 19/14* (2013.01); *G06T 7/0002* (2013.01); *G06T 7/0004* (2013.01); *G06T 7/579* (2017.01); *G06T 7/70* (2017.01); *G06T 7/97* (2017.01); *H04N 5/2251* (2013.01); *H04N 5/2252* (2013.01); *H04N 5/2254* (2013.01); *H04N 5/2257* (2013.01); *H04N 5/23238* (2013.01); *H04N 5/23293* (2013.01); *H04N 5/23296* (2013.01); *H04N 5/247* (2013.01); *G06T 2207/10028* (2013.01); *G06T 2207/30244* (2013.01)

(58) Field of Classification Search
USPC .......................................................... 348/135
See application file for complete search history.

(56) References Cited

U.S. PATENT DOCUMENTS

| | | | |
|---|---|---|---|
| 8,416,130 | B2 | 4/2013 | Scherzinger |
| 9,056,676 | B1 | 6/2015 | Wang |
| 2006/0012777 | A1* | 1/2006 | Talbot ............... E02F 3/842 356/139.01 |
| 2007/0139262 | A1 | 6/2007 | Scherzinger |
| 2009/0202109 | A1 | 8/2009 | Clar et al. |
| 2011/0064312 | A1 | 3/2011 | Janky et al. |
| 2011/0157359 | A1 | 6/2011 | Sharp |
| 2011/0238303 | A1 | 9/2011 | Scherzinger |
| 2012/0330601 | A1 | 12/2012 | Soubra et al. |
| 2014/0032021 | A1 | 1/2014 | Metzler et al. |
| 2014/0081571 | A1 | 3/2014 | Briggs et al. |
| 2014/0139639 | A1* | 5/2014 | Wagner ............... G06T 17/00 348/46 |
| 2014/0156219 | A1 | 6/2014 | Soubra et al. |
| 2014/0375773 | A1* | 12/2014 | He ..................... H04N 13/296 348/47 |
| 2015/0022640 | A1* | 1/2015 | Metzler ............... H04N 13/211 348/46 |
| 2015/0094089 | A1 | 4/2015 | Moeglein et al. |

FOREIGN PATENT DOCUMENTS

| | | |
|---|---|---|
| CN | 101561270 A | 10/2009 |
| CN | 101946250 A | 1/2011 |
| CN | 102080969 A | 6/2011 |
| CN | 103492967 A | 1/2014 |
| ES | 2 327 999 A1 | 11/2009 |
| WO | 2010/080950 A1 | 7/2010 |
| WO | 2011/163454 A1 | 12/2011 |

OTHER PUBLICATIONS

Andrew J Davison et al.: "MonoSLAM: Real-Time Single Camera SLAM" IEEE Transactions on Pattern Analysis and Machine Intelligence, IEEE Computer Society, USA, vol. 29, No. 6, Jun. 1, 2007.

Maxime Lhuillier "Fusion of GPS and structure-from-motion using constrained bundle adjustments" Computer Vision and Pattern Recognition (CVPR), 2011 IEEE Conference On, IEEE, Jun. 20, 2011.

International Search Report dated Dec. 11, 2015 as received in Application No. PCT/EP2014/059138.

Written Opinion of the International Searching Authority dated May 11, 2016 as received in Application No. PCT/EP2014/059138.

Migliore, D., et al., "Stereo SLAM," Retrieved from the Internet URL: http://home.deib.polimi.it/matteucc/lectures/3DSFVM/StereoOmniSLAM.pdf, pp. 44-89 (Jun. 15, 2009).

Partial European Search Report dated Apr. 19, 2018 as received in Application No. EP17191802.

Extended European Search Report dated May 11, 2018 as received in Application No. 17191803.0.

Cole et al., "Using Laser Range Data for 3D SLAM in Outdoor Environments", 2006 IEEE International Conference on Robotics and Automation (ICRA), Orlando, Florida, May 2006, IEEE, pp. 1556-1563.

Davide, M., "Stereo SLAM," Omni Directional SLAM, Published on Jun. 15, 2009, Retrieved from the Internet: URL: http://home.deib.polimi.it/matteucc/lectures/3DSFVM/StereoOmniSLAM.pdf, retrieved on Aug. 30, 2017, pp. 44-89.

Dissanayake et al., "A Solution to the Simultaneous Localization and Map Building (SLAM) Problem," IEEE Transactions on Robotics and Automation, vol. 17, No. 3, 2001, pp. 229-241.

Microsoft: "Kinect Sensor", published on Apr. 24, 2014, retrieved from the Internet: URL:https://web.archive.org/web/20140424055000/https://msdn.microsoft.com/en-us/library/hh438998.aspx, retrieved on Jun. 15, 2017, pp. 1-6.

Newcombe et al., "KinectFusion: Real-Time Dense Surface Mapping and Tracking," 2011 10th IEEE International Symposium on Mixed and Augmented Reality (ISMAR), IEEE, Oct. 2011, pp. 127-136.

Song et al., "Parallel, Real-Time Monocular Visual Odometry," 2013 IEEE International Conference on Robotics and Automation (ICRA); Karlsruhe, Germany, IEEE, May 6-10, 2013, pp. 4698-4705.

Westoby et al., "Structure-from-Motion photogrammetry: A low-cost, effective tool for geoscience applications," Geomorphology, vol. 179, Dec. 2012, pp. 300-314.

Extended European Search Report dated Jun. 23, 2017 as received in Application No. 16202706.4.

Extended European Search Report dated Sep. 8, 2017 as received in Application No. 16202703.1.

Extended European Search Report dated Sep. 8, 2017 as received in Application No. 16202704.9.

Extended European Search Report dated Sep. 8, 2017 as received in Application No. 16202708.

Extended European Search Report dated Sep. 8, 2017 as received in Application No. 16202709.8.

Extended European Search Report dated Sep. 8, 2017 as received in Application No. 16202710.6.

Forsman, Mona, Point Coud Densification, Master's Thesis in Engineering Physics, UMEA University, Feb. 11, 2011, 71 pages.

Nützi et al., "Fusion of IMU and Vsion for Absolute Scale Esttimation in Monocular SLAM", J Intell Robot System Feb. 1, 2010.

* cited by examiner

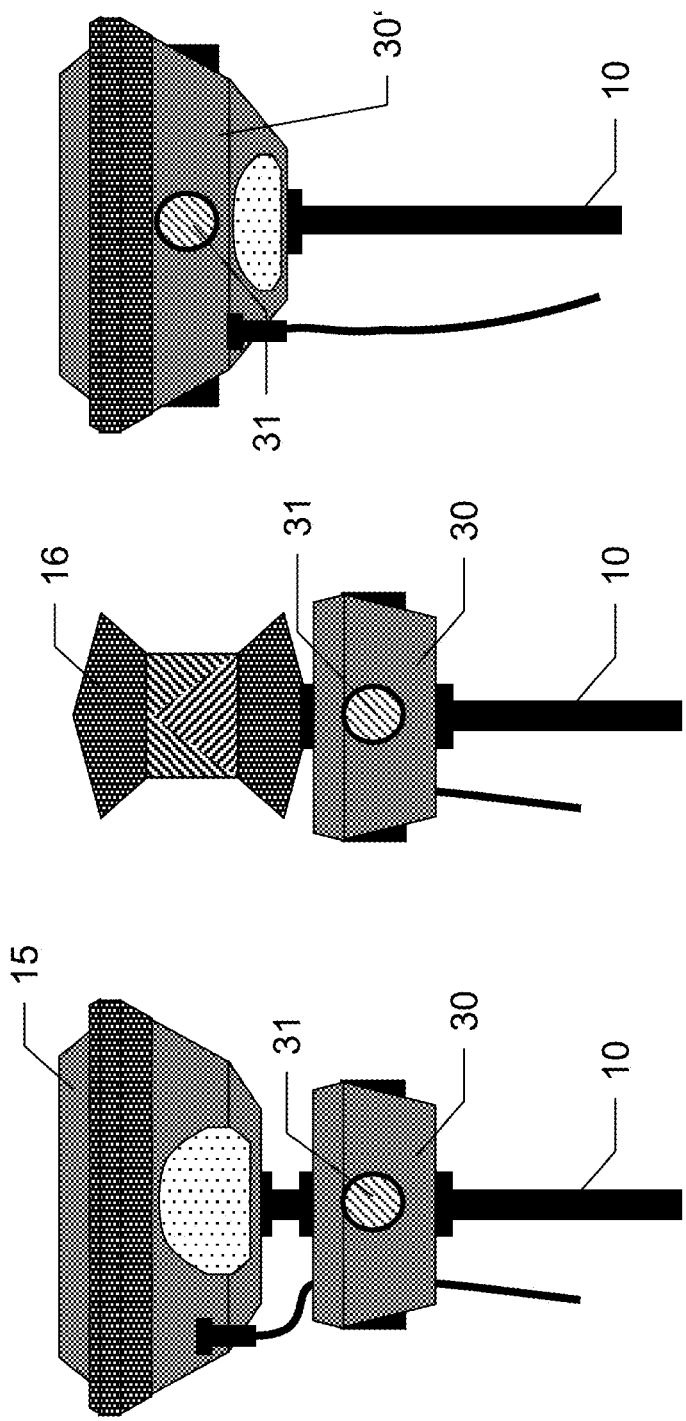

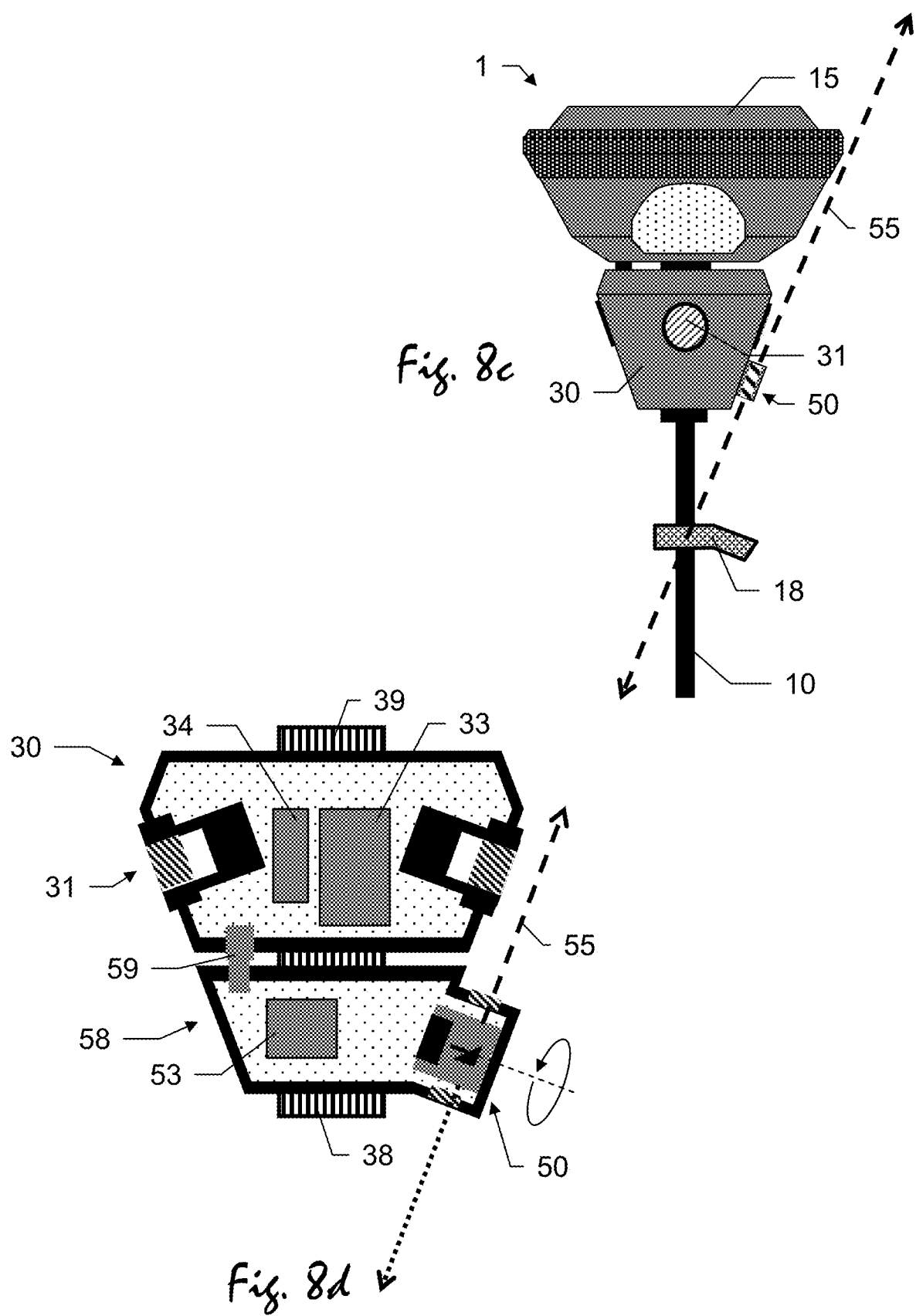

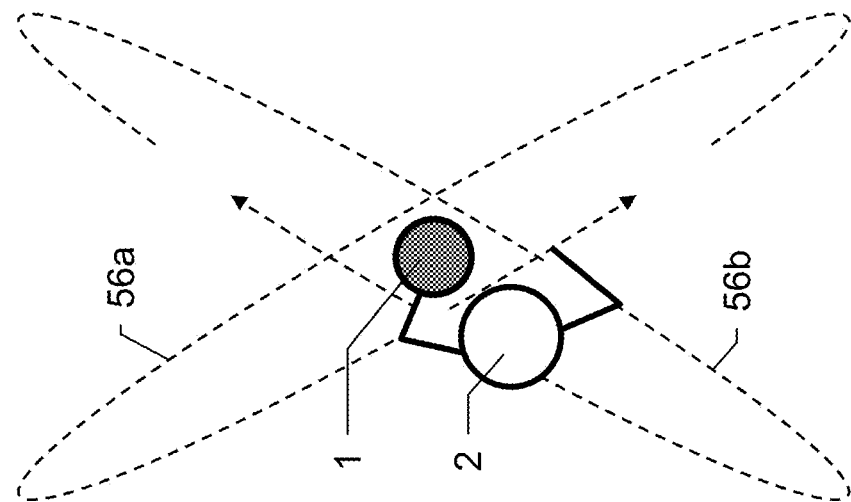
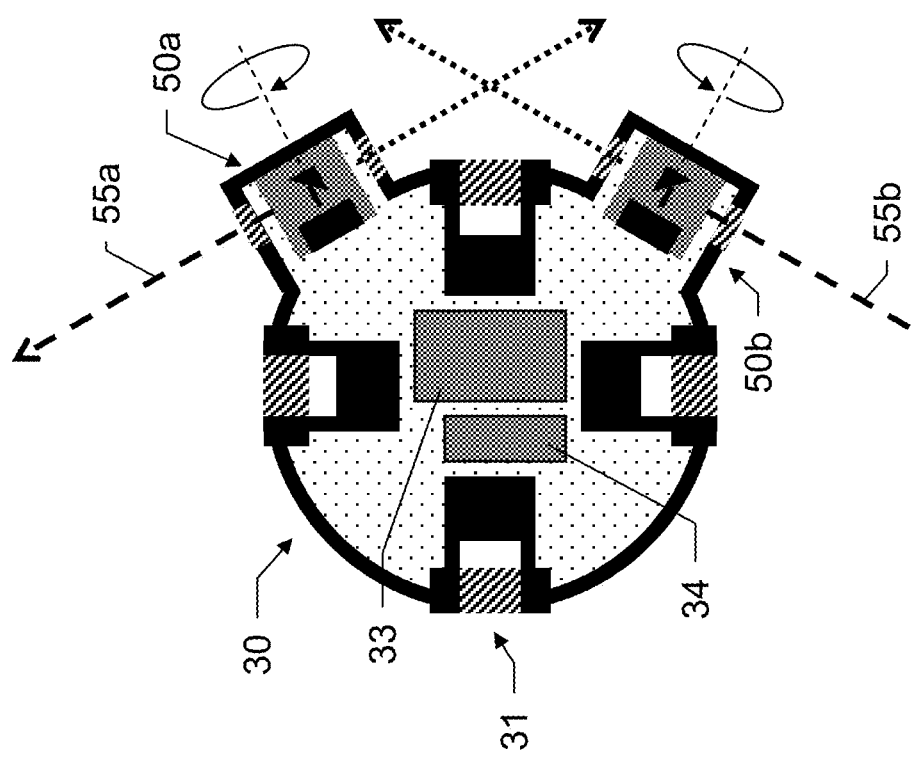

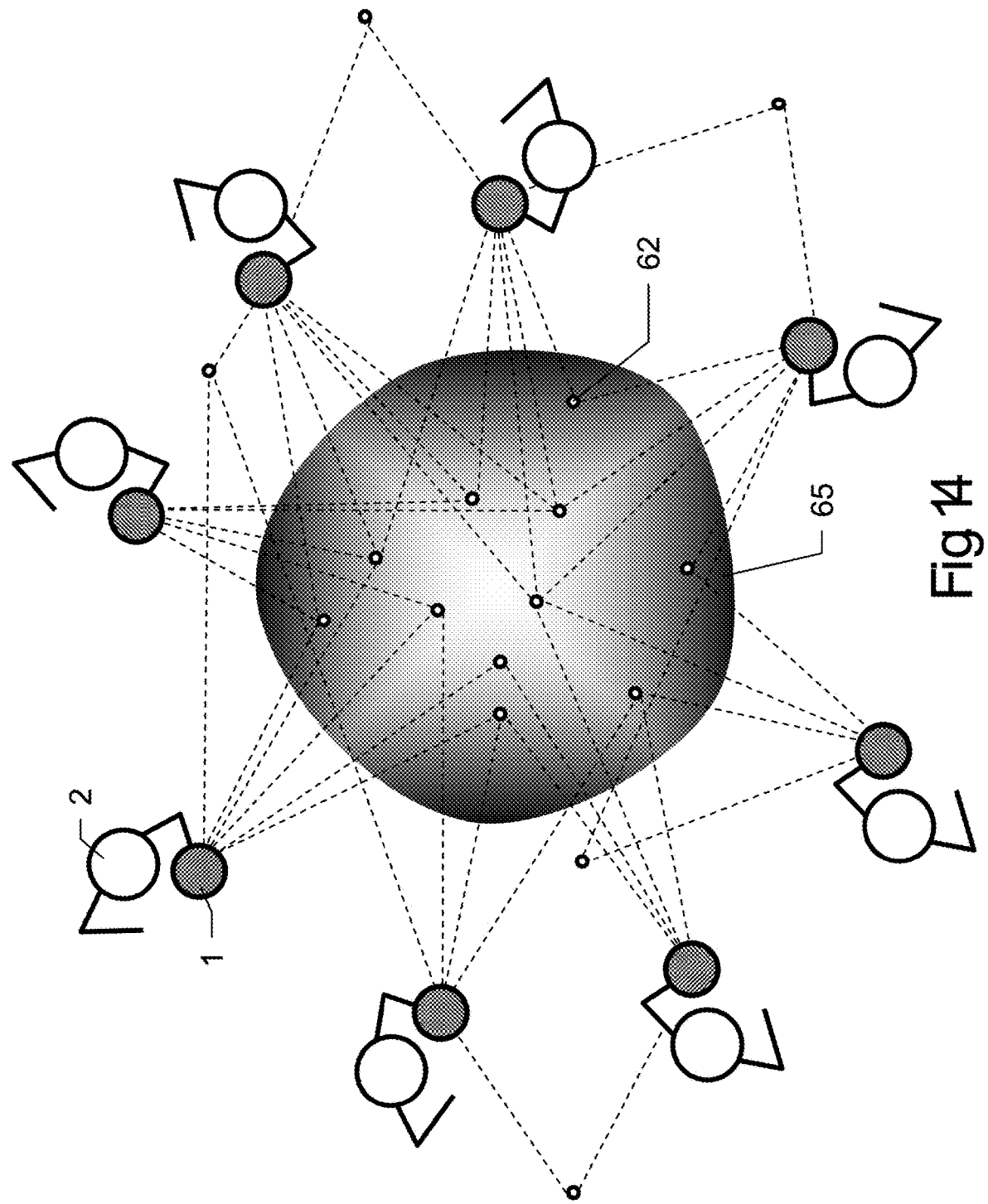

Accuracy estimation field

Accuracy [mm]
50
25
10
5

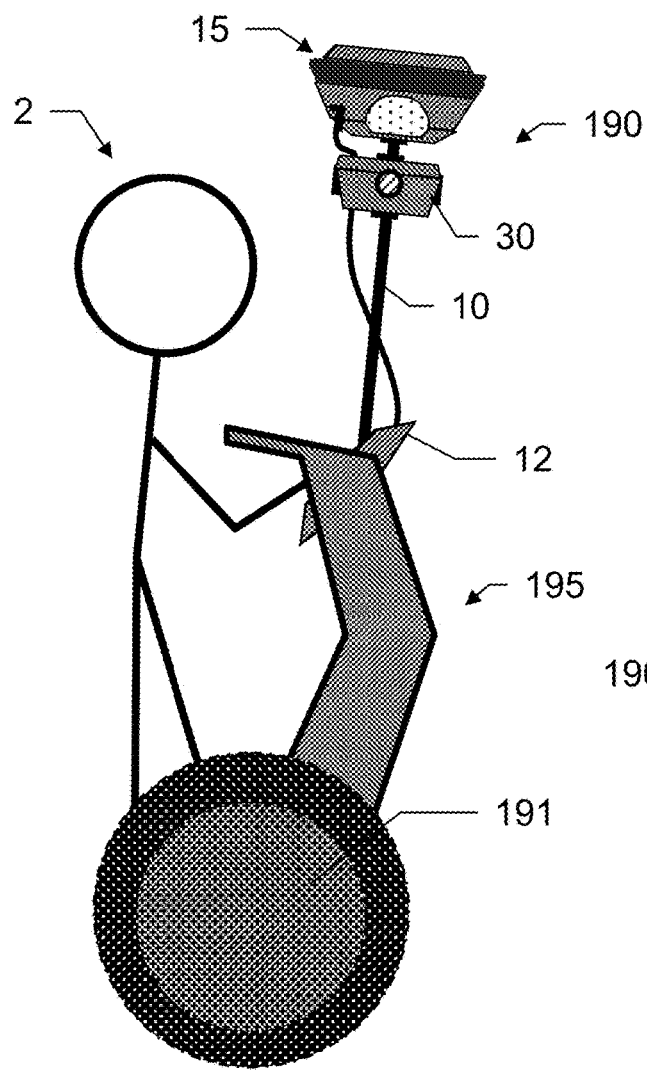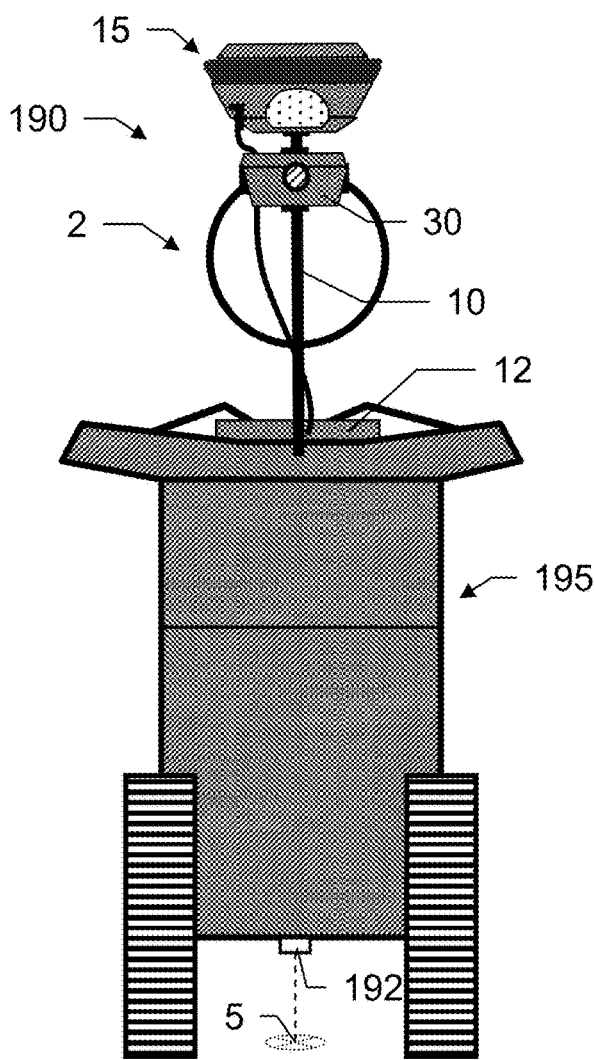
Fig. 19a
Fig. 19b

SURVEYING SYSTEM

CROSS-REFERENCE TO RELATED APPLICATIONS

This application is a continuation of U.S. patent application Ser. No. 15/308,827, which is the U.S. national stage of Internatioal Patent Application No. PCT/EP2014/059138, filed May 5, 2014. The foregoing patent applications are incorporated herein by reference.

FIELD OF INVENTION

The present invention pertains to a surveying system comprising a camera module providing images for performing a SLAM- or SfM-algorithm.

BACKGROUND

The invention describes a camera module which can be attached on a pole to a GNSS-antenna or a reflector for the measurement of points without the levelling step.

Moreover, the camera module enables the measurement of points where the GNSS-signal or the line-of-sight between total station and pole is interrupted.

Moreover, from the imaging data acquired with the camera module a point cloud of the environment can be derived.

Moreover, rectified views or orthophotos can be generated, e.g. of the terrain or a façade.

In traditional surveying with a GNSS-pole the surveyor places the pole tip onto the measuring point, levels the pole and triggers the measurement. The levelling step takes some time and—if not carried out properly—leads to a degraded measurement result.

Surveying with a GNSS-pole is only possible at places, where the signals of a sufficient number of GNSS satellites can be received. When the surveyor moves close to a building, some of the satellite signals may be not receivable anymore. Thus, at such a place a measurement is not possible at all.

A GNSS surveying system can record absolute positions with good accuracy on a global scale, e.g. 2-4 cm. However, such a system can record only single points, where the operator must position the GNSS pole vertically on top of point to be measured. The derivation of a point cloud with a GNSS-pole is not state-of-the-art.

US 2011/0064312 A1 relates to image-based geo-referencing and discloses a combination of GNSS measurements with image processing to provide new solutions for positioning. Stored geo-referenced images are compared (feature-correlated) with actual images made by a GNSS receiver. This is then used to qualify the accuracy of the GNSS measurement or complement missing parts (e.g. height information). It is also possible the other way round, i.e. the GNSS measurement is used to update the geo-reference of the stored images. This can also be used to determine a local coordinate system.

US 2011/0157359 A1 discloses aligning a virtual perspective centre of a camera with the measurement (antenna) centre of a position measurement system. This facilitates computations in a combined image/GNSS system. WO 2011/163454 A1 discloses a method and apparatus for image-based positioning, tracking image features from one image to the next in order to determine the position change of a GNSS receiver using SLAM techniques. WO 2010/080950 A1 discloses determining orientation of a GNSS receiver from image data.

A processing of data recorded by a system with cameras requires high computational resources. The state-of-the-art solution is known as processing of data on a powerful laptop, PC or on an external cloud server. The processing time might be quite time consuming and usually is performed in the office.

However, for some tasks (e.g. preview of 3D image-based reconstruction) powerful in-field computational capacity is needed. Data transfer via wireless networks is usually also time consuming when the bandwidth is limited and does not allow getting quick results of computations.

SUMMARY

The following summary section presents various exemplary embodiments that are consistent with the principles and aspects described herein. Nothing in this summary section is to be construed as limiting the scope of the invention, which is defined by the claims.

The following solution particularly is proposed to have an ability of a fast in-field data processing. One or more external portable computational devices (e.g. smartphone, tablet PC, laptop) are registered as computational devices in the surveying system. The system has a cable or wireless connection with at least one of these computational devices. The data are transferred to these devices and all computations are automatically distributed between all available computational devices. All computational devices could communicate between each other.

Among others, one advantage of such solution is an ability to use all available computational resources for fast in-field data processing or visualization. New devices could be easily added for computation without updating of the surveying device.

One aspect of the invention relates to a surveying system adapted to determine positions of a position measuring resource being mounted on a surveying pole, particularly a GNSS-antenna or a retro-reflector, in a coordinate system of the surveying system, the surveying system comprising a surveying subsystem with a camera module being attached to the surveying pole and comprising at least one camera for capturing images, and a control and evaluation unit having stored a program with program code so as to control and execute an orientation determining functionality in which a series of images of the surrounding is captured with the at least one camera when moving along a path through a surrounding, the series comprising an amount of images captured with different poses of the camera, the poses representing respective positions and orientations of the camera;

a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;

determined positions that are adopted by the position measuring resource when moving along the path are retrieved from the surveying system; and an external orientation of the at least one camera in the coordinate system of the surveying system is derived at least based on the determined pose for at least one designated image of the series of images and on the determined positions.

The surveying system further comprises a processing unit having stored a program with program code so as to control and execute a single point measurement functionality in which—upon a trigger— a trigger-related position, which has been adopted by the position measuring resource at a trigger-related point of time when moving along the path, is determined by the surveying system, with the use of the position measuring resource and particularly also the determined poses and/or IMU-data;

a trigger-related external orientation, which has been adopted by the at least one camera at the trigger-related point of time, is determined by the orientation determining functionality; and a position of a bottom of the pole of the surveying system is determined in coordinates of the coordinate system based on at least the trigger-related position and the trigger-related external orientation.

In one embodiment of this system, the orientation of the at least one camera is derived based on one or more of the determined poses and based on data from an inertial measuring unit of the camera module, and/or based on a multitude of determined positions of the position measuring resource, particular a travelling history for the moved path.

In another embodiment of this system, the orientation is derived in all three rotational degrees of freedom, in particular wherein position and orientation in six degrees of freedom are determined.

In another embodiment of this system, an orientation of the surveying pole is derived based on the poses.

In a further embodiment of this system, the single point measurement functionality involves that a trigger-related section-wise bundle-adjustment is performed for the determination of the trigger-related external orientation, wherein—using only a subset of most recent images of the series of images, the subset particularly consisting of between the most actual 50 and the most actual 5 images—the reference point field and the poses within the range of the subset are retroactively re-calculated for the images of the subset and wherein these re-calculated poses are used for deriving the external orientation.

The invention also relates to a surveying subsystem providing positional information of a surrounding in form of a scaled point cloud. The invention thus relates to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector.

The camera module is designed to be attached to the surveying pole and comprises at least one camera for capturing images. The control and evaluation unit has stored a program with program code so as to control and execute a spatial representation generation functionality in which—when moving along a path through a surrounding— a series of images of the surrounding is captured with the at least one camera, the series comprising an amount of images captured with different poses of the camera, the poses representing respective positions and orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, based on the determined poses, a point cloud comprising 3D-positions of points of the surrounding is computed by forward intersection using the images of the series of images, determined positions of the position measuring resource for points that have been adopted on the path are received by the control and evaluation unit from the surveying system, and the point cloud is scaled, and particularly geo-referenced, with help of the received determined positions.

According to one specific embodiment of that invention, the control and evaluation unit is configured so that the spatial representation generation functionality is controlled and executed in such a way, that the point cloud is generated spatially inclusive and comprehensive across the whole surrounding and/or with comparatively low resolution of the 3d-information across the surrounding, thus providing comparatively fast processing of the point cloud.

According to another specific embodiment of that invention, the control and evaluation unit is configured so that the spatial representation generation functionality is controlled and executed in such a way, that a graphical reproduction is generated for the scaled point cloud, the graphical reproduction being displayable by display means of the surveying system, thus providing for a direct feedback to a user about already acquired data, so that the already acquired data can be checked regarding its completeness.

According to yet another specific embodiment of the subsystem, the control and evaluation unit is configured so that the spatial representation generation functionality is controlled and executed in such a way, that position information is derived for a single point selected in at least one image of the series of images, wherein a subset of images with determined poses related to the selected point is automatically identified from the series of images, particularly all images in which the selected point appears, and the position information is calculated based on the subset, particularly after the point was manually selected by a user.

According to a further specific embodiment of the subsystem, the control and evaluation unit is configured so that the spatial representation generation functionality is controlled and executed in such a way, that the point cloud is processed covering the surrounding as a whole as commonly appearing at least in pairs of images of series of images, thus providing for a global representation with comparatively low point-to-point resolution, and/or a defined region of the surrounding as commonly appearing at least in pairs of images of series of images, thus providing for a regional representation with higher point-to-point resolution compared to the global representation, particularly wherein the point-to-point resolution of the point cloud is automatically adapted depending on the size of the region so that processing time fulfils a defined threshold.

Now referring to the issue of creating orthophotos, a corresponding arrangement according to that invention is described as set forth below.

The invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector, the camera module being designed to be attached to the surveying pole and comprising at least one camera for capturing images, the control and evaluation unit having stored a program with program code so as to control and execute a georeferencing functionality in which—when moving along a path through a surrounding—
- a series of images of the surrounding is captured with the at least one camera, a surrounding ground appearing in the images, the series comprising an amount of images captured with different poses of the camera, the poses representing respective positions and orientations of the camera;
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;
- based on the determined poses, a point cloud comprising 3D-positions of points of the surrounding is computed by forward intersection using the series of images, particularly by using dense matching algorithm; and
- an orthorectified orthophoto of the surrounding ground is generated based on the series of images.

In one embodiment of this subsystem, the georeferencing functionality comprises matching the orthophoto with a reference orthophoto for deriving position information of the surveying subsystem, in particular wherein the reference orthophoto
- is stored in the control and evaluation unit, and/or
- is an aerial image or a part thereof, in particular wherein the aerial image is orthorectified.

In another embodiment of this subsystem, the orthorectified orthophoto is generated by means of image stitching of at least two images of the series of images.

According to another aspect regarding specific optics of a camera of a camera module, the invention also relates to a camera module to be used as part of a surveying system that is adapted to determine positions of a position measuring resource being mounted on a surveying pole, particularly wherein the position measuring resource comprises a GNSS-antenna or a retro-reflector. The camera module is designed to be attached to the surveying pole and comprises two cameras arranged relative to each other with substantially diametrically opposing viewing directions, each of the two cameras having a fisheye lens and being adapted to capture wide panoramic images.

The invention also relates to a surveying subsystem comprising a camera module and a control and evaluation unit. The camera module comprises at least one camera, the camera having a fisheye lens and being adapted to capture wide panoramic images. The control and evaluation unit has stored a program with program code so as to control and execute a spatial representation generation functionality in which—when moving along a path through a surrounding—a series of panoramic images of the surrounding is captured with the at least one camera, the series comprising an amount of panoramic images captured with different poses of the camera, the poses representing respective positions and orientations of the camera, a SLAM-evaluation with a defined algorithm using the series of panoramic images is performed, wherein a plurality of respectively corresponding image points are identified in each of several sub-groups of panoramic images of the series of panoramic images and, based on resection and forward intersection using the plurality of respectively corresponding image points, a reference point field is built up comprising a plurality of reference points of the surrounding, wherein coordinates of the reference points are derived, and the poses for the panoramic images are determined.

By use of a fisheye optical system in connection with the camera module a comparatively wide field of view is realised providing images which cover a correspondingly large region of a surrounding. For covering a defined part of the surrounding, fewer images have to be taken.

According to a specific embodiment of this invention, the cameras module comprises two cameras arranged relative to each other with substantially diametrically opposing viewing directions each of the two cameras having a fisheye lens and being adapted to capture wide panoramic images.

According to another specific embodiment of that surveying subsystem, the control and evaluation unit is configured so that the spatial representation generation functionality is controlled and executed in such a way, that the poses for the panoramic images are determined by applying a defined optical imaging method taking account of the optical properties of the fisheye lens, in particular wherein different imaging planes are used with the optical imaging method and/or one of the following mapping functions is used:
- stereographic mapping function,
- equidistant mapping function,
- equisolid angle mapping function or
- orthographic mapping function.

Calculation of the poses and/or a point cloud using images captured with such fisheye optics are performed using one of above methods in order to provide an exact projection of the reference points and thus to provide correct position and/or orientation information for the surrounding. With projecting the surrounding like that a distortion-free image of the surrounding can be provided.

According to another specific embodiment of the subsystem, each of the two cameras has a field of view of at least 180° in the respective viewing directions regarding at least one axis, particularly in an azimuthal direction.

Using the two cameras with fisheye lenses with at least 180° concerning their fields of view, fully panoramic images with 360° viewing field can be captured and thus providing for a more complete and/or more detailed gathering of data. Accordingly, more information regarding the surrounding can be gathered, i.e. particularly, lager point clouds.

With such combination of fisheye optics with a kind of SLAM-algorithm as described (i.e. capturing a series of images, identifying image point which correspond to reference points in the surrounding and determining the poses for the images) a very efficient way of deriving a large amount of position (e.g. for single points in the surrounding) and/or orientation information (e.g. of the panoramic camera or a pole which the camera is attached to) is given. A wide region of the surrounding can be captured with the camera(s) and terrain information corresponding to the captured region can be derived based on respective panoramic images.

Another aspect of the invention focuses on a specific camera module to be used as part of a surveying system that is adapted to determine positions of a position measuring resource being mounted on a surveying pole, particularly wherein the position measuring resource comprises a GNSS-antenna or a retro-reflector, wherein the camera module is designed to be attached to the surveying pole and comprises a camera and an optical element, the optical element being designed so that the camera has—in an azimuthal direction—an angle of view of 360°, particularly wherein the optical element comprises a mirroring surface in form of a cone, a sphere or a curvature.

The optical element preferably may be embodied as a parabolic mirror.

According to an embodiment of that camera module, the camera and the optical element are arranged and designed so that a surrounding to be captured is projected onto a sensor of the camera so that an image of the surrounding is providable with identically sized pieces of the image basically covering identically sized parts of the surrounding, thus providing for an image representing the captured surrounding in homogenous reproduction.

With projecting the surrounding in above manner onto the sensor a distortion-free image of the surrounding is provided and thus, faster processing of captures images—particularly with view to SLAM processing or processing of point cloud—is enabled.

Alternatively, according to another aspect of this invention, a polarization filter particularly for reducing reflections from windows or filtering sun-light can be mounted with the camera, e.g. in front of the lens of the camera.

The arrangement of such optical element (e.g. parabolic mirror) in combination with a camera as described provides for benefits to also be comparable with these regarding a combination of fisheye optics with a camera or at least two cameras. Additionally, a 360° panoramic view and capturing of corresponding images is realised with a single camera only, thus also providing for the use of only one camera.

Now referring to the issue of triggering the cameras arranged in a camera module in order to provide synchronously captured images, corresponding arrangements according to that invention are described as set forth below.

The invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector. The camera module is designed to be attached to the surveying pole and comprising at least two cameras for capturing images. The control and evaluation unit has stored a program with program code so as to control and execute a panoramic image generation functionality in which—in response to a starting command—
a series of images of the surrounding is captured with the at least two cameras, the series comprising an amount of images captured with different poses of the cameras, the poses representing respective positions and orientations of the cameras; and
a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;
wherein a central optical trigger signal is generated that is perceivable by at least a first and a second camera and that causes the first and second camera to synchronously capture an image.

In one embodiment of this subsystem, the panoramic image generation functionality comprises generating a combined stitched image from the synchronously captured images of the first and second camera.

In one embodiment of this subsystem, the position measuring resource comprises a GNSS-antenna, and the control and evaluation unit is configured so that—when moving along a path through the surrounding—the panoramic image generation functionality is controlled and executed in such a way, that
GNSS-data based on GNSS-signals received through the GNSS-antenna is received by the control and evaluation unit from the surveying system, and that
the central optical trigger signal is generated based on the received GNSS-data.

In another embodiment of this subsystem, the control and evaluation unit is configured so that—when moving along a path through the surrounding—the panoramic image generation functionality is controlled and executed in such a way, that the starting command is released based on
a defined positional grid regarding a density of panoramic images to be generated and
a travelling history for the moved path, the travelling history being derived from the received determined positions.

In a further embodiment the subsystem comprises at least one optical triggering means that is perceivable by each of the at least two cameras, wherein the central optical trigger is a perceivable optical signal of the at least one optical triggering means, in particular wherein the optical triggering means comprises a flash light.

In a another embodiment the subsystem comprises at least one optical triggering means that is perceivable by the first and second camera, wherein the central optical trigger is a perceivable optical signal of the at least one optical triggering means, in particular wherein the optical triggering means comprises a light emitting diode.

The invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector. The camera module is designed to be attached to the surveying pole and comprises at least one camera for capturing images. The control and evaluation unit has stored a program with program code so as to control and execute an image triggering functionality in which—when moving along a path through a surrounding—
a series of images of the surrounding is captured with the at least one camera, the series comprising an amount of images captured with different poses of the camera, the poses representing respective positions and orientations of the camera; and
a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;
wherein the surveying subsystem comprises means for determining at least one pre-defined external trigger signal, and the image triggering functionality comprises determining an external trigger signal, wherein based on the determined external trigger signal the at least one camera captures an image.

In one embodiment of this subsystem, the camera module comprises at least two cameras; the external trigger signal causes each of the at least two cameras to synchronously capture an image; and a combined stitched image is generated from the synchronously captured images of the at least two cameras.

In another embodiment, the subsystem comprises means for storing at least one pre-defined external trigger signal, wherein the at least one pre-defined external trigger signal comprises
- at least one pre-defined gesture of the user being determinable by the at least one camera;
- at least one acoustic signal; and/or
- a contacting of the surveying pole, particularly a bottom end of the surveying pole, with the ground.

The invention also relates to a blurring functionality of a surveying system. On the image data, algorithms for face detection and detection of license plates on cars can be applied. In order to protect the privacy of people, the detected faces or license plates can then be made unrecognizable, e.g. by blurring the corresponding areas in the images and also in the point cloud.

For image data recorded with a frame rate of about 10 FPS and more feature tracking algorithms can be applied, e.g. Kanade-Lucas-Tomasi (KLT). Alternatively, particularly for still images the detection of corresponding features algorithms such as SIFT, SURF, BRISK, BRIEF, etc. can be applied.

A surveying subsystem according to this aspect of the invention comprises a camera module and a control and evaluation unit to be used as part of a surveying system that is adapted to determine positions of a position measuring resource being mounted on a surveying pole, particularly of a GNSS-antenna or of a retro-reflector. The camera module is designed to be attached to the surveying pole and comprises at least one camera for capturing images. The control and evaluation unit has stored a program with program code so as to control and execute a data reduction functionality in which—when moving along a path through a surrounding—
- a series of images of the surrounding is captured with the at least one camera, the series comprising an amount of images captured with different poses of the camera, the poses representing respective positions and orientations of the camera;
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;
- based on the determined poses, a point cloud comprising 3D-positions of points of the surrounding is computed by forward intersection using the series of images, particularly by using dense matching algorithm;

objects of a pre-defined and/or user-defined kind are identified in the images; and
3D-positions of points being connected to the identified objects in the image are modified or deleted.

In one embodiment of this subsystem, the 3D-positions are modified or deleted in such a way that individual characteristics of the identified objects are not identifiable in the computed point cloud.

In another embodiment of this subsystem, image data being connected to the identified objects in the image are modified or deleted, particularly in such a way that individual characteristics of the identified objects are not identifiable in the image.

In a further embodiment of this subsystem, pre-defined kinds of objects comprise at least
- a user operating the surveying system;
- parts of the surveying system;
- human faces; and/or
- vehicle license plates.

Another aspect of the invention focuses on privacy or secrecy protection when performing surveying tasks. In certain areas, taking pictures or videos is subject to approval of the owners or authorities or completely prohibited. Such areas are e.g. military facilities. According to this aspect of the invention, in order to avoid legal conflicts in the course of a surveying task, all images taken for the computing of a point cloud, are deleted directly after they have been used accordingly and are not needed any longer for computing the point cloud. Only a small number of images have to be stored at the same time for computing the point cloud.

Therefore, the invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector. The camera module is designed to be attached to the surveying pole and comprises at least one camera for capturing images. The control and evaluation unit has stored a program with program code so as to control and execute a localization and/or mapping functionality in which—when moving along a path through a surrounding—
- a series of images of the surrounding is captured with the at least one camera, a surrounding ground appearing in the images, the series comprising an amount of images captured with different poses of the camera, the poses representing respective positions and orientations of the camera;
- the images are stored in a memory of the control and evaluation unit, particularly in a volatile memory;
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;
- based on the determined poses, a point cloud comprising 3D-positions of points of the surrounding is computed by forward intersection using the series of images, particularly by using dense matching algorithm; and
- each of the images is deleted after having been used for computing the point cloud.

In one embodiment of this subsystem, the images are deleted without delay after having been used for computing the point cloud, in particular wherein the images are deleted in such a way that no video stream can be created from the deleted images.

In another embodiment of this subsystem, the images are stored and deleted in such a way that not more than ten images are stored in the memory at the same time, in particular not more than five images.

Now referring to an inventive aspect of fading out objects from gathered images in order to improve processing, according to that invention, a surveying subsystem comprises a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The control and evaluation unit has stored a program with program code so as to control and execute a spatial representation generation functionality in which—when moving along a path through a surrounding— a series of images of the surrounding is captured with the at least one camera, the series comprising an amount of images captured with different poses of the camera, the poses representing respective positions and orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, wherein in the series of images an interfering object is recognised by image processing, feature recognition techniques and/or comparison of the images, and the recognised interfering object is faded out in concerned images regarding identifying the set of image points and/or determining the poses for the images, so that evaluation is less effortful and interference suppressed.

According to an embodiment of that surveying subsystem, the control and evaluation unit is configured so that the spatial representation generation functionality is controlled and executed in such a way, that a moving object is recognised as the interfering object on basis of a motion detection algorithm, particularly by feature tracking.

According to another specific embodiment of the subsystem, a person, particularly the user carrying the pole, or a car is recognised as the interfering object.

According to a further embodiment of that invention, the control and evaluation unit is configured so that the spatial representation generation functionality is controlled and executed in such a way that applying the steps of recognising the interfering object and fading out the interfering object is triggered by a user command.

In particular, the user coarsely marks an object to be recognised as interfering object in at least one of the series of images, wherefore the at least one image is displayed on displays means.

The detection and fading out of interfering objects provides for a faster data processing as less amount of image data has to be considered for determining poses. Furthermore, the calculated poses comprise a higher degree of precision as incorrect imaging—which would occur e.g. if considering a moving car in more images which were taken at different points in time—initially is suppressed.

Additionally, above method generally provides for better (particularly more precise and faster) matching and identification of reference points (image points in the images). The method may be executed automatically controlled by the control and evaluation unit or may be triggered by user, e.g. when the user marks a respective object in an image displayed on display means of the surveying system.

Another aspect focuses on calibration of cameras (a camera module respectively). According to that invention, a surveying subsystem comprises a camera module and a control and evaluation unit to be used as part of a surveying system that is adapted to determine positions of a position measuring resource being mounted on a surveying pole, particularly wherein the position measuring resource comprises a GNSS-antenna or a retro-reflector. The camera module is designed to be attached to the surveying pole and comprises at least one camera for capturing images. The position measuring resource comprises a reference pattern located at the housing of the measuring resource. The position measuring resource and the camera module are arranged in defined manner relative to each other so that the reference pattern appears in the field of view of the at least one camera.

Furthermore, the control and evaluation unit has stored a program with program code so as to execute a camera calibration functionality in which an image covering the reference pattern is captured by the at least one camera, and calibration parameters regarding a fixed spatial relationship between the position measuring resource and the at least one camera are determined on basis of the captured image and a pre-known reference image, the reference image representing a defined position and orientation of the at least one camera relative to the position measuring resource by a defined appearance of the reference pattern in the reference image.

According to a specific embodiment of that surveying subsystem, the reference pattern is embodied as a structured pattern being provided by a light source or as a permanent pattern.

Based on the determined calibration data, a verification of a desired position of the camera or the camera module, respectively, relative to the position measuring resource is enabled. If the reference pattern appears in a captured image according to a target appearance, the camera is positioned in an expected home position. In case the appearance of the pattern differs from an expected appearance the camera module is position and/or oriented different to a home position. A deviation of the position of the camera can be derived by comparing the reference image with the actually captured image, particularly by comparing the appearances of the patterns.

The invention also relates to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The position measuring resource and the camera module are arranged in defined manner relative to each other. Furthermore, the control and evaluation unit has stored a program with program code so as to control and execute a calibration functionality in which—when moving along a path through a surrounding—
- a series of images of the surrounding is captured with the at least one camera, the series comprising an amount of images captured with different poses of the camera, the poses representing respective positions and orientations of the camera,
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined,
- determined positions of the position measuring resource for points that have been adopted on the path are received by the control and evaluation unit from the surveying system, and
- calibration parameters regarding a fixed spatial relationship between the position measuring resource and the at least one camera are derived based on an interrelated assessment of the received determined positions and the determined poses.

According to that subsystem, determined positions of the position measuring resource for points that have been adopted on the path are received by the control and evaluation unit from the surveying system, and calibration parameters regarding a fixed spatial relationship between the position measuring resource and the at least one camera are derived based on an interrelated assessment of the received determined positions and the determined poses.

According to an embodiment of the invention, the control and evaluation unit is configured so that the calibration functionality is controlled and executed in such a way, that trajectories according to the path are derived based on the derived poses and on the received determined positions, wherein the calibration parameters are derived based on comparing the trajectories.

According to another specific embodiment of the invention, the control and evaluation unit is configured so that the calibration functionality is controlled and executed in such a way that the calibration parameters are derived by additionally using data generated by an inertial measuring unit, the inertial measuring unit being associated with the surveying subsystem or the position measuring resource.

According to yet another specific embodiment of the invention, the received positions of the position measuring resource are determined by receiving GNSS-signals on side of the position measuring resource or by reflecting a measuring laser beam on side of the position measuring resource, the measuring laser beam being emitted and received by a total station or a theodolite.

Using information regarding both the position information received from the surveying system and the poses determined based on the captured images relative positions and orientation of the camera (camera module) and the position measuring resource can be derived and a relative spatial orientation of the two components can be calculated therefrom. The poses represent respective orientations of the camera. That method provides for a continuous and automatic position-calibration while moving the camera (and the position measuring resource accordingly). With help of data provided by the inertial measuring unit such calibration is enable with six degrees of freedom (6-DOF).

The invention also relates to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. An inertial measuring unit is associated with the surveying subsystem or the position measuring resource in a fixed spatial relationship relative to the surveying subsystem.

The control and evaluation unit has stored a program with program code so as to control and execute a calibration functionality in which—when moving along a path through a surrounding—
- inertial measuring data is gathered while moving along the path,
- camera-based localisation data is generated, wherefore a series of images of the surrounding is captured with the at least one camera, the series comprising an amount of images captured with different poses of the camera, the poses representing respective positions and orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, and
- calibration parameters for the inertial measuring unit are derived based on the gathered inertial measuring data and the camera-based localisation data, particularly wherein a Kalman filter is used.

According to an embodiment of the invention, the control and evaluation unit is configured so that the calibration functionality is controlled and executed in such a way, that the inertial measuring unit is calibrated using the derived calibration parameters, wherein a systematic error of the inertial measuring unit is compensated, particularly wherein a bias of the inertial measuring unit is compensated.

By applying the derived calibration parameters a calibration of the IMU (inertial measuring unit) is provided just (only) on basis of the orientation data derived from the poses of the images, i.e. derived from a series of images captured while moving the camera. Camera and IMU are arranged in defined relative spatial positions while moving.

The invention also relates to a surveying subsystem comprising a camera module and a control and evaluation unit to be used as part of a surveying system that is adapted to determine positions with use of a surveying pole, The camera module is designed to be attached to the surveying pole in a known distance to a bottom end of the pole and comprises at least one camera for capturing images. The control and evaluation unit has stored a program with program code so as to control and execute a scaling functionality in which—when moving along a path through a surrounding—
- a series of images of the surrounding is captured with the at least one camera, a surrounding ground appearing in the images, the series comprising an amount of images captured with different poses of the camera, the poses representing respective positions and orientations of the camera;

a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined;

based on the determined poses, a point cloud comprising 3D-positions of points of the surrounding is computed by forward intersection using the series of images, particularly by using dense matching algorithm;

a distance from the camera to the ground is determined based on the known distance from the camera to the bottom end; and the point cloud is scaled based on the determined distance.

In one embodiment of this subsystem, scaling the point cloud comprises determining 3D-positions of points on the ground based on the determined distance.

In another embodiment of this subsystem, determining the distance from the camera to the ground comprises deriving an orientation of the camera, in particular from the poses.

Furthermore, another aspect concerning the invention relates to a bundle-adjustment for a surveying subsystem, the surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector.

The camera module is designed to be attached to the surveying pole and comprises at least one camera for capturing images. The control and evaluation unit has stored a program with program code so as to control and execute a spatial representation generation functionality in which—when moving along a path through a surrounding—at least a series of images of the surrounding is captured with the at least one camera, the series comprising an amount of images captured with different poses of the camera, the poses representing respective positions and orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, determined positions of the position measuring resource for points that have been adopted on the path are received by the control and evaluation unit from the surveying system, and, upon receiving a measurement-trigger, a section-wise bundle-adjustment is performed, in which—using only a subset of the series of images with a reduced number of images being related to the measurement-trigger—the reference point field and the poses are retroactively re-calculated for the images of the subset.

According to the invention, based on the determined poses, a point cloud comprising 3D-positions of points of the surrounding is computed by forward intersection using the images of the series of images, determined positions of the position measuring resource for points that have been adopted on the path are received by the control and evaluation unit from the surveying system, and on selection of a single point or a region in at least one of the images of the series of images, bundle-adjustment for refining the point cloud is performed based at least on image data of a pre-defined area around the point or of the region respectively and on information relating to the received determined positions.

Particularly, as a final or intermediate step, the overall solution (at least poses and point cloud) is refined using bundle-adjustment. This part of the algorithm is a non-linear least squares minimization of the re-projection error. It will optimise the location and orientation of respective camera positions and 3D-points.

In context of above bundle-adjustment, a part of gathered measuring data (e.g. images, image points, poses and/or 3D-positions) is used for providing a refined (partial) point cloud referring to a part of the surrounding covered by the captured images. In particular, such measuring data provided by a Kalman-Filter is used. Particularly, measuring data according to a close measuring history is used, e.g. data corresponding to the preceding and/or successive ten poses (with respect to that image which the point or region of interest for bundle-adjustment is selected in).

According to one embodiment of the subsystem, positional information is derivable from the measurement-trigger, and the subset is selected based on the positional information.

According to another embodiment of the subsystem, the measurement-trigger is a trigger receivable from surveying system.

According to yet another embodiment of the subsystem, the measurement-trigger is automatically caused by putting the pole on a measuring point and/or keeping the pole basically in fixed position and orientation for a pre-determined time period.

In a further embodiment of the subsystem, the section-wise bundle-adjustment is performed by using non-linear least squares minimisation of errors occurring with identifying the image points and determining the poses.

In one embodiment of the subsystem, localization information related to the measurement-trigger is derived based on re-calculated poses, in particular wherein a position and orientation of the hand-carried surveying pole for one or more measurement-trigger-related points of time are derived.

In another embodiment of the subsystem, the point cloud is scaled with help of the received determined positions, and/or coordinates of a position of a tip of the surveying pole is derived and output in reaction upon the measurement-trigger after performance of the section-wise bundle-adjustment.

Performing the bundle-adjustment provides very precise determination of a position of the selected point or, respectively, precise determination of an amount of points in a defined region and thus providing for an exact digital 3D-model of the defined region.

By bundle-adjusting a refinement of the calculated poses regarding images which are taken into account for execution of the bundle-adjustment is realised. Such refinement leads to more precise determination of 3D-positions again.

Furthermore, an orientation of the pole—if calculated from the poses—may be determined in more precise manner. Particularly, such orientation is derived with six degrees of freedom (6-DOF) due to the computed poses.

The bundle-adjustment particularly is performed when a user of the system selects the point or the region, wherein the adjusted data is provided to the user in real-time manner, i.e. the user selects the point and basically immediately receives the calculation results e.g. on display means of the system.

A further inventive aspect relates to a specific camera module to be used as part of a surveying system that is adapted to determine positions of a position measuring resource being mounted on a surveying pole, particularly wherein the position measuring resource comprises a GNSS-antenna or a retro-reflector. That camera module is designed to be attached to the surveying pole and comprises at least a first and a second camera, the first camera comprising first imaging properties and the second camera comprising second imaging properties different from the first imaging properties.

According to an embodiment of the invention, the first camera is designed so that images with an image resolutions lower than an image resolution of images capturable with the second camera are captured.

According to a further embodiment of the invention, the first camera comprises a first imaging sensor and the second camera comprises a second imaging sensor, wherein the first imaging sensor provides a lower point-to-point resolution regarding images to be captured compared with the second imaging sensor.

According to a further embodiment of the invention, the first camera is designed for capturing images with a higher frame rate compared to the second camera.

According to a further embodiment of the invention, the first camera is designed so that image capturing according to a first spectral range is provided, and the second camera is designed so that image capturing according to a second spectral range is provided, wherein the first spectral range differs from the second spectral range, in particular wherein the first camera provides image capturing according to an infrared spectral range or provides thermographical images.

Capturing images with different spectral ranges provides for getting more detailed information of the covered surrounding, particularly for generation of images (e.g. by merging images of different spectral ranges covering common areas of the surrounding) with improved textures or extended information regarding spectral properties, e.g. regarding a thermal property of an object.

The invention also related to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector.

The camera module is designed to be attached to the surveying pole and comprises at least two cameras for capturing images, wherein a first of the at least two cameras is designed to capture first images with a lower image resolutions compared to second images capturable with a second of the at least two cameras.

The control and evaluation unit has stored a program with program code so as to control and execute a spatial representation generation functionality in which—when moving along a path through a surrounding—
  a first series of images of the surrounding is captured with the first camera, the first series comprising an amount of images captured with different poses of the first camera, the poses representing respective positions and orientations of the first camera, and a second series of images of the surrounding is captured in parallel with the second camera, and
  a SLAM-evaluation with a defined algorithm using only the first series of images is performed, wherein a plurality of respectively corresponding image points are identified in each of several sub-groups of images of the first series of images and, based on resection and forward intersection using the plurality of respectively corresponding image points, a reference point field is built up comprising a plurality of reference points of the surrounding, wherein coordinates of the reference points are derived, and the poses for the images are determined,
thus providing for a faster data processing within the SLAM-evaluation compared to processing data generated by capturing images with the second camera.

According to an embodiment of the invention, the control and evaluation unit is configured so that the spatial representation generation functionality is controlled and executed in such a way that based on the determined poses a point cloud comprising 3D-positions of points of the surrounding is computed as the spatial representation by forward intersection using images of the second series of images.

According to another embodiment of the invention, processing of the point cloud is triggered by a user command.

According to another embodiment of the invention, the control and evaluation unit is configured so that the spatial representation generation functionality is controlled and executed in such a way, that processing of the point cloud is performed using a defined subset of images of the second series of images, wherein the subset is selectable by a user, thus providing for generating detailed 3D-inforamtion for a desired part of the surrounding in comparatively short time.

According to another embodiment of the invention, the control and evaluation unit is configured so that the spatial representation generation functionality is controlled and executed in such a way, that a dense matching algorithm is executed for providing the point cloud using images of the second series of images.

According to another embodiment of the invention, the control and evaluation unit is configured so that the spatial representation generation functionality is controlled and executed in such a way, that based on the determined poses, an initial point cloud comprising 3D-positions of points of the surrounding is computed by forward intersection using the images of the first series of images only.

According to a further specific embodiment of the invention, the control and evaluation unit is configured so that the spatial representation generation functionality is controlled and executed in such a way, that a graphical reproduction is generated for the initial point cloud, the graphical reproduction being displayable by display means of the surveying system, thus providing for a comparatively fast direct feedback to a user about already acquired data, so that the already acquired data can be checked regarding its completeness.

According to a further specific embodiment of the invention, the control and evaluation unit is configured so that the spatial representation generation functionality is controlled and executed in such a way, that a dense matching algorithm is executed for providing the initial point cloud using the images of the first series of images with lower image resolution, thus providing comparatively fast data processing.

According to a further specific embodiment of the invention, the control and evaluation unit is configured so that the spatial representation generation functionality is controlled and executed in such a way, that the first camera captures the first images with a higher frame rate compared to capturing the second images by the second camera.

Consequently, as both, images with high resolution and images with a lower resolution, are provided by the at least two cameras of the camera module, the aspect of a fast and efficient data processing together with the possibility of generating highly precise data concerning determination of positions and/or orientations is given. Thus, particularly depending on the type or stage of a measuring process a user is enabled to choose which data is to be calculated and/or output e.g. on display means. E.g. for getting a fast overview regarding the progress of the measuring process fast data processing and output would be required and would be providable by image data of lower resolution. Alternatively or additionally, very detailed and precise position information is provided by e.g. simultaneously using higher resolution image data.

Another aspect of the invention relates to a similar approach concerning a surveying subsystem with a specific camera. The surveying subsystem comprises a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one (dual-mode) camera for capturing images, the camera being designed so that different capturing modes regarding capturing images with different resolutions and/or with different frame rates are provided. The control and evaluation unit has stored a program with program code so as to control and execute a spatial representation generation functionality in which a low-resolution-high-frame-rate mode is provided for high-frequency capturing of images with comparatively low resolution with the at least one camera, and a high-resolution-low-frame-rate mode is provided for high-resolution capturing of images with comparatively low frame rates with the at least one camera, and—when moving along a path through a surrounding— a series of images of the surrounding is captured using the low-resolution-high-frame-rate mode, the series comprising an amount of images captured with different poses of the camera, the poses representing respective positions and orientations of the camera, and a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined.

According to a specific embodiment of above invention, the control and evaluation unit is configured so that the spatial representation generation functionality is controlled and executed in such a way, that a series of images of the surrounding is captured using the high-resolution-low-frame-rate mode, the series comprising an amount of images captured with different poses of the camera, the low-resolution-high-frame-rate mode and the high-resolution-low-frame-rate mode are executed simultaneously and poses for images captured in high-resolution-low-frame-rate mode are derived based on the image points and/or on the poses determined for the images captured in low-resolution-high-frame-rate mode.

According to another specific embodiment of the subsystem, the control and evaluation unit is configured so that the spatial representation generation functionality is controlled and executed in such a way, that image capturing in high-resolution-low-frame-rate mode is triggered by a defined time signal, particularly a time signal providing a trigger signal in a constant time interval, or is triggered by comparing relative positions of the pole, the positions being derived from the poses determined for the images captured in low-resolution-high-frame-rate mode, wherein capturing of a successive image is triggered depending on whether a pre-defined relative position threshold is arrived or exceeded, in particular wherein capturing of the successive image is triggered if the difference between a previous-pole-position and an actual-pole-position is at least one meter, particularly two or five metres.

The use of such a camera which is embodied for capturing images with different frame rates and/or resolutions provides for combining low- and high-resolution images within one common measuring process. The low resolution images thus provide—due to the large amount if images, considered image points and calculated poses—a precise and fast computing of the poses for the images and a (low-resolution) point cloud. Additionally, the high resolution images can be considered for precisely determining positions of points captured in the images, orientations of e.g. the pole or a more precise (high-resolution) point cloud.

For computing such a high-resolution point-cloud, poses for the high-resolution images can be determined based on the data derived with and for the low-resolution images, i.e. image points identified in these images and/or poses derived for these images are considered for determining the poses of the high-resolution images. Such pose-determination is enabled based on using a common time reference for capturing low-resolution as well as high-resolution images. Respective high-resolution images thus can be assigned to respective low-resolution images.

Additionally, in particular, a user is enabled to manually trigger the capturing of a high resolution image of a point or region of interest and thus to provide more detailed information of that point and/or region.

Furthermore, another aspect concerning the invention relates to loop-closing with respect to data gathered by a surveying subsystem. The surveying subsystem comprises a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The control and evaluation unit has stored a program with program code so as to control and execute a spatial representation generation functionality in which—when moving along a path through a surrounding— a first series of images of the surrounding is captured with the at least one camera, the first series comprising an amount of images captured with different poses of the cameras, the poses representing respective positions and orientations of the cameras, an initial set of image points is identified based on the first series of images, the initial image points representing reference points of a reference point field, wherein each reference point appears in at least two images of the series of images, and the poses for the images are determined based on resection using the initial image points.

Furthermore, according to this aspect of the invention a second series of images of the surrounding is captured with the at least one camera, reference points of the reference point field appearing in at least one of the images of the second series of images are identified, a further set of image points is identified in the images of the second series of images corresponding to the identified reference points of the second series of images and the poses for the images of the second series of images are determined based on resection using the initial set and the further set of image points.

According to an embodiment of above invention, the camera module comprises at least two cameras arranged relative to each other so that panoramic images with a field of view of 360° in azimuthal direction are capturable. In particular, each camera comprises fisheye optics.

By actually identifying and considering reference points which already have been identified in a group of initial or preceding reference points, these initially identified point can be considered with actual pose reconstruction and/or point cloud calculation and a already computed pint cloud can be closed in order to represent the whole surrounding by one completed cloud.

The repeatedly later use of earlier defined reference points also provides for a refinement of gathered position and/or orientation data, as accumulated errors (e.g. occurring with determining successive poses) can be compensated by that.

If multiple images of the same region in the surrounding (or of parts of it) are captured, these images and/or respective reference point identified in the images can be matched. This at least will increase the overall accuracy.

A further inventive aspect is related to a position measuring resource with integrated camera. The position measuring resource is embodied as being mountable on a surveying pole to be used as part of a surveying system that is adapted to determine positions of the position measuring resource. The position measuring resource comprises a GNSS-antenna and/or a retro-reflector and a camera-arrangement with at least one camera for capturing images of a surrounding. The camera-arrangement and the GNSS-antenna and/or the retro-reflector are integrated into a single common non-divisible housing of the position measuring resource, and the common housing comprises a coupling unit designed so that the position measuring resource is modularly attachable to the pole.

According to an embodiment of above invention, the camera-arrangement is built and designed in such a way that panoramic images with a field of view of 360° at least in azimuthal direction are capturable, particularly wherein the camera-arrangement comprises at least two cameras, especially at least four cameras, arranged in the common housing.

According to a further embodiment of the above invention, the position measuring resource comprises a sensor unit being integrated into the common housing, the sensor unit comprising at least one of the following sensors:
inertial measuring unit,
gyroscope,
tilt sensor,
accelerometer and/or
magnetic compass.

By arranging the camera inside the housing of the position measuring resource, which additionally comprises the GNSS-antenna or the retro-reflector, a compact component is provided, which provides for position determination of the components and for determining an orientation of the component e.g. by performing a SLAM-algorithm or a SfM-algorithm using images captured by the camera.

Therefore, a continuous determination of six degrees of freedom (6-DOF) regarding the position and orientation of the component or the pole is provided, as well.

Now referring to the issue of damping the camera arranged in a camera module in order to provide more stable capturing of images, a corresponding arrangement according to that invention is described as set forth below.

The invention refers to a camera module to be used as part of a surveying system that is adapted to determine positions of a position measuring resource being mounted on a surveying pole, particularly wherein the position measuring resource comprises a GNSS-antenna or a retro-reflector, the camera module being designed to be attached to the surveying pole. The camera module is designed to be attached to the surveying pole and comprises a housing and a camera-arrangement with at least one camera, wherein the camera is integrated in the housing and is movably mounted relative to the housing by use of a damping element in such a way that, when moving with the surveying pole—having rigidly attached the camera module—along a path, mechanical shocks effectuated by touching down the surveying pole are compensated for on the side of the camera-arrangement, and/or in such a way that at least an azimuthal orientation of the camera-arrangement is variable with respect to an azimuthal orientation of the housing so that, when moving with the surveying pole—having rigidly attached the camera module—along a path, alterations of the azimuthal orientation of the pole and the housing are compensated for on the side of the camera-arrangement, particularly wherein higher frequency alterations having low amplitude are compensated for, especially such that a relative azimuth angle being formed between the azimuthal orientation of the camera-arrangement and a moving direction on the path is kept substantially constant in each point on the path.

According to an embodiment of above invention, the actual moving direction or a smoothed moving direction is used as the moving direction, the smoothed moving direction particularly being derived for each point on the path by smoothing a most recently travelled segment of the path.

According to a further embodiment of above invention, the camera-arrangement is mounted relative to the housing by use of a gimbal mounting.

According to a further embodiment of the above invention, the camera module comprises a flywheel and/or a gyro unit being arranged in the housing, wherein the flywheel or the gyro unit is connected with the camera-arrangement such that forces applied by the rotating flywheel or the gyro unit are transferred to the camera-arrangement, thus providing a stabilisation of the azimuthal orientation of the camera-arrangement.

According to a further embodiment of the above invention, the camera module comprises an actuator, particularly a piezo actuator, being connected to the camera-arrangement to actively stabilize the azimuthal orientation of the camera-arrangement.

According to yet a further embodiment of the above invention, the camera module comprises a unit for deriving an orientation of the housing, wherein orientation information generated by the unit is provided to the actuator for actively compensating the orientation of the camera-arrangement according to the detected orientation of the housing. Particularly the orientation information is generated based on

- a SLAM-evaluation using a series of images captured with the at least one camera, within which poses for the images are determined,
- determined positions of the position measuring resource received by the unit from the surveying system, and/or
- an inertial measurement unit providing for IMU measurement data.

The above invention provides for a damping of the camera when moving the housing or the pole on which the camera module is attached. Such damping enables to capture better quality images while moving through the surrounding, i.e. stabilised images.

Furthermore, another aspect concerning the invention relates to quality-indication with respect to a point data gathered by a surveying subsystem, particularly a point cloud or a remote single point measurement.

The respective surveying subsystem—according to that inventive aspect—comprises a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The control and evaluation unit has stored a program with program code so as to control and execute a spatial representation generation functionality in which—when moving along a path through a surrounding—

- a series of images of the surrounding is captured with the at least one camera, the series comprising an amount of images captured with different poses of the camera, the poses representing respective positions and orientations of the camera,
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, and
- a quality indicative output is generated concerning the measurement uncertainty of a 3D-position for at least one point of the surrounding to be computable by forward intersection using the images of the series of images and the determined poses.

According to an embodiment of the above aspect, the forward intersection implies using a variance-covariance-matrix, particularly wherein the forward intersection is carried out by use of a least square method, and the quality indicative output is derived from the variance-covariance-matrix.

According to another embodiment of this aspect, the quality indicative output represents an uncertainty regarding the precision with which the 3D-position for the at least one point is computable or computed, particularly wherein the quality indicative output is influenced at least by

- a precision with which image-positions for the image points within the images is determinable,
- an amount of images which are usable out of the series of images for the computation of the 3D-position for at least one point of the surrounding and
- a length of the baselines of the poses of the usable images.

According to another embodiment of this aspect, based on the determined poses, a point cloud comprising 3D-positions of points of the surrounding is computed by forward intersection using the images of the series of images and the quality indicative output is generated for at least one of the computed points of the point cloud, particularly wherein the quality indicative output is generated for a subset of points of the point cloud referring to a corresponding amount of poses which the subset is determined from.

According to a further embodiment of the inventive aspect above, a graphical reproduction is generated for the point cloud representing the quality indicative output, the graphical reproduction being displayable by display means of the surveying system, thus providing for a feedback to a user about already acquired data, so that the already acquired data can be checked regarding its quality.

According to a further embodiment of the inventive aspect, the quality indicative output is represented by a coloured point cloud, a scaled indication or a specific sign displayable on display means of the surveying system.

According to a further embodiment of the inventive aspect above, determined positions of the position measuring resource for points that have been adopted on the path are received by the control and evaluation unit from the surveying system, and the point cloud is scaled with help of the received determined positions.

The above-described inventive aspect provides for generating information representing a quality of the data derived on basis of captured images. Particularly, a user is provided with such information allowing re-planning or adapting a measuring process in dependency of the quality information. E.g. if precision quality for a region of points or concerning the evaluated orientation of the pole is assessed as being low and presented to the user like that, the user may decide to capture more images related to the respective region and thus providing for more precise processing for the region.

Moreover, the quality indication enables a user to capture an adapted amount of images being necessary for deriving needed data, i.e. the user is informed when enough data is gathered for computing a point cloud or determining poses according to measuring requirements to be achieved. Thus, unnecessary gathering of more data than need is suppressed or avoided and the measuring process as a whole is improved with view to time consumption.

A user can continuously check for a level of data-quality to be reachable with already captured images.

Summed up, the fact which is placed at the basis of this quality determination aspect is a possibility to compute an accuracy of the 3D point measured at least on two images obtained using the surveying subsystem.

Alternatively to deriving a measurement certainty directly from the computation of the position of one or more points (or a point cloud) of the surrounding (or additively thereto), a measurement certainty (i.e. a generally achievable accuracy level) can also be estimated based on intrinsic parameters of the surveying subsystem (like camera resolution, GNSS accuracy) and/or extrinsic parameters (like a distance from the 3D point to the poses of the images, point's observation angle) only (without considering the effective calculation of the point's position). E.g., based on a predefined set of images obtained using the surveying subsystem it is possible to compute a field which indicates different bounds of accuracy for 3D points which are computed using this set of images. The field might be coloured with a predefined palette for the more intuitive representation.

On the planning stage (i.e. before capturing the series of images) a user could define an area of interest (e.g. on the available maps or satellite images). For this area of interest a possible trajectory of the surveying subsystem might be automatically computed with a guarantee of a full coverage of the whole area of interest with target accuracy defined by user. During the survey user could follow this proposed trajectory to map the whole area with target accuracy without gaps. This trajectory might be optimized to minimize its length which reduces mapping time. Any existing objects with known coordinates in the area of interest might be taken into account for the trajectory computation. During the survey user can get an estimation of the mapping completeness in real-time. The unmapped parts of the area of interest might be shown to user also in real-time.

On the verification stage it is possible to compute the accuracy field for the actual survey trajectory. Analysis of this field might help a user to check completeness and identify regions where target accuracy is not reached.

The invention also relates to an automotive surveying system comprising a position measuring resource, particularly a GNSS-antenna or a retro-reflector, being mounted on a surveying pole and a measuring subsystem that comprises a camera module and a control and evaluation unit and is adapted to determine positions of the position measuring resource, wherein the surveying pole comprises at least one wheel or a chain drive for moving the pole over a ground surface. The camera module is designed to be attached to the surveying pole and comprises at least one camera for capturing images. The control and evaluation unit has stored a program with program code so as to control and execute a localizing and mapping functionality in which—when moving along a path through a surrounding—
- a series of images of the surrounding is captured with the at least one camera, the series comprising an amount of images captured with different poses of the camera, the poses representing respective positions and orientations of the camera;
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined,
based on the determined poses, a point cloud comprising 3D-positions of points of the surrounding is computed by forward intersection using the series of images, particularly by using dense matching algorithm; and/or
an orientation of the at least one camera is derived from the poses for a designated image of the series of images.

In one embodiment of the surveying system, the surveying pole comprises two wheels that are arranged on the pole in such a way that a bottom end of the pole is enabled to contact the ground dependent on the pole's orientation relative to the ground, in particular wherein the bottom end is enabled to contact the ground when the pole is oriented relative to the ground in a right angle.

In another embodiment of the surveying system, the surveying pole comprises at least one handle, in particular two handles, for allowing a user to push and/or pull the pole along the path.

In a further embodiment, the surveying system comprises a motor for driving the at least one wheel or the chain drive, in particular
- in response to a pushing or pulling motion by a user and/or
- for autonomously driving the surveying pole along a predefined path or driving the surveying pole remotely controlled.

The invention also relates to a two-wheeled, self-balancing motorized vehicle as part of a surveying system that is adapted to determine positions of a position measuring resource being mounted on the vehicle, particularly of a GNSS-antenna or of a retro-reflector.

In one embodiment, this vehicle is designed for transporting a user of the surveying system, in particular wherein the vehicle is designed in such a way that the user controls a forward and backward movement of the vehicle by leaning the vehicle relative to a combined centre of gravity of user and vehicle.

In another embodiment, this vehicle comprises measuring point marking means for marking an actual measuring point on the ground, in particular wherein the measuring point marking means comprise a laser emitting optical system for marking the measuring point with a laser spot or pattern.

The invention also relates to a surveying subsystem for such a two-wheeled, self-balancing motorized vehicle, the surveying subsystem comprising a camera module and a control and evaluation unit to be used as part of the surveying system. The camera module is designed to be attached to the vehicle and comprises at least one camera for capturing images. The control and evaluation unit having stored a program with program code so as to control and execute a localizing and mapping functionality in which—when moving along a path through a surrounding—
- a series of images of the surrounding is captured with the at least one camera, the series comprising an amount of images captured with different poses of the camera, the poses representing respective positions and orientations of the camera;
- a set of image points is identified based on the series of images, the image points representing reference points of a reference point field, each image point appearing in at least two images,
- the poses for the images are determined based on resection using the image points;
wherein
- based on the determined poses, a point cloud comprising 3D-positions of points of the surrounding is computed by forward intersection using the series of images, particularly by using dense matching algorithm; and/or
- an orientation of the at least one camera is derived from the poses for a designated image of the series of images.

The invention also relates to a surveying subsystem comprising a camera, a profiler and a control and evaluation unit to be used as parts of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The profiler is designed to be attached to the surveying pole and adapted for emission of a rotating laser beam as well as for reception and detection of a returning part of the emitted laser beam being scattered back from points of a surrounding. The profiler is further provided with an electronic distance measuring functionality as well as an angle measuring functionality for the rotating laser beam so that profiler measurement data comprising distance and angle information is gatherable. The control and evaluation unit having stored a program with program code so as to control and execute a spatial representation generation functionality in which—when moving along a path through the surrounding—
- a series of images of the surrounding is captured with the camera, the series comprising a plurality of images captured with different poses of the camera, i.e. from different points on the path and with different orientations of the camera,
- a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined,
- determined positions of the position measuring resource for points that have been adopted on the path are received by the control and evaluation unit from the surveying system,
- a 6-dof-travelling-history including translational and rotational information in six degrees of freedom is derived for the moved path based at least on the poses determined within the SLAM-evaluation and the received determined positions, particularly by use of a Kalman filter, and
- coordinates for points of the surrounding are determined as the spatial representation, based on the profiler measurement data in combination with the derived 6-dof-travelling-history.

In one embodiment, the surveying subsystem further comprises an inertial measurement unit to be attached to the surveying pole and designed for gathering IMU measurement data and the control and evaluation unit is configured so that the spatial representation generation functionality is controlled and executed in such a way, that the 6-dof-travelling-history is derived further based on the IMU measurement data, particularly wherein the IMU measurement data and the SLAM-evaluation are taken into account for deriving the rotational information of the 6-dof-travelling-history, especially wherein the IMU measurement data is used to increase resolution of rotational, and particularly also positional, information derivable from the determined poses by the SLAM-evaluation, particularly wherein—in case a Kalman filter is used for deriving the 6-dof-travelling-history—the Kalman filter is fed with the poses determined within the SLAM-evaluation, the received determined positions and the IMU measurement data.

In another embodiment of the subsystem,
- the camera module and the profiler, and particularly at least parts of the control and evaluation unit, are integrated in a common single housing being attachable to the surveying pole, or
- each of the camera module and the profiler is integrated in an own housing, each of the housings being attachable to the surveying pole, particularly wherein each housing is provided with mutual connection elements for data transmission, and particularly also transmission of trigger-information, in such a way that—in condition of each housing being attached to the surveying pole—the connection elements are interlocked and a connection for data transmission, and particularly also transmission of the trigger-information, between the camera module and the profiler is provided.

In yet another embodiment of the subsystem, the camera module and the profiler each comprise a clock and a circuit for assigning a time stamp to gathered measurement data like image data, IMU measurement data and profiler measurement data, particularly wherein for the camera module and the profiler a GNSS-module is provided for gathering absolute time information from the received GNSS-signal, so that the GNSS-module is used as the clock.

In a further embodiment of the subsystem, the profiler is designed in such a way that—in a condition attached to the surveying pole—the rotating laser beam defines a laser plane being
- substantially perpendicular to the surveying pole, or
- inclined with respect to the pole so that they confine an angle of between about 5 and about 35 degree, particularly of between about 10 and about 30 degree.

In a further embodiment of the subsystem, the profiler comprises a rotatable mirror or a rotatable laser emitting and receiving unit.

In a further embodiment of the subsystem, the profiler is designed in a multi-beam setup in which the profiler is adapted for emission of at least two rotating laser beams as well as for reception and detection of a returning part of each of the emitted beams being scattered back from points of a surrounding.

In one embodiment of this subsystem, the multi-beam setup is embodied with a common rotation platform for the at least two laser beams, particularly wherein the profiler is designed in a three-beam setup. The profiler is designed in such a way that the at least two laser beams define laser planes are parallel and slightly shifted with respect to each other, slightly inclined with respect to each other, particularly so that slightly different inclination angles with respect to the pole are formed and/or so that slightly different azimuth angles with respect to the pole are formed, or coincident with respect to each other, and/or the profiler is designed in such a way that the at least two rotating laser beams form an angular offset with respect to each other in rotation direction, particularly wherein—in case of a three-beam setup—the angular offset is 120°.

In one embodiment of this subsystem, the common rotation platform comprises a common rotatable mirror for rotatably deflecting the at least two laser beams or the common rotation platform comprises at least two laser emitting and receiving units.

In another embodiment of this subsystem, the multi-beam setup is embodied with at least two rotation platforms for the at least two laser beams. The profiler with the at least two rotation platforms is designed in such a way that the at least two laser beams define laser planes being inclined with respect to each other, particularly so that different inclination angles with respect to the pole are formed, especially wherein one of the laser planes forming an inclination angle of between about 10 and about 30 degrees and the other one of the laser planes forming an inclination angles of between about 60 and about 80 degree and/or different azimuth angles with respect to the pole are formed, especially wherein an angle offset in azimuth direction of between about 1 and about 40 degrees is formed between the laser planes.

In a particular embodiment of the subsystem, the profiler is designed in such a way that an inclination angle of a laser plane defined by the rotating laser beam is adjustable, particularly manually or motor-driven, so that—in a condition where the profiler is attached to the surveying pole—the inclination angle is variable with respect to the pole.

In another embodiment of this subsystem, the profiler is designed in such a way that an azimuth angle of a laser plane defined by the rotating laser beam is adjustable, particularly manually or motor-driven, so that—in a condition where the profiler is attached to the surveying pole—the azimuth angle is variable with respect to the pole.

In one embodiment of this subsystem, the azimuth angle is adjustable by an actuator. The control and evaluation unit is configured so that the spatial representation generation functionality is controlled and executed in such a way, that the azimuth angle is automatically continuously adjusted by the actuator in a manner that alterations of the azimuthal orientation of the pole—when moving along the path—are compensated for, in particular wherein the automatic continuous adjustment of the azimuth angle is based on the derived 6-dof-travelling-history or a separate evaluation using the poses determined within the SLAM-evaluation, and/or
the received determined positions, and/or,
in case an inertial measurement unit is provided for, IMU measurement data.

In particular, higher frequency alterations having low amplitude are compensated for, especially wherein a relative azimuth angle being formed between the laser plane and a moving direction on the path is kept substantially constant, particularly perpendicular, in each point on the path.

In one embodiment of this subsystem, the actual moving direction or a smoothed moving direction is used as the moving direction, the smoothed moving direction particularly being derived for each point on the path by smoothing a most recently travelled segment of the path.

In another embodiment of this subsystem, the azimuth angle is adjusted and stabilized with respect to the surrounding by stabilisation means working according to the principle of making use of conversation of angular momentum, particularly wherein the stabilisation means comprise a flywheel, especially wherein the flywheel is rotatable together with the rotation platform which causes the laser beam to rotate.

The invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector. The camera module is designed to be attached to the surveying pole and comprises at least one camera for capturing images. The control and evaluation unit has stored a program with program code so as to control and execute a functionality in which—when moving along a path through a surrounding— a series of images of the surrounding is captured with the at least one camera, the series comprising an amount of images captured with different poses of the camera, the poses representing respective positions and orientations of the camera;

a SLAM-evaluation with a defined algorithm using the series of images is performed, wherein a plurality of respectively corresponding image points are identified in each of several sub-groups of images of the series of images with use of a feature detection process for detecting corresponding features, particularly by means of feature tracking, especially a KLT-algorithm (Kanade-Lucas-Tomasi), and/or by means of feature matching, especially a SIFT-, SURF-, BRISK- or BRIEF-algorithm, and, based on resection and forward intersection using the plurality of respectively corresponding image points, a reference point field is built up comprising a plurality of reference points of the surrounding, wherein coordinates of the reference points are derived, and the poses for the images are determined.

According to this aspect of the invention, the control and evaluation unit comprises several diversified units, wherein at least a first unit, particularly an FPGA or a GPU (graphical processing unit), carries out at least part of the feature detection process for identifying the plurality of respectively corresponding image points, and at least another, second unit, particularly a CPU, carries out determining of the poses.

In one embodiment of the subsystem, the first and second units are built together as one SoC (system on a chip).

In another embodiment of the subsystem, the first and the second unit are disposed within the camera module.

In a further embodiment of the subsystem, the first unit is disposed within the camera module and the second unit is a laptop, a tablet-PC, a smartphone, a processing unit of a handheld controller/datalogger of the surveying system, a processing unit of a GNSS-module of the surveying system, a processing unit of a surveying station, particularly total station, of the surveying system or a surveying site server, particularly being installed in a car.

The invention also relates to a surveying subsystem comprising a camera module and a control and evaluation unit to be used as part of a surveying system that is adapted to determine positions of a position measuring resource being mounted on a surveying pole, particularly of a GNSS-antenna or of a retro-reflector. The camera module comprises at least one camera for capturing images, wherein the camera module is built as one single integrated physical unit being designed to be attached to the surveying pole. The control and evaluation unit has stored a program with program code so as to control and execute a functionality in which—when moving along a path through a surrounding— a series of images of the surrounding is captured with the at least one camera, the series comprising an amount of images captured with different poses of the camera, the poses representing respective positions and orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, and a spatial representation, particularly a point cloud, comprising 3d-information about the surrounding is computed by forward intersection using the series of images and the determined poses, particularly by using a dense matching algorithm.

According to this aspect of the invention, the control and evaluation unit comprises several diversified units, wherein at least one unit, being integrated in the camera module, carries out at least part of the SLAM-evaluation and at least one other unit, being disposed externally to the camera module, carries out at least parts of computing of the spatial representation.

In one embodiment of the subsystem, the at least one other unit is a cloud server.

In another embodiment of the subsystem, the at least one other unit is a laptop, a tablet-PC, a smartphone, a processing unit of a handheld controller/datalogger of the surveying system, a processing unit of a GNSS-module of the surveying system or a surveying site server, particularly being installed in a car.

In yet another embodiment of the subsystem, several other units, being disposed externally to the camera module, carry out at least parts of computing of the spatial representation in a decentralised manner, the several other units particularly being several smartphones.

In a further embodiment of the subsystem, at least one unit carrying out a part of identifying the plurality of respectively corresponding image points and/or determining the poses is designed so as to be carriable in a backpack of an operator.

In another embodiment of the subsystem, at least one unit carrying out a part of identifying the plurality of respectively corresponding image points and/or determining the poses is a laptop, a tablet-PC, a smartphone, a processing unit of a handheld controller/datalogger of the surveying system, a processing unit of a GNSS-module of the surveying system or a surveying site server, particularly being installed in a car.

The invention also relates to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The control and evaluation unit having stored a program with program code so as to control and execute a remote point measurement functionality in which—when moving along a path through a surrounding— a series of images of the surrounding is captured with the camera, the series comprising a plurality of images captured with different poses of the camera, i.e. from different points on the path and with different orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, and, upon selection of an image point in an image of the surrounding, said image basing on at least one of the images of the series of images, a 3d-position of the remote point being represented by said selected image point is derived, wherefore a subset of images related to the remote point is automatically identified from the series of images and the 3d-position is determined based on forward intersection using said subset of images and the determined poses for the images of said subset.

In one embodiment of the subsystem, the control and evaluation unit is configured so that the remote point measurement functionality is controlled and executed in such a way, that the image point is manually selectable by a user, and/or the subset comprises all images in which the remote point appears.

The invention also relates to a surveying subsystem comprising a camera module and a control and evaluation unit to be used as part of a surveying system that is adapted to determine positions of a position measuring resource being mounted on a hand-carried surveying pole, particularly wherein the position measuring resource comprises a GNSS-antenna or a retro-reflector. The camera module is designed to be attached to the surveying pole and comprises at least one camera for capturing images. The control and evaluation unit has stored a program with program code so as to control and execute a functionality in which—when moving along a path through a surrounding— a series of images of the surrounding is captured with the camera, the series comprising a plurality of images captured with different poses of the camera, i.e. from different points on the path and with different orientations of the camera, a SLAM-evaluation with a defined algorithm using the series of images is performed, wherein a plurality of respectively corresponding image points are identified in each of several sub-groups of images of the series of images and, based on resection and forward intersection using the plurality of respectively corresponding image points, a reference point field is built up comprising a plurality of reference points of the surrounding, wherein coordinates of the reference points are derived, and the poses for the images are determined, and de-blurring at least some of the images of the series of images based on changes in orientation being derived at least dependent on the determined poses, particularly based on a camera-trajectory being derived at least dependent on the determined poses and depth information for the surrounding being derived at least dependent on the derived coordinates of the reference points.

In one embodiment of the subsystem, the control and evaluation unit is configured so that the functionality is controlled and executed in such a way, that the de-blurring is performed in such a way that motion-blur appearing in the images due to relative motion of the camera with respect to the surrounding during exposure-time is compensated for, wherein a comparatively higher compensation stage is applied for closer objects of the surrounding being imaged and a comparatively lower compensation stage is applied for farther objects of the surrounding being imaged, and/or the camera-trajectory is derived further dependent on determined positions of the position measuring resource for points that have been adopted on the path, the positions being receivable by the control and evaluation unit from the surveying system, and/or IMU measurement data being gathered by an inertial measurement unit, which is also provided as part of the surveying subsystem.

In another embodiment of the subsystem, the control and evaluation unit is configured so that the functionality is controlled and executed in such a way, that

- the SLAM-evaluation is performed again using the de-blurred images of the series of images, wherein the poses for the de-blurred images are re-calculated, and/or
- a 3d-position of at least one point of the surrounding is determined appearing in at least some of the de-blurred images, wherein a subset of images related to the at least one point is automatically identified from the de-blurred images and particularly further images of the series of images, and wherein the 3d-position is determined based on forward intersection using said subset of images and the determined poses, therein—where applicable—the re-calculated poses, for the images of said subset, and/or
- a point cloud comprising 3D-positions of a plurality of points of the surrounding is computed by forward intersection using the de-blurring images and particularly further images of the series of images as well as the determined poses, therein—where applicable—the re-calculated poses as the determined poses.

BRIEF DESCRIPTION OF THE DRAWINGS

The invention in the following will be described in detail by referring to exemplary embodiments that are accompanied by figures, in which:

FIGS. 2a-c show three exemplary combinations of a camera module and a position measuring resource as part of a surveying system according to the invention;

FIG. 8c shows a tenth embodiment of a camera module according to the invention having a scanning unit;

FIG. 8d shows a eleventh embodiment of a camera module according to the invention having a scanning unit;

FIGS. 9a-b show a fourteenth embodiment of a camera module according to the invention having a scanning unit;

FIG. 9c shows two laser planes spanned by the rotating laser beams of the scanning unit of the camera module shown in FIGS. 9a-b;

FIGS. 13, 14 show resection based on reference points in a surrounding while moving with the camera module (pole);

FIGS. 19a-d show a second exemplary embodiment of a wheeled surveying system.

DETAILED DESCRIPTION

Figure 1:
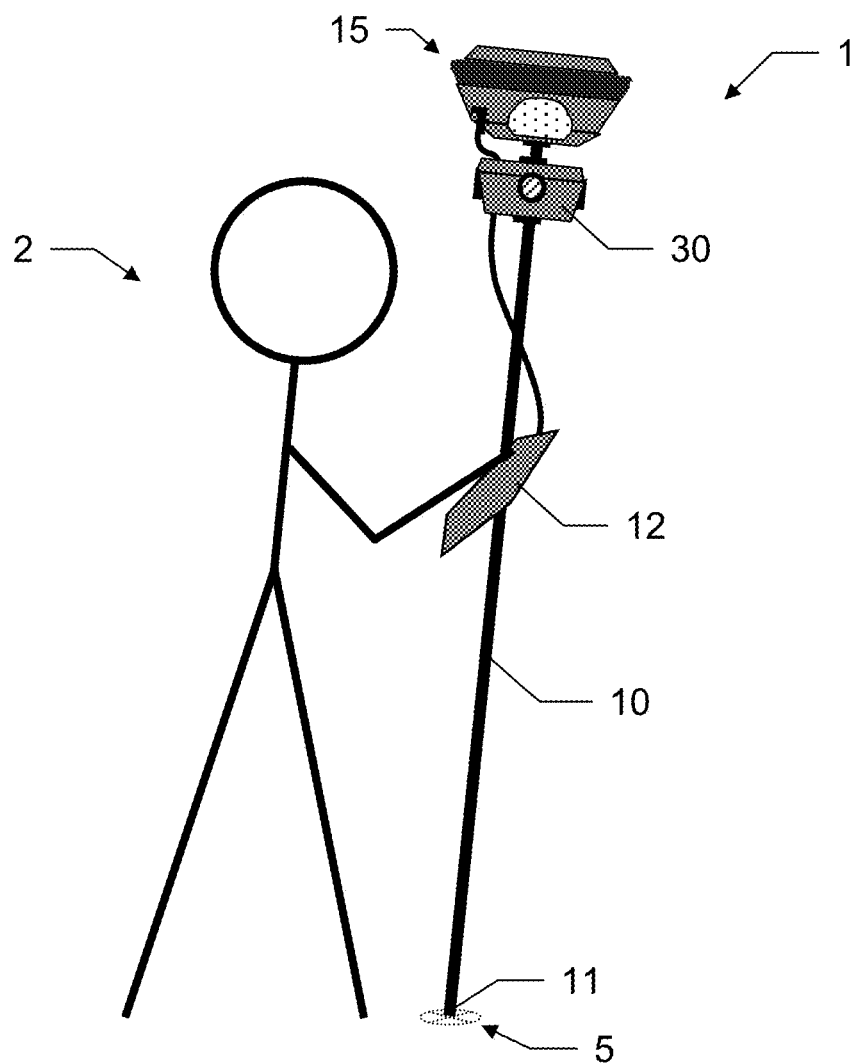
FIG. 1 shows an exemplary embodiment of a surveying system according to the invention.

FIG. 1 shows an exemplary embodiment of a surveying system 1 according to the invention. The depicted surveying system 1 comprises a surveying pole 10 which is operated by a user 2. The pole 10 comprises a bottom end 11 which is positionable on a measuring point 5 on the ground. A GNSS antenna 15 is placed on the top end of the pole 10 as a position measuring resource of the surveying system 1. Furthermore, the surveying system 1 comprises a camera module 30 and a control and evaluation unit 12.

Camera Module

FIGS. 2a-c show camera modules 30,30' being mounted on a pole 10 together with a position measuring resource of the respective surveying system.

Each camera module 30,30' comprises an optical recording device 31 that is sensitive to light coming from all or many spatial directions. It could be based on an imaging sensor and a fish-eye lens, or a combination of a camera and a parabolic mirror, or a minimum of two single cameras arranged on a horizontal ring, or any other optical setup functioning as a wide-angle or panorama camera.

The camera module can be a separate module 30 which is mounted on a pole 10 together with a GNSS antenna 15 (FIG. 2a) or a reflector 16 (FIG. 2b). Moreover, the module 30' can be integrated into the housing of a GNSS antenna (FIG. 2c) or reflector.

According to FIG. 2c the camera module 30' is represented by the position measuring resource which additionally comprises a GNSS antenna and/or a reflector.

Figure 3A:
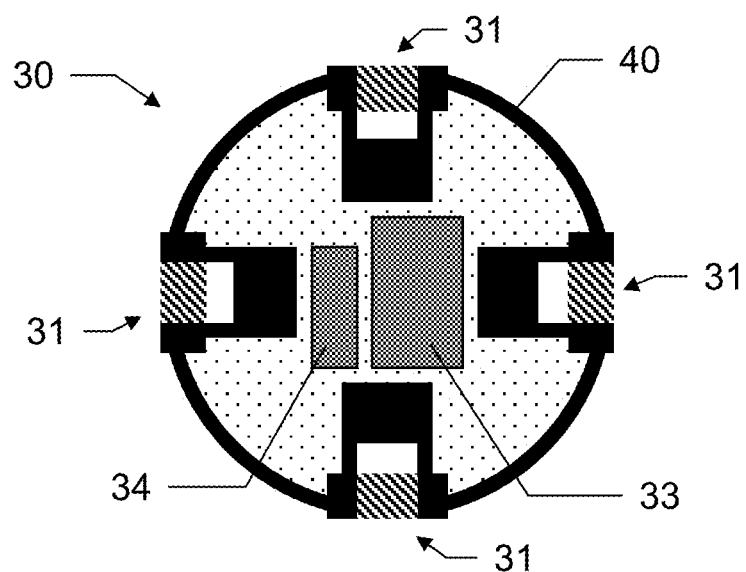
FIGS. 3a-b show a first embodiment of a camera module according to the invention.
Figure 3B:
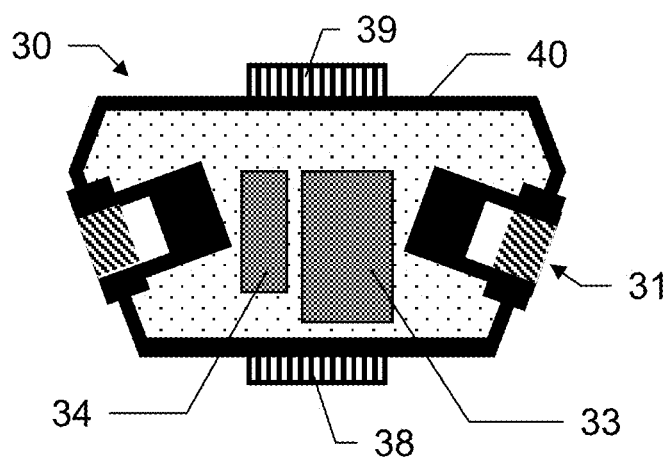

The FIGS. 3a and 3b show a first embodiment of a camera module 30 according to the invention. The camera module 30 has a housing 40 and mounts for the pole 38 and for the position measuring resource 39 (GNSS antenna or reflector). It may comprise a set of cameras 31, e.g. four single cameras 31 aligned in angles of 90° to each other with a horizontal field-of-view>90°. In such an arrangement a horizontal field-of-view of 360° is covered. The vertical field-of-view (FOV) of the camera assembly can be about 60°. The cameras can be aligned horizontally or downward oriented, e.g. by 20°, as shown in FIG. 3b. This is advantageous for applications where close objects are of particular interest.

Moreover, a processing unit 33 can be part of the camera module 30. The processing unit 33 can be a CPU, e.g. an ARM processor or a combination of a CPU with an FPGA, e.g. Zync SoC, or a combination of a CPU with a graphical-processing-unit (GPU). In case of a combined processing unit, e.g. feature tracking, etc. is carried out on the FPGA or the GPU. These are primarily image processing algorithms where a high degree of parallel processing can be achieved on units of that kind.

Also an inertial-measurement-unit (IMU) 34 can be part of the camera module. The IMU 34 may consist of a 3-axis accelerometer and, particularly, of a 3-axis gyroscope. Additionally, a magnetometer may be included in the IMU.

Figure 4A:
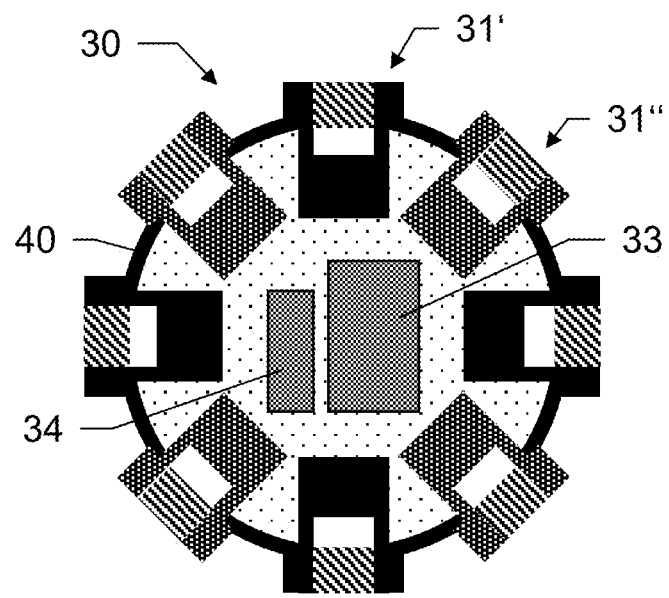
FIGS. 4a-b show a second embodiment of a camera module according to the invention.
Figure 4B:
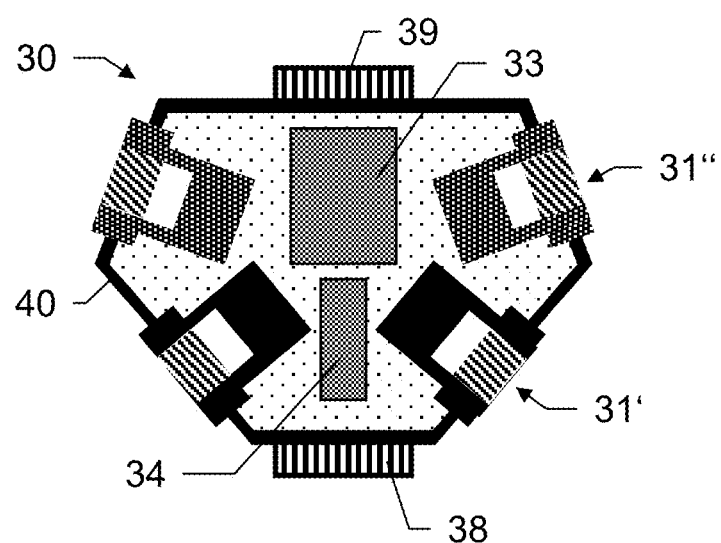

The FIGS. 4a and 4b show a second embodiment of a camera module 30 according to the invention: In order to increase the vertical FOV of the camera module 30, four downward-oriented cameras 31' can be combined with four upward oriented cameras 31".

Figure 5A:
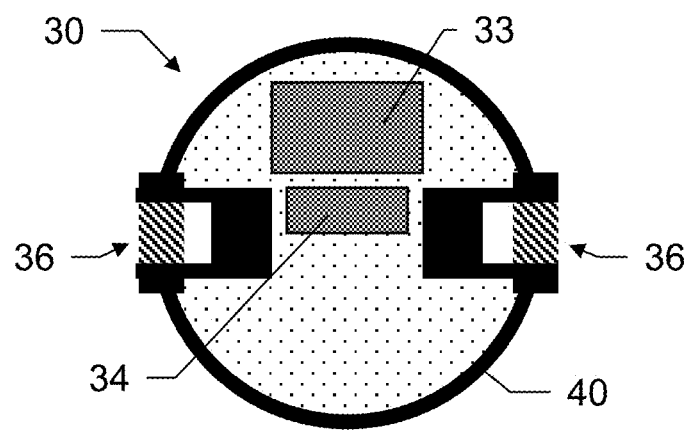
FIGS. 5a-b show a third embodiment of a camera module according to the invention.
Figure 5B:
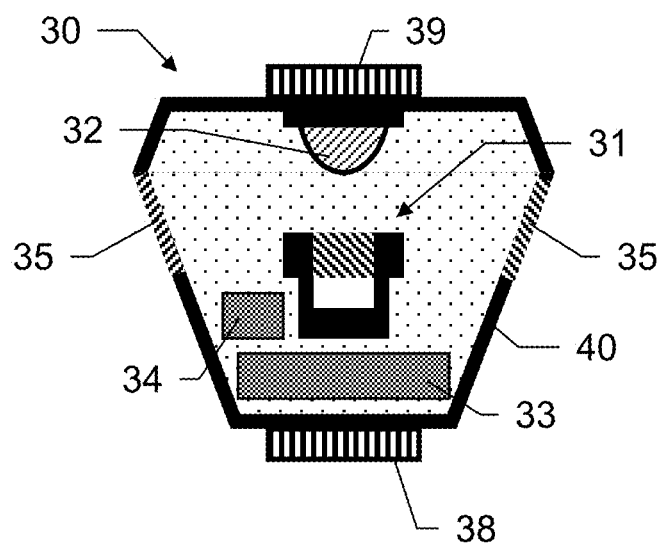

Alternative embodiments are shown in FIGS. 5a and 5b: FIG. 5a shows an arrangement with two fish-eye cameras 36 with a horizontal field-of-view of >180°, and FIG. 5b shows an arrangement of a single camera 31 with a mirror 32, particularly a parabolic mirror, and a glass window 35.

Optionally, the cameras 31,31',31",36 of the camera modules 30 described above can have different resolutions. For instance, in case the camera module 30 comprises eight cameras, four cameras can have low resolution and are read-out in high frame rate (advantageous for feature tracking) and four cameras have high resolution (advantageous for dense matching) and are read-out with a lower frame rate. Alternatively, the high resolution cameras are not running with a specific frame rate but are triggered by the algorithm when a keyframe should be captured, e.g. in a distance interval of two meters.

Alternatively or additionally, according to one aspect of the invention, one single camera of the camera module is built so that image capturing with at least two different resolutions and/or different frame rates is provided by the camera. Thus, high-resolution images as well as low-resolution images can be provided commonly with view to a measuring process.

Moreover, for reducing reflections from windows, a polarization filter can be mounted in front of the camera lenses (not shown here).

Figure 6A:
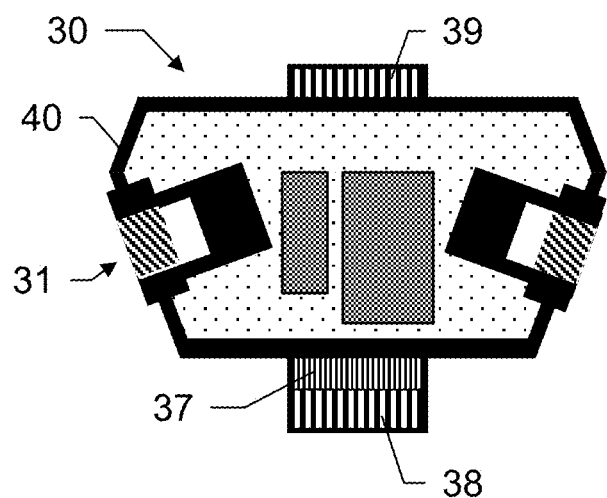
FIG. 6a shows a fourth embodiment of a camera module according to the invention.
Figure 6B:
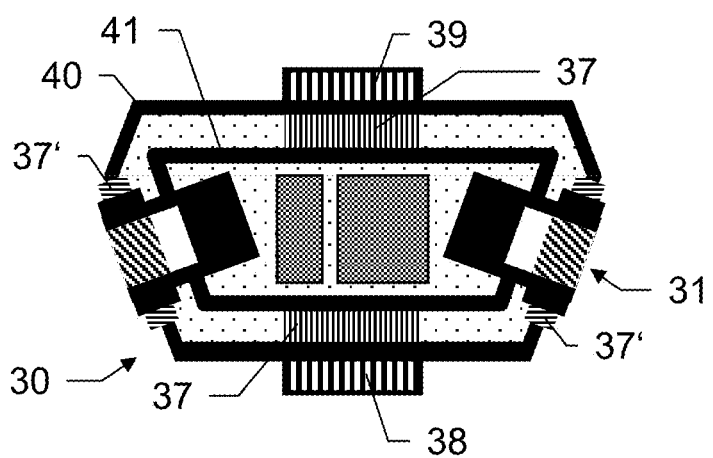
FIG. 6b shows a fifth embodiment of a camera module according to the invention

The FIGS. 6a and 6b show a two further embodiments of a camera module 30 having absorber means 37,37'. The relative position and orientation of the cameras 31 can be determined in a calibration procedure. In order to keep the alignment of the cameras 31 stable over time, e.g. having it resistant against shocks or drops, an absorber 37 can be integrated, e.g. between the housing 40 and the mount for the pole 38, as shown in FIG. 6a. Alternatively, as shown in FIG. 6b, the cameras 31 and the IMU 34 can be mounted on a frame 41 which is mechnically decoupled from the housing 40 by absorbers 37,37'. The absorbers 37 also reduce the maximum accelerations and avoid the accellerometers to saturate.

Such damping element (absorber) could be in form of a gimbal mounting or the like.

Trigger

During the measurement, image data is recorded with the camera module 30. In case that there is more than one camera 31 in the camera module 30, the image data is recorded in parallel, i.e. synchronously. The trigger signal for triggering all the single cameras can be produced by another sensor, e.g. the GNSS antenna. Alternatively, one camera can trigger all the others.

Image data can be recorded as a video with about 15 to 25 frames per second (FPS) or as a set of event-based triggered still images, e.g. an image is recorded when the operator moved two meters since the last image was taken. Alternatively, a new image can be captured, when the image content shows a significant difference to the previous image.

Moreover, the recording of an image can be triggered by the operator, when he places the pole on a point and triggers a measurement.

Figure 7A:
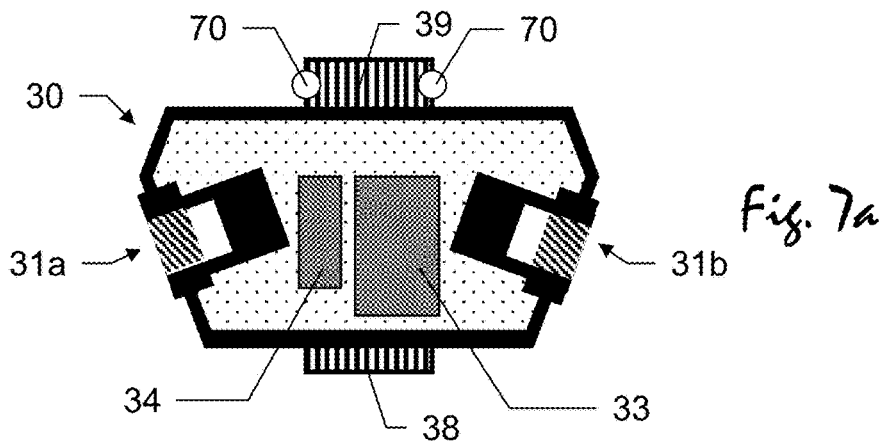
FIG. 7a shows a sixth embodiment of a camera module according to the invention.
Figure 7B:
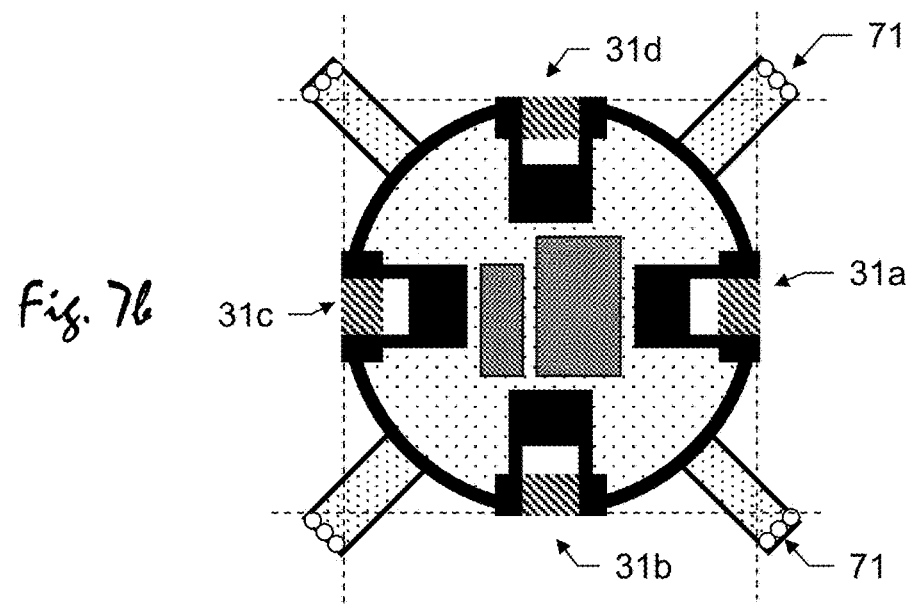
FIGS. 7b-c show a seventh embodiment of a camera module according to the invention.
Figure 7C:
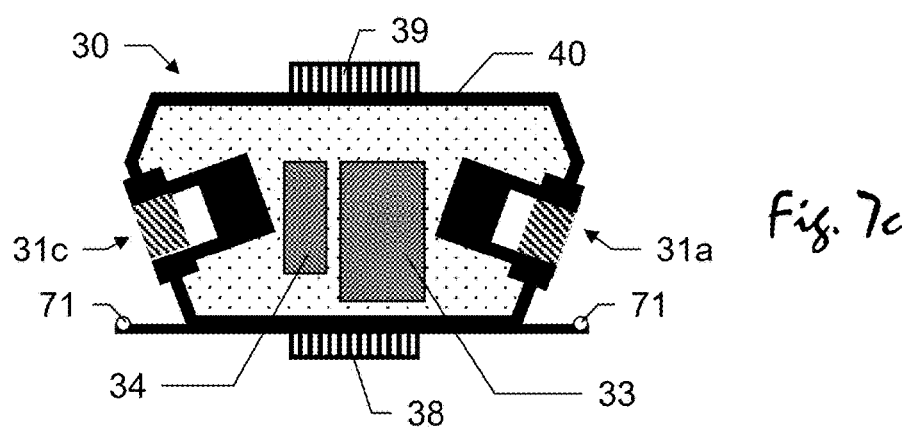

FIGS. 7a-c show two further embodiments of the camera module 30. Each camera module 30 comprises at least two cameras 31a-d and optical triggering means 70,71 for triggering a highly synchronous capturing of images by the cameras 31a-d. This is useful for instance to allow an image stitching of the images captured by the single cameras even if the camera module is in motion.

In FIG. 7a, a ring of flash lights 70 is arranged around the camera module 30, here around the mount for the position measuring resource 39. The cameras 31a,31b are adapted for perceiving a light flash from the flash lights 70 in the surrounding. The cameras 31a,31b then can synchronously capture an image. Furthermore, synchronously captured images of the cameras 31a,31b can be identified by the means of the light flash that appears in all images that have been captured during the flash.

FIGS. 7b and 7c show a camera module 30 with four cameras 31a-d. The camera module 30 comprises optical triggering means designed as groups of light emitting diodes (LED) 71. These are arranged in such a way that each group 71 lies in the field-of-view (represented by dashed lines) of two of the cameras 31a-d and is perceivable by these two cameras. The groups of LED 71 can be used to trigger a highly synchronous capturing of images by the cameras 31a-d. The groups of LED 71 can also be used to add a code to the images, e.g. in order to allow identification of synchronously captured images.

Scanning Unit (→Profiler) [Section Still being to be Complemented by the Wording of the Corresponding Claims]

In the FIGS. 8a-f, 9a-f and 10a-e various exemplary embodiments of camera modules 30 are depicted that comprise a scanning unit 50.

The scanning units 50 integrated in the camera module 30 are advantageous for the generation of point clouds in real-time, i.e. no expensive dense matching step has to be performed as in the case of point cloud generation with images. Moreover, in contrast to camera based approaches the scanning unit 50 does not rely on good textured surfaces for the derivation of point clouds.

The scanning unit 50 can consist of a laser emitting and receiving unit 51 and a rotation mirror 52. In the arrangement shown in FIG. 8a the rotating laser beam 55 is spanning a more or less horizontal plane, if the pole is aligned more or less vertically.

Figure 8A:
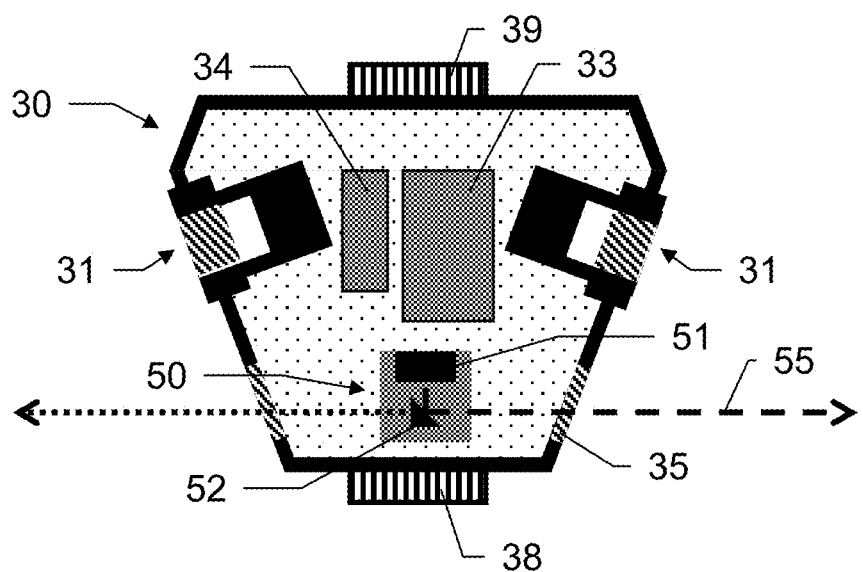
FIG. 8a shows an eighth embodiment of a camera module according to the invention having a scanning unit.
Figure 8B:
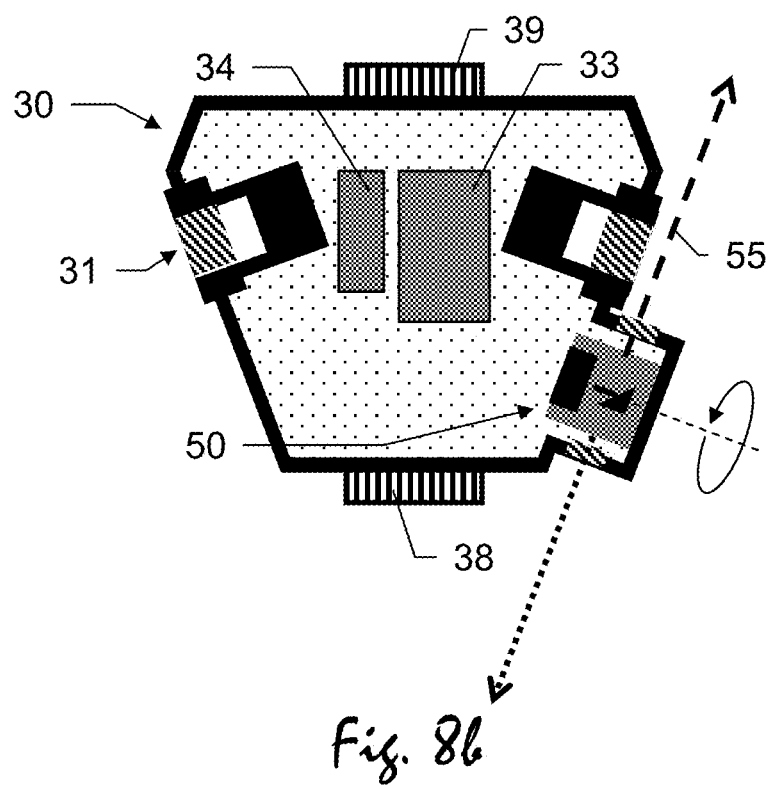
FIG. 8b shows a ninth embodiment of a camera module according to the invention having a scanning unit.

In FIG. 8b another setup of the scanning unit 50 is shown. Here, the rotation axis of the mirror is tilted by about 10° to 30° from the horizontal plane.

FIG. 8c shows the camera module 30 of FIG. 8b mounted on a surveying pole 10. The rotating laser 55 spans a laser plane which is tilted in such a way that it passes the GNSS antenna 15, and, consequently, the occlusions are small. For such a setup where the camera module 30 is mounted close to the GNSS antenna 15 on the top of the pole 10, the scanning module has to be somehow exposed. To avoid damages of the scanning unit 50 when the pole 10 is dropped, preferably a drop protection 18 is mounted below the camera module 30 on the pole 10.

FIG. 8d shows a combination of a camera module 30 and a separate scanning module 58. Both modules 30,58 can be plugged together. For energy supply and data transfer a connector 59 can be integrated into the housing of each module 30,58. The scanning module 58 can be equipped with a separate processing unit 53. Alternatively, the computations of the scanning module 58 can be carried out on the processing unit 33 of the camera module 30.

Figure 8E:
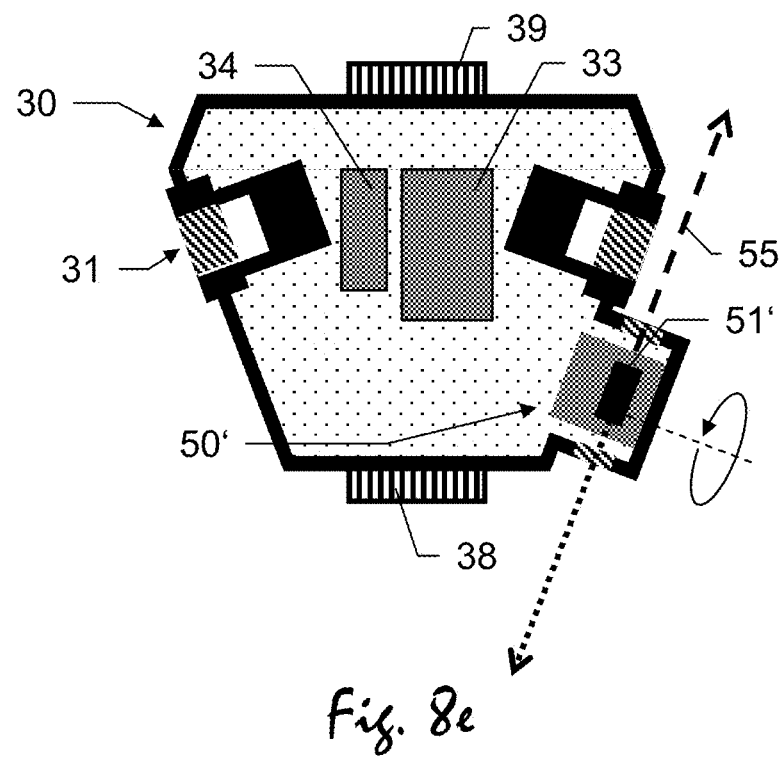
FIG. 8e shows a twelfth embodiment of a camera module according to the invention having a scanning unit.

FIG. 8e shows an integrated camera module 30 with a scanning unit 50' having a rotating laser emitting and receiving unit 51' instead of a rotating mirror.

Figure 8F:
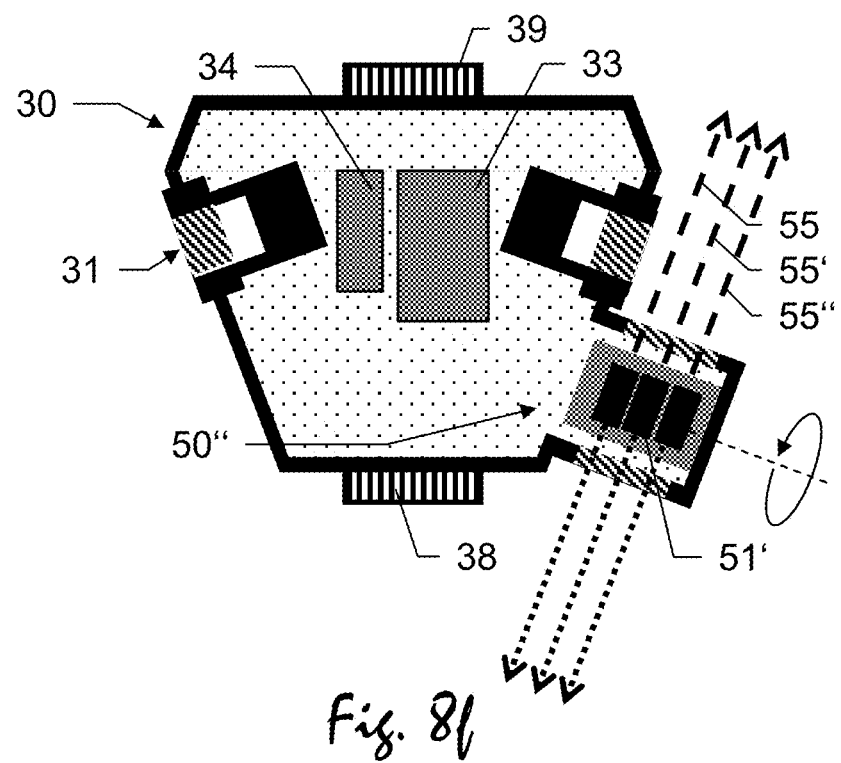
FIG. 8f shows a thirteenth embodiment of a camera module according to the invention having a scanning unit.

FIG. 8f shows a camera module 30 with a scanning unit 50" having a multi-beam setup with three laser emitting and receiving units 51' rotating together around one axis.

Alternatively, instead of emitting three parallel laser beams 55,55',55", the laser emitting and receiving unit can be mounted with an angular offset of 120°, e.g. like the blades of a wind turbine (not shown here).

Figure 9A:
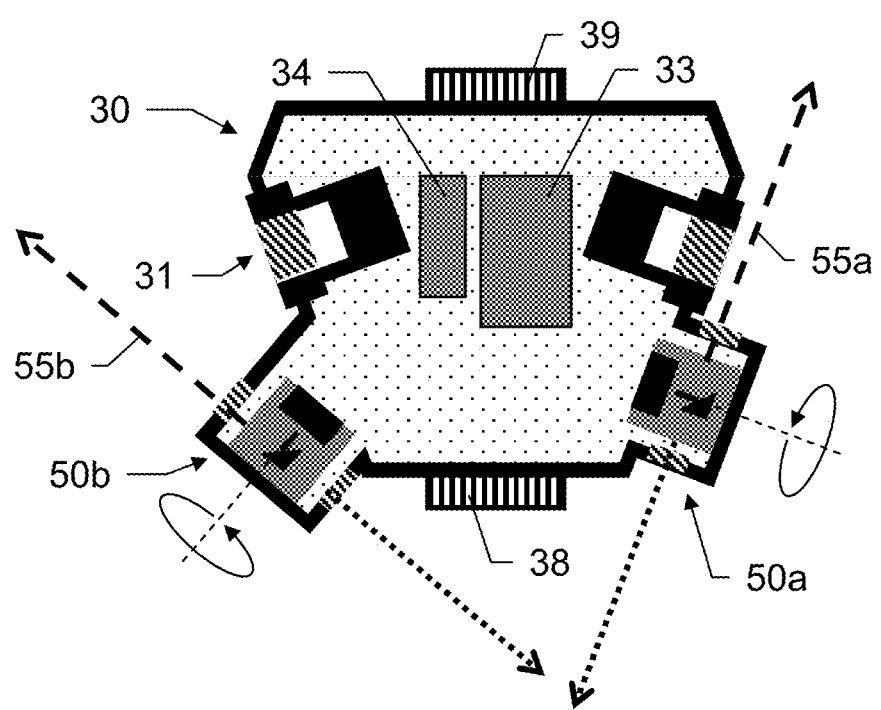

FIGS. 9a and 9b show an arrangement with two scanning units 50a,50b. The rotating beams 55a,55b of both of them span two tilted laser planes 56,56a (FIG. 9c).

The tilt angle influences the scanning resolution on the object, i.e. the density of the point cloud. On the one hand, an almost vertical plane scans the nearby ground in a (probably too) high resolution since the lever arm with about 2 m is quite short. Moreover, quite many rays are "wasted" since they are aimed to the sky. On the other hand, an almost horizontal plane does not cover the sky and the nearby ground at all. A combination of two scanning units where the rotation axis of one mirror is tilted by about 10° to 30° from the horizontal plane and the axis of the second mirror is tilted by about 10° to 30° from the vertical plane could lead to a improved distribution of the scanned points.

Figure 10A:
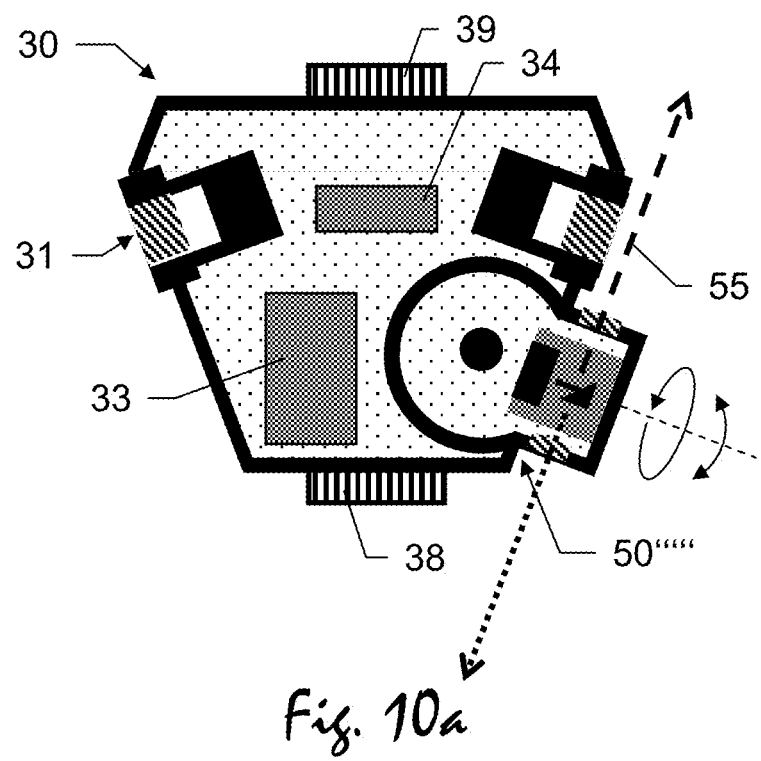
FIGS. 10a-b show a sixteenth embodiment of a camera module according to the invention having a scanning unit.
Figure 10B:
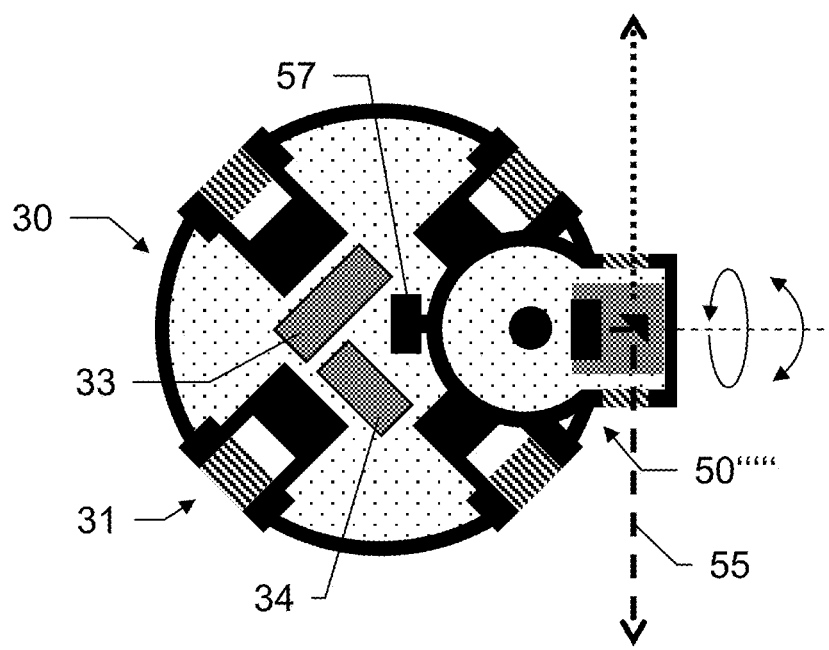

Alternatively, the vertical angle of the laser plane can be made adjustable (this is shown in FIGS. 10a and 10b). This enables the user to change the tilt angle according to his specific needs. The rotation can be continuous or there can be some predefined angles for high, medium and low. In the latter the scanning module clicks into the predefined positions.

Another problem that might appear in practice is the rotation of an (almost) vertical plane. In case the user walks with a constant velocity of 1 m/s in the direction of the rotation axis of the mirror and assuming a rotation rate of the mirror of 50 Hz, i.e. 50 revolutions per second the offset of neighbouring tracks on an object in a distance of 15 m are 2 cm. However, if the pole is rotated about the vertical axis with a rotation rate of 30°/s the offset between neighbouring tracks is about 16 cm. Consequently, such rotations whether intented or not may lead to an inhomogeneous point distribution.

In order to overcome this problem, as shown in FIGS. 9a and 9b, two scanning units 50a,50b which span almost vertical planes can be applied in such a way that there is a small horizontal angular offset of about 5 degrees.

Figure 9D:
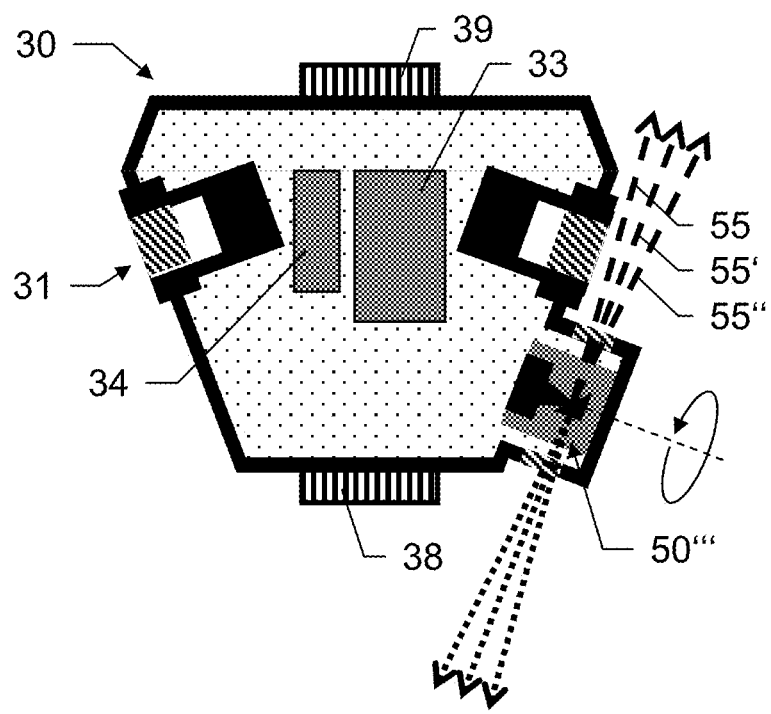
FIG. 9d shows a fifteenth embodiment of a camera module according to the invention having a scanning unit.
Figure 9E:
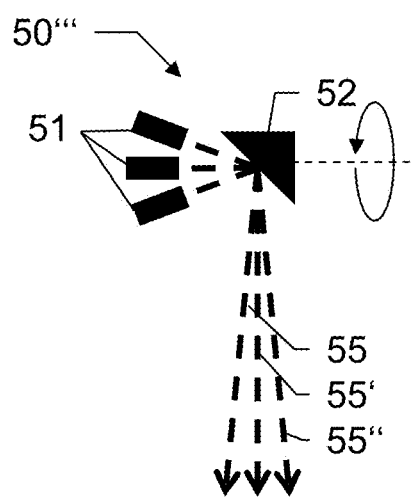
FIG. 9e-f show two exemplary embodiments of a scanning unit.
Figure 9F:
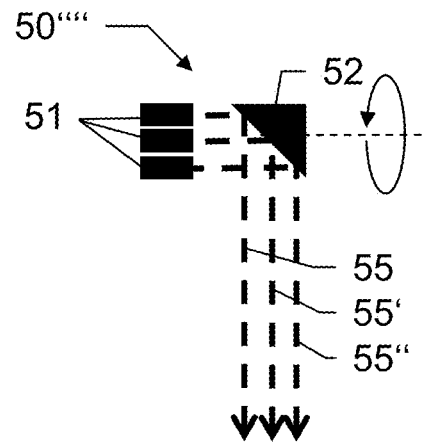

An alternative embodiment is depicted in FIGS. 9d-f: The scanning unit 50' comprises a plurality of laser emitting and receiving units 51. Thus, instead of one laser plane a fan of either diverging (FIG. 9e) or parallel (FIG. 9f) laser planes is generated.

Alternatively, as shown in FIGS. 10a and 10b, the scanning unit 50''' can be integrated into the camera module 30 in such a way, that an unintended rotation of the pole can be compensated by a rotation of the scanning unit 50''' into the opposite direction, in particular actuated by a drive 57. The rotation angle can be derived from measurements with the camera module 30, e.g. the angular rates from the IMU 34. The aim of the compensation can be that the azimuth of the laser plane is constant independently from the movements of the user.

Alternatively, with such a mechanism the scanning plane can automatically be aligned orthogonally to the walking direction of the user. The direction can for instance be derived from the state vector of the Kalman filter. There is the advantage that in case the user walks around a curve the plane follows this movement automatically.

Figure 10C:
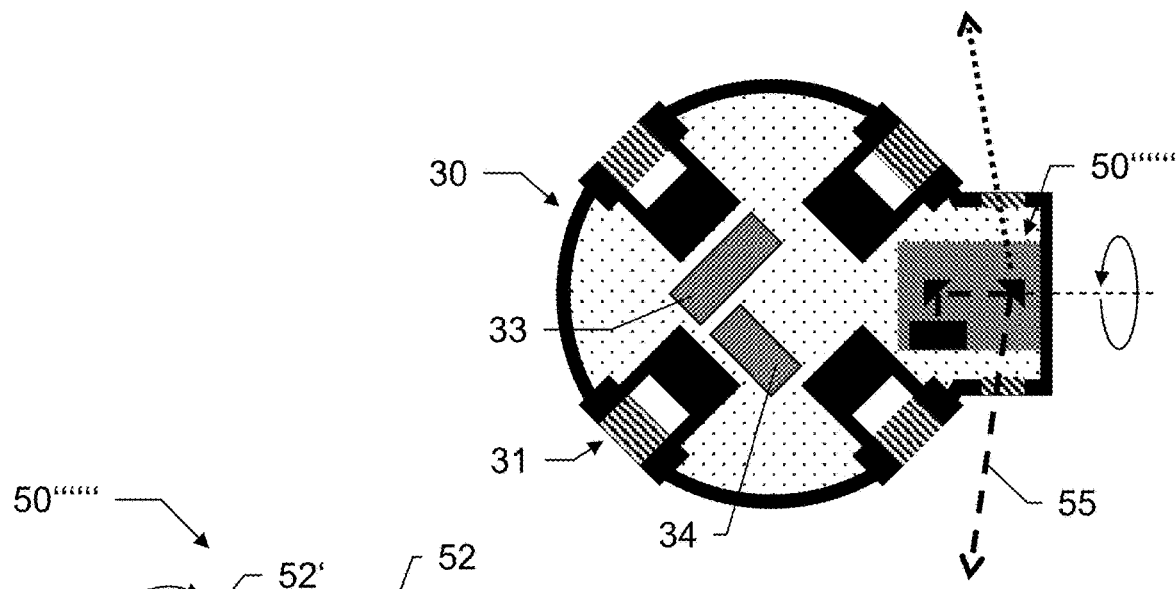
FIG. 10c shows a seventeenth embodiment of a camera module according to the invention having a scanning unit.
Figure 10D:
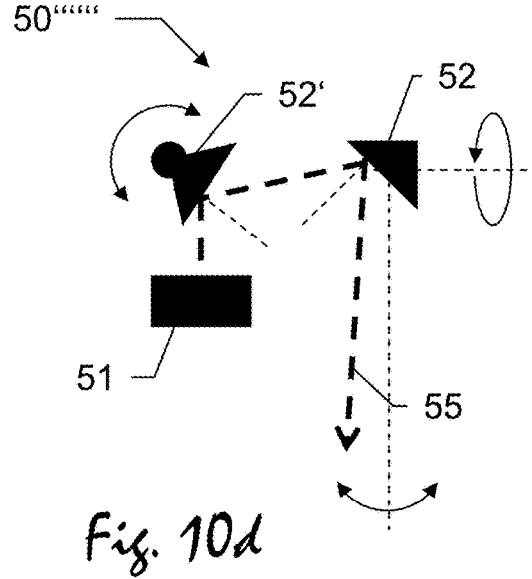
FIG. 10d shows the scanning unit of the camera module of FIG. 10c.

Alternatively, instead of rotating the whole scanning module, only the ray can be redirected by an additional oscillating mirror 52'. This is shown in FIGS. 10c and 10d.

Figure 10E:
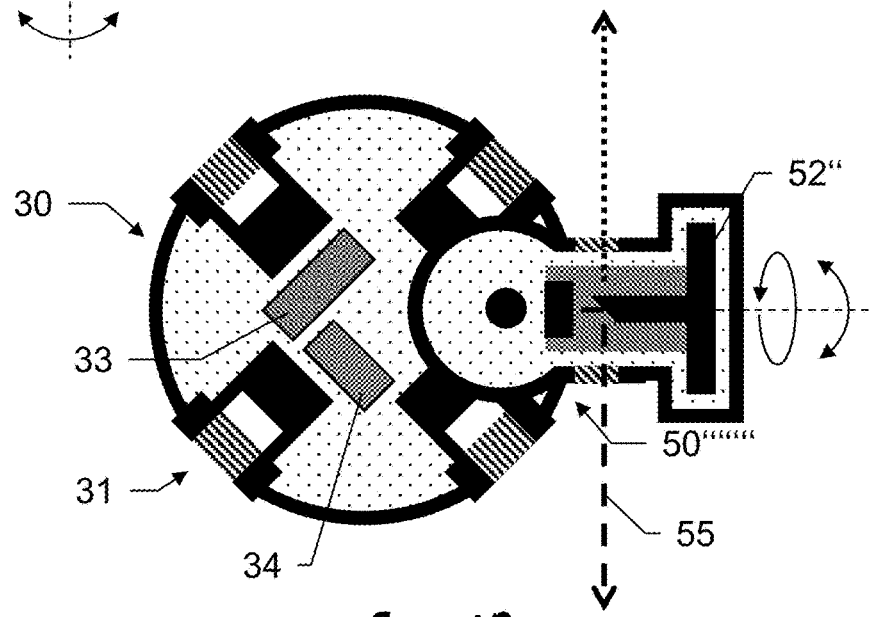
FIG. 10e shows an eighteenth embodiment of a camera module according to the invention having a scanning unit.

Alternatively, as shown in FIG. 10e, the stabilization of the laser plane, i.e. to keep the azimuth angle almost constant (smooth quick movements), can be also achieved by implementing the gyro principle. Here, a flying wheel 52" rotates together with the mirror around the axis to be stabilized.

Moving Objects

Figure 11:
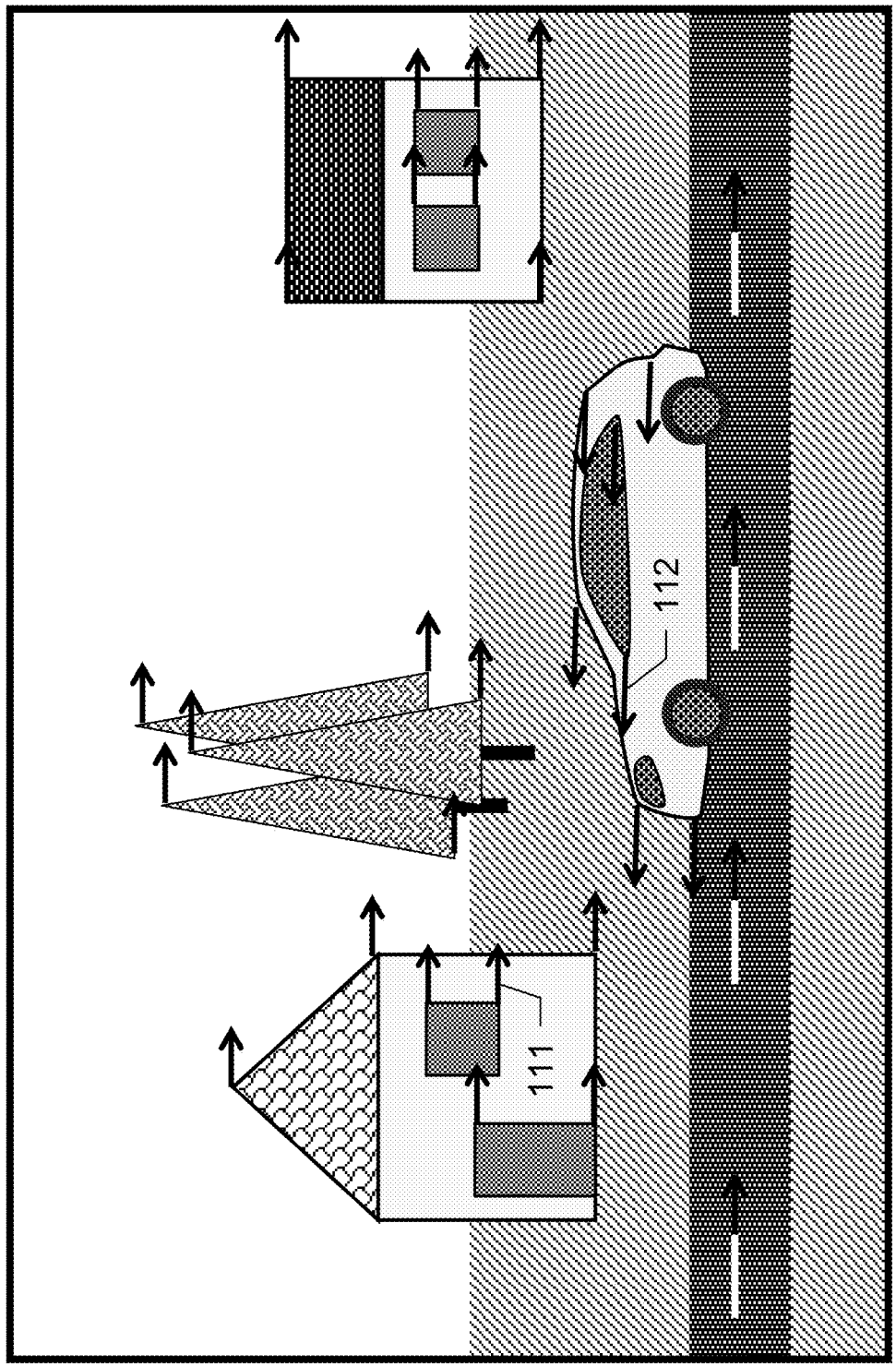
FIG. 11 illustrates a rotation of the camera to the left with a moving object in the image.

In FIG. 11, a rotation of the camera to the left is illustrated with a moving object in the image. During data acquisition also masking of different areas can be applied in order to remove undesired (here: moving) objects. This for instance include static objects relative to the pole like the surveyor itself as well as moving objects like pedestrians, cars and other non-static/relative static objects.

The masking can be done semi-automatically with user interaction or fully automatically. A possible scenario for user interaction guided processing is the exclusion of the surveyor in tracking feature points on the images, where the user, for instance, roughly masks the outline of itself on the image and its silhouette is recognized and subsequently tracked by an appropriate algorithm (e.g. standard segmentation algorithms, active contours or template matching).

A fully automated algorithm might detect interfering objects based on some motion estimation algorithms, e.g. optical flow, and reject the corresponding tracked features. For instance, as is shown in FIG. 11, a rotation of the camera to the left would result in an optical flow indicated by the displayed arrows 111. Although becoming more complex by more advanced movements of the camera, this vector field (optical flow) can be used to determine moving objects— indicated by the displayed arrows 112—within the image (e.g. by analyzing discontinuities or anomalies like inconsistent local changes) or even support segmentation or other image processing related algorithms.

Possible variants of different procedures might include interfering object detection independently on each image, initial detection and tracking, as well as global motion elimination. Additionally, in order to become more robust, the final algorithm for removing moving objects (or corresponding inconsistent feature points) might consist of a multi-step procedure, e.g. local and global motion estimation. Since global motion in this context refers to camera movement, there might also be some additional sensor information (e.g. GNSS or IMU data) used, to predict global movement and, subsequently, to stabilize the detection of moving objects.

The detection of corresponding (interfering) features can be carried out on the processing unit in the camera module. Particularly, if an FPGA is included in the processing unit parts of the feature detection can be computed very efficiently on the FPGA.

After the identification of corresponding features the poses of the images, i.e. position and orientation, are computed. This can be done for every image with a sufficiently large number of detected point features. However, particularly if the image data is recorded with high frame rate processing power can be saved by selecting a subset of images and determine the pose only for those selected images.

A criterion for the image selection can be the baseline, i.e. the distance between the current image and the previous one, e.g. a distance of one meter. Small baselines result in a bad accuracy of 3D points determined by forward intersection. Another criterion can be the image quality, i.e. only image with good quality (high sharpness, no under- or over-exposure, etc.) are selected.

Alternatively, the image selection can be based on a combination of image data, IMU data and GNSS data or any subset of these data sources. For example, the IMU could be used to select images that don't suffer from motion blur by considering the movement and especially the rotation during exposure. This has the advantage that blur-free images are selected even when the image content changes significantly. Different filters (e.g. baseline and motion blur) can be combined to achieve an optimal image selection leading to an optimal reconstruction of the scene using limited computational resources.

In case there is a combination of low resolution and high resolution cameras the low resolution cameras are mainly used for feature tracking in a high frame rate. The high resolution cameras need not to capture images in a defined frame rate, but can be triggered at specific times, e.g. low movement, e.g. sensed with IMU, or distance between current and last image (=baseline) of for instance two meters.

Figure 12A:
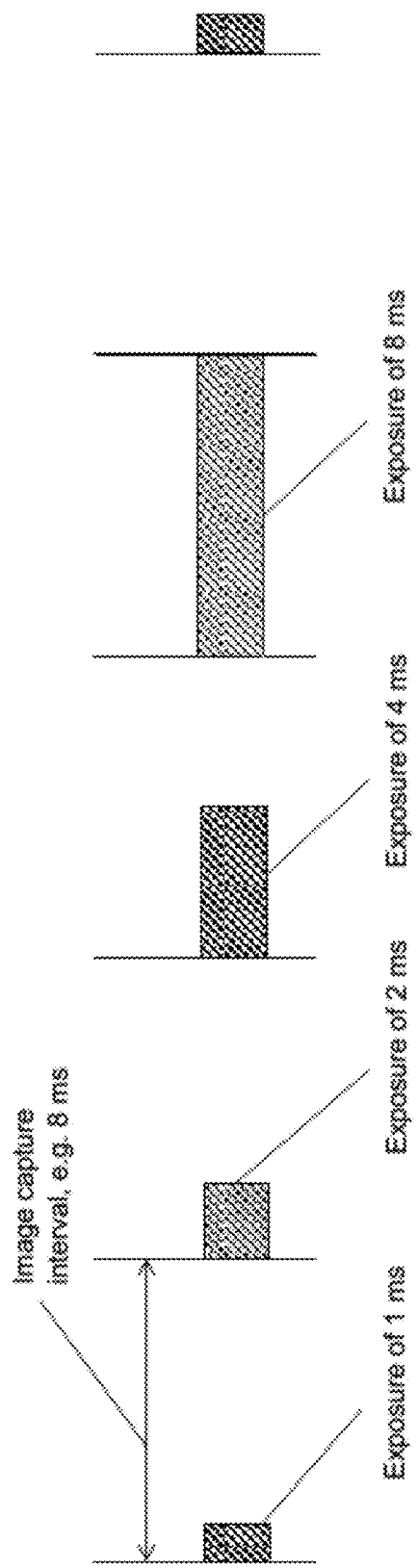
FIGS. 12a-c show varying exposure times for capturing images.
Figure 12B:
Figure 12C:
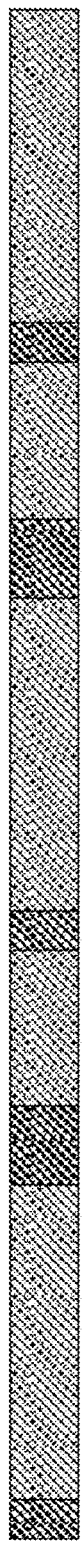

Moreover, images can be taken with varying exposure times, e.g. the images are taken with exposure times of 1 ms, 2 ms, 4 ms, 8 ms, 10 ms, 20 ms and so on. This is illustrated in FIGS. 12a-c. In a defined window around the optimal time for capturing a key frame the frame with good exposure is selected. In this case, as shown in FIG. 12a, the image acquisition interval can be regular, i.e. an image in an interval of 8 ms. Alternatively, as shown in FIGS. 12b and 12c, the image capture interval can be irregular.

Moreover, a HDR (high dynamic range) image can be generated based on a set of images captured with different exposure times. This can be done when the camera is held sufficiently still, which can be sensed with the IMU or GNSS or camera data or a combination of all. Alternatively, the camera can be moved and the offset determined with the structure-from-motion algorithm is considered in the generation of the HDR image.

In order to ensure data sets can be processed, there may be some direct user feedback during data acquisition. This feedback may include light indication (e.g. status LEDs), audio signals or force feedback (vibrating pole, smartwatches, vibration wristlet, smartphone, tablet, etc.). There might also be the option to directly visualize the current state of data recording, e.g. on a mobile phone, tablet or special glasses (interactive glasses).

Algorithm for Determination of Poses and Simultaneous Generation of Sparse Point Cloud For the derivation of a pole's six degrees of freedom, i.e. the position of the module and the orientation angles (roll, pitch, yaw) with respect to an outer/external (e.g. global) coordinate system a SLAM (simultaneous localization and mapping) algorithm can be applied.

The determination of the 6-DoF is based on measurements from the camera and optionally additionally position measurements from the GNSS system (and/or total station with retro-reflector). Moreover, accelerations and angular rates measured with the IMU can also be included into the determination of the poses (i.e. position and orientation with 6 degree of freedom; i.e. 6-dof).

The image data is analyzed for corresponding features (or corresponding/homologue image points), i.e. the position of the corresponding images of one identical object point 61 in several images. This is done using feature detection and matching algorithms such as SIFT, SURF, BRISK, BRIEF, etc. By identifying several corresponding features (or corresponding image points, also called homologue image points), several object points 61 are determined. These object points build up a reference point field, which can be used for each additionally gathered camera image as a reference, so that in each newly added image existing points of the reference point filed can be used to reference the image with respect to all previous images.

Hence, in each newly added image, again corresponding image points (in the added image and already previously existing images) are found/identified for object points of the already existing reference point field. And these found/identified image points in the newly added image are used (together with the previously determined coordinates of the according object points being represented by the found/identified image points) to determine the pose of this newly added image, by means of resection.

Furthermore, also in each newly added image again corresponding image points (in this added image and already previously existing images) are found/identified for new object points of the surrounding. And these found/identified corresponding image points in the newly added image and at least one "old" image (i.e. the positions of the corresponding image points in the newly added image and the old image) are used to determine coordinates of further object points by forward intersection, so that the reference point field is expanded therewith by the further object points. Hence, on one hand, for each newly added image the pose can be determined (based on resection using existing feature/image point schemes of existing object points of the already existing reference point field) and, on the other hand (logically simultaneously), with each newly added image the reference point field is also growing (based on forward intersection using newly identified corresponding features/image points of previously unknown object points of the surrounding).

Alternatively, in case of a video input, the correspondences (i.e. the corresponding or homologue image points or features) can be found using a tracking algorithm on each video frame, e.g. by applying the Kanade-Lucas-Tomasi (KLT) feature tracker. In the sense of this application, the term of "capturing a series of images with one or more cameras" includes generating image data by consecutively (e.g. following a defined timing, like one image per second, or following a defined spacing, like one image every half meter of movement) capturing/taking single images or by capturing a video frame.

Hence, in the SLAM-evaluation based on the corresponding features, simultaneously the poses of the images are derived and a point cloud (herein called "reference point field", which is a point cloud with comparatively low density (therefore also often called "sparse point cloud")) is built up and computed. This reference point field is at first instance only computed so as to determine the poses of the images (i.e. so as to determine and reference the positions and orientations of the image-pickups relative to each other), i.e. at least initially only for localisation purposes. The reference point field, thus, is a consecutively growing common reference frame for determining the poses. The reference point field usually does not comprise pre-known points of the surrounding.

Figure 13:
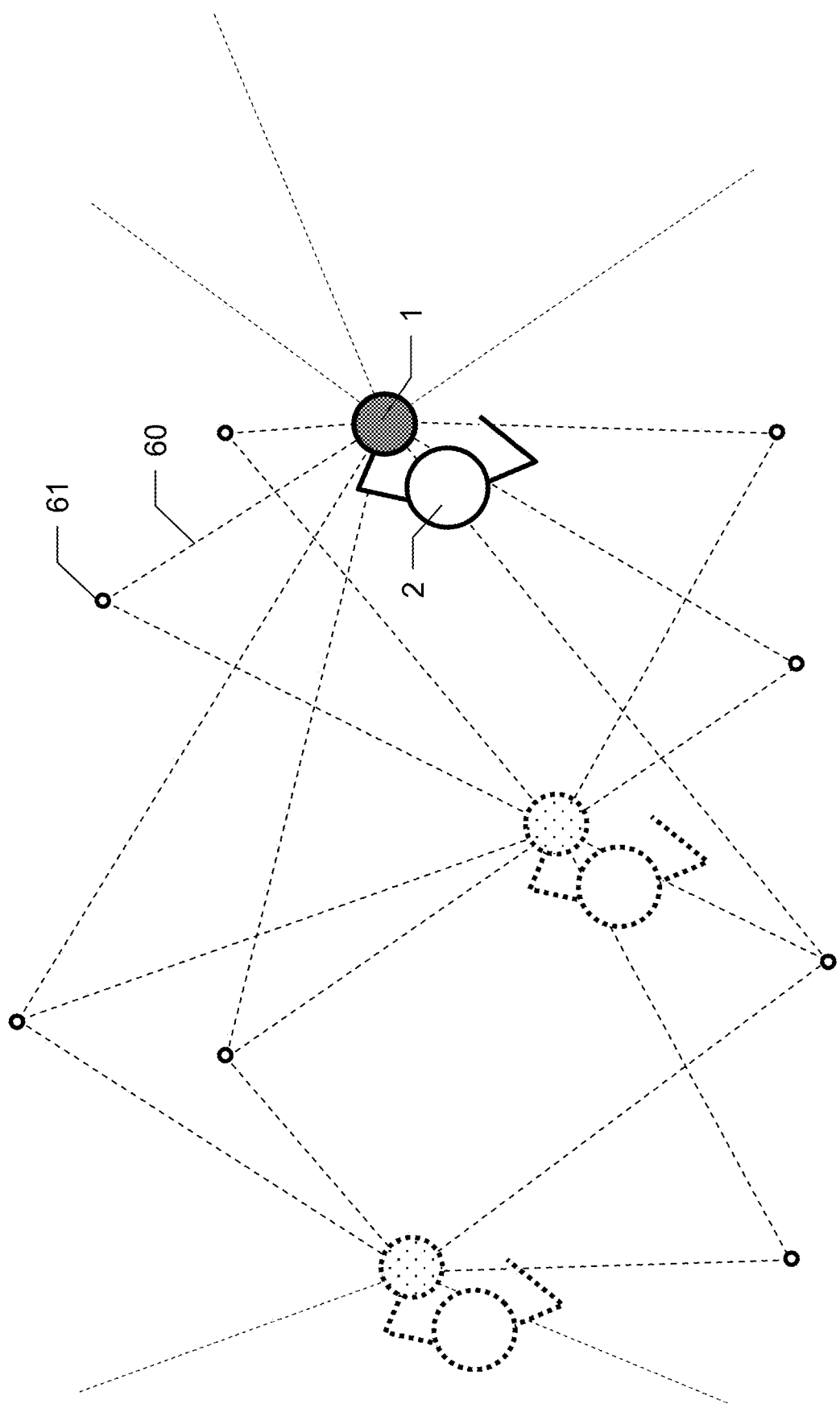

In a first step of the reference-point-field- and poses-determination, a relative pose algorithm is used to calculate the relative pose between two selected initial frames/images and an initial point cloud (i.e. a first part of the reference point field). Therein, IMU and/or GNSS data can be used additionally to determine the relative pose of the selected initial frames (so as to make the step of determining the poses more stable and/or more efficient). On the basis of the resulting point cloud (this first/already existing part of the reference point field) and the corresponding features detected in a third image the pose of the third image can be computed by resection. Then again, forward intersection is applied to refine the 3D coordinates of the features detected in all three images and to determine new 3D points which are detected in one of the first images and the third one. Consequently, with added image new 3D points might be reconstructed and the number of points in the point cloud (reference point field) is growing (FIG. 13).

Summary for the basic part of the algorithm:
Simultaneously
poses for the images are determined and
a reference point field is built up comprising a plurality of reference points existing in the surrounding by applying defined algorithm to the series of images, wherein a plurality of respectively corresponding image points are identified in each of several image sub-groups, each image sub-group containing at least two images of the series of images,
the poses are determined by means of resection using determined coordinates for reference points already added to the reference points field and image-positions of the corresponding image points representing said reference points and
reference points—each thereof being represented by identified corresponding image points—are added to the reference point field and coordinates for the reference points are determined by means of forward intersection using the image-positions of the corresponding image points and the determined poses for the images in which said respective corresponding image points appear.

Even further summed-up (with slightly other words):
A SLAM-evaluation with a defined algorithm using the series of images is performed, wherein a plurality of respectively corresponding image points are identified in each of several sub-groups of images of the series of images and, based on resection and forward intersection using the plurality of respectively corresponding image points,
a reference point field is built up comprising a plurality of reference points of the surrounding, wherein coordinates of the reference points are derived (basically from the forward intersection) and
the poses for the images are determined (basically from the resection).

As a final or intermediate step (i.e. after the basic algorithm has been carried out or in addition thereto), the overall solution (i.e. the built up reference point field (i.e. the derived coordinates of the reference points) and the determined poses, and optionally also the determined image-positions of the corresponding image points in the images), can be refined using bundle-adjustment. This algorithm is a non-linear least squares minimization of the re-projection error and optionally also the GNSS measurements. It will optimize the location and orientation of all camera poses and all 3D points of the reference point field in one step.

Bundle-adjustment can be triggered by the user when he is using the pole to measure individual points, i.e. in traditional GNSS pole mode. Bundle-adjustment is then used to refine the location and orientation of the pole during the measurement to provide the user with an optimal estimate for the position of the tip during the measurement.

Alternatively, image data, IMU data and/or GNSS data can be used to detect if the pole is held steady in one position. Bundle-adjustment is then triggered automatically. When an optimal—bundle-adjusted—result is available this is indicated to the user through e.g. a green light. The user can then immediately read out an optimal estimate for the position of the tip upon triggering a measurement.

If GNSS data is available—which might not always be the case—the position can be used in the resection of a new camera pose or in the computation of the relative pose the initial image pair. For the computation of a new image pose the detected feature positions in the image and the GNSS position are combined in the resection algorithm. Particularly, the accuracies of the measurements, e.g. 1 px for the feature measurements and 3 cm for GNSS positions, are considered and the measurements are weighted accordingly.

The combination with GNSS data leads to the generation of a geo-referenced and scaled point cloud by the SLAM algorithm. Moreover, since GNSS delivers positions with good accuracy on a global scale, the positions counteract the error accumulation and the resulting drift which might appear in SLAM based on image measurements only.

However, if a basic point cloud is already generated, the resection also works if no GNSS signal is available by image data only. This might be the case when the operator stands very close to a façade and most GNSS satellites are covered by the building. The 6-DoF are then derived by resection of the camera pose based on the existing point cloud.

Alternatively, other SLAM or Structure from Motion algorithms can be used for the 6-DoF determination of the pole.

Moreover, if no GNSS position is available and the position is derived from image data, particularly in combination with IMU data, the derived position can be feed back to the GNSS module for a fast reacquisition of the fix for the GNSS position.

Alternatively, when applying the camera module 30 shown in FIG. 2b to a reflector 16, instead of GNSS data also positions measured with a total station can be used. Here again, if a basic point cloud is already generated, the pose of the module can be determined also when the line-of-sight between total station and reflector is interrupted.

In the combination of GNSS data with image measurements the offset between the antenna centre and the camera module has to be considered. This offset might be known from the mechanical design or derived by calibration. When multiple cameras are used, their relative poses have to be calibrated or derived from the design as well. Calibration can be done by the manufacturer or by the user in a specially designed procedure using e.g. a well textured area (reference pattern) being capturable be the camera to be calibrated. A defined relative spatial relationship between the pattern and the camera is pre-known. The calibration can also be fine-tuned in the bundle adjustment (self-calibration).

Furthermore, the data from the inertial measurement unit (IMU), i.e. accelerations and angular rates, can be included in the determination of the six degrees of freedom. Since the accelerometer senses the gravity vector, the tilt of the camera module, i.e. the roll and pitch angle, can be directly determined from the IMU data. The horizontal orientation of the pole, i.e. the yaw angle, can be derived from a comparison of the position offset based on the double integration of accelerations with the position offset derived from the GNSS positions. Alternatively or additionally, a magnetometer could be used to determine the yaw angle.

The combination of the sensor data can be carried out by a sensor fusion algorithm, e.g. a Kalman filter, a particle filter etc.

For the sensor fusion it is important that all the measurement data refer to a common time basis. This can be achieved by a synchronized data acquisition, i.e. one sensor triggers all the others, or by assigning a time stamp to each measurement.

Knowing the length of the GNSS pole and its pose with respect to a superior, either local or global coordinate system, e.g. WGS84, the coordinates of the tip point can be derived. In practical surveying this has the advantage that the operator does not have to level the pole anymore after he places the tip point onto the measuring point. Because of the reduced time needed for measuring a single point, this has a positive impact on the productivity of the operator performing the measurement job.

Dense Matching

Dense matching has the goal to determine a dense point cloud, i.e. a 3D-coordinate for each pixel or a subset, e.g. on a regular 3×3 grid, i.e. for every 3rd pixel in row and column direction, in the original images. The algorithm consists of two major steps.

First, for all overlapping cameras a disparity map is computed. This map contains the offset of a pixel in two images, i.e. the shift to be applied to a pixel in the first image to end up at the position of the corresponding point in the second image. There are multiple ways to compute these maps, correlation techniques, e.g. Semi-Global-Matching, etc.

For each pixel in the disparity map a confidence value can be obtained and used in the further processing, e.g. for adaptive weighting of the measurements.

Second, using this set of disparity maps 3D points are computed by forward intersection. Knowing the pose of the image rays 60 from the projection centers through the corresponding pixels are set up. The 3D coordinates of the object point results from the intersection of these rays. In principle a minimum of two rays is needed for the intersection of a 3D point. However, in practice as many rays as available are used in the forward intersection.

Identifying the image points (reference points) and determining poses for images based on the identified image points (particularly computing a point cloud based thereon) is a be understood as a form or at least part of a dense matching process.

For the forward intersection least squares adjustment can be applied. Here, the 3D coordinates of the points are determined by minimizing the deviations—actually the squared deviations—between the point and all the rays. Based on the geometry and the resulting deviations, i.e. the remaining residuals, the quality of the intersection can be derived by computing the variance-covariance matrix and, furthermore, an estimate for the standard deviation of all three coordinates of the 3D point.

Figure 15A:
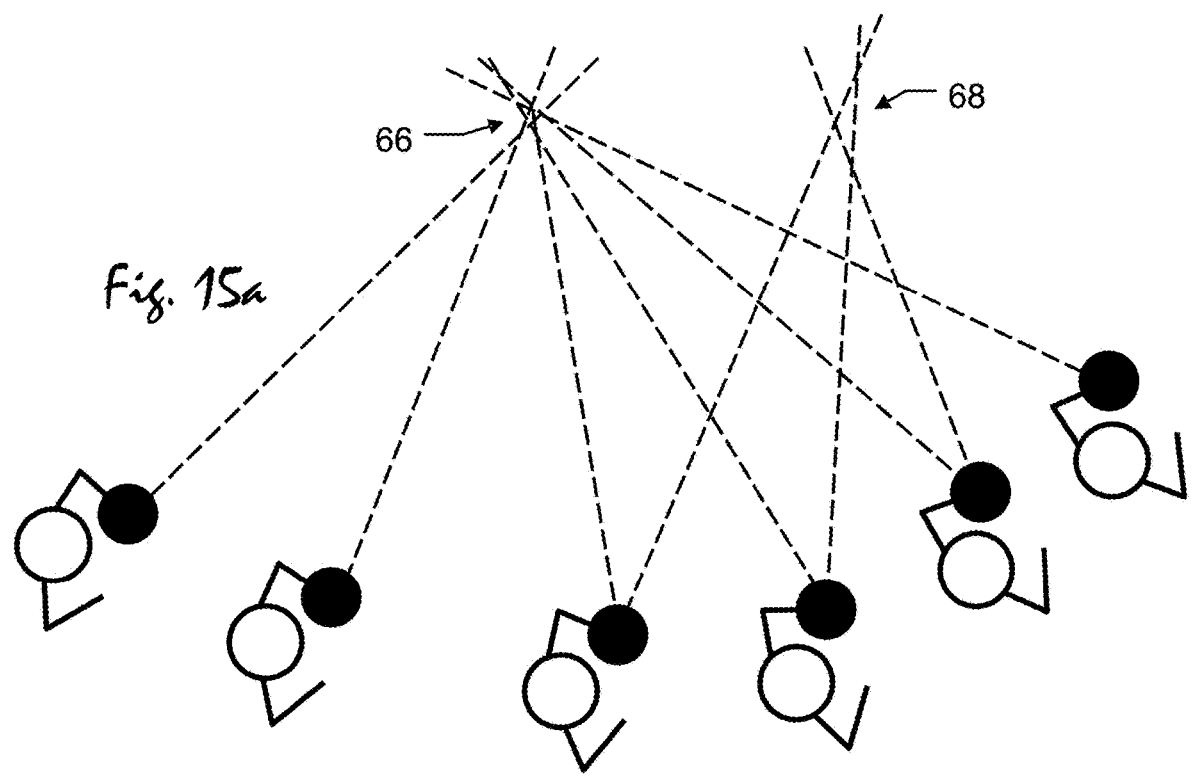
FIGS. 15a-b show resection based on reference points in a surrounding while moving with the camera module (pole)

This is shown in FIG. 15a, where a "good" intersection 66 of six rays leads to a small uncertainty and a "bad" intersection 68 of three rays leads to a large uncertainty, particularly for a single point or a respective region of points.

A quality indicative output concerning the quality of at least one of the computed points of the point cloud as described above may be based on such computation.

The final point cloud can be filtered using several criteria on the measurement quality. This includes the number of images where the point is observed, i.e. the number of rays used for the intersection, the baseline between the cameras which defines the geometry of the intersection, a measure for the consistency of all the measurements, etc.

Figure 15B:
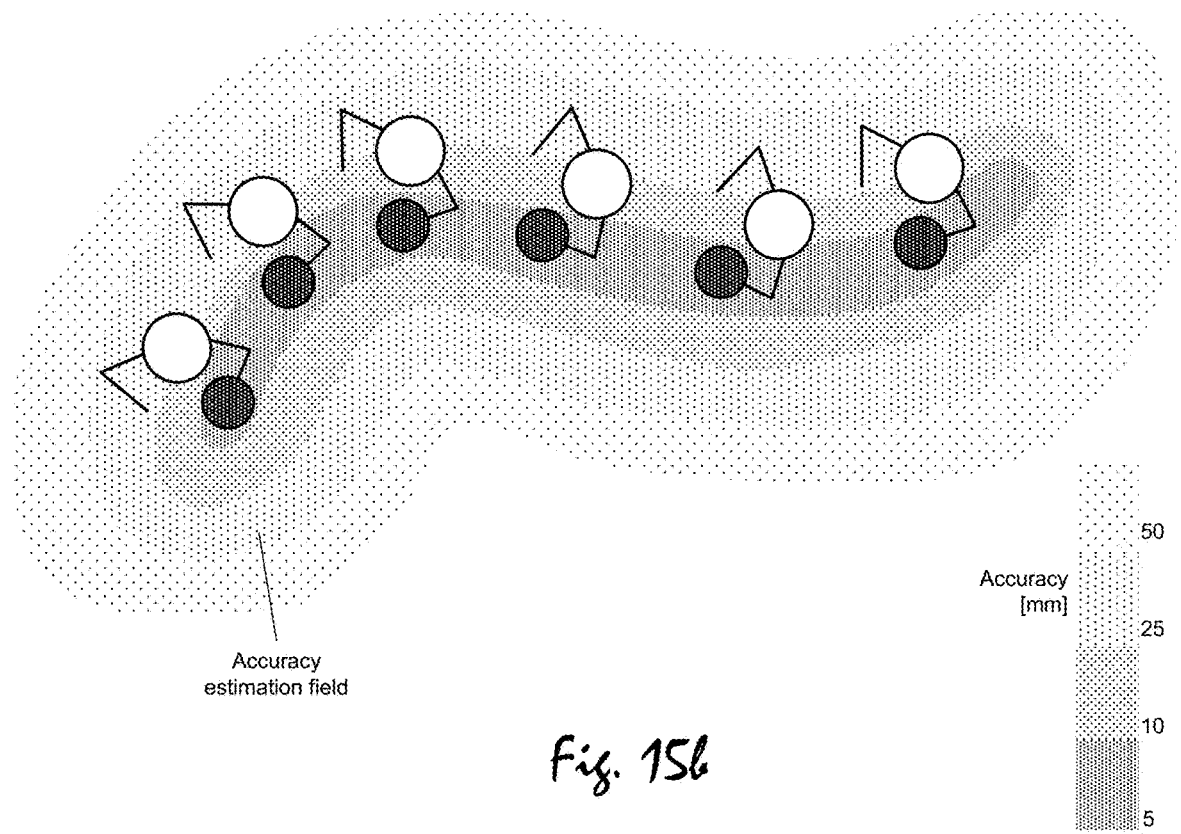

Alternatively, a quality indicator can also be computed for an actually travelled path and actually acquired series of imaged (and also for a planned path with a planned capturing of images) solely base on pre-known circumstances like intrinsic factors (camera resolution, etc.) and general extrinsic factors (distance to camera, etc). In this case, a computation for the position of at least one point (and a consideration of a degree of intersection of the rays within the forward intersection) would not be necessary to for this estimated quality indicator. FIG. 15b shows a visualisation of accuracy bounds (i.e. an accuracy map) based on an estimated reachable quality for the determination of 3d-positions in these regions. Points lying close to the planned or travelled trajectory have a higher estimated accuracy/quality and points of the surrounding lying farther from the planned or travelled trajectory have a lower estimated accuracy/quality.

Alternatively, other algorithms, e.g. plane sweeping, can be used to determine the dense point cloud.

For the measurement of a single point the operator places the tip point of the pole on the measuring point. Contrary to this, the measurement of a dense point cloud is dynamic, i.e. the operator just walks around collecting data, i.e. image data, position data from GNSS or a total station, IMU data, etc.

The user simply walks through the area to be mapped. During the movement the system records the image data, e.g. 15 frames per second, the GNSS positions and the IMU data.

The sensors are either synchronized, e.g. triggered by a master sensor, or a time stamp is assigned to each measurement.

De-Blurring

A further inventive aspect is to de-blur images of the acquired series of images after computing "SLAM" (or as also called "Structure from Motion SfM").

It is known that—in images taken with a camera being in motion—a motion blur may appear in the images. Therein, in general, objects of the imaged scene/surrounding being farther from the camera have a lower relative motion with respect to the camera (i.e. the relative motion being effective for the image-pick-up) and objects of the imaged scene/surrounding being closer to the camera have a higher relative motion.

From the SLAM algorithm (particularly additionally with the aid of IMU data and/or GNSS/TPS position measurement data), a 3d-trajectory for the camera can be derived for the path travelled during acquisition of the series of images.

Also, a sparse point cloud for the scene/surrounding (i.e. the positions of the reference point field for the surrounding extracted and used to derive the poses for the images) is also already determined from the SLAM algorithm.

Based on this sparse point cloud (i.e. more generally spoken: depth information or a depth map for the scene/surrounding basing on the determined sparse point cloud) and based on the motion of the camera during acquisition of each of the images, a motion de-blurring can be performed in the images by image processing.

Therein, imaged objects having been closer to the camera during acquisition of the image are applied with a comparatively higher degree/stage of motion de-blurring and imaged objects having been farther from the camera during acquisition of the image are applied with a comparatively lower degree/stage of motion de-blurring.

After de-blurring of images of the acquired series of images, the newly generated imaged by de-blurring, which can be referred to as de-blurred images, can then substitute/replace the corresponding un-de-blurred images of the series of images.

In case all images of the series of images are de-blurred, these de-blurred images can then constitute the series of images (i.e. then comprising only de-blurred images).

In case only a portion of the images of the series of images is de-blurred (substituting—in the series—the corresponding/counterpart un-de-blurred images belonging to the series before de-blurring), the series of images can then consist of de-blurred images and un-de-blurred images.

In the following, these newly or refreshed series of images then containing at least also some de-blurred images (or only de-blurred images) can be used for several purposes:

a) re-performing the SLAM-evaluation by using the refreshed series of images (comprising de-blurred images), i.e. resulting in re-calculated positions for the reference points of the reference point field (i.e. a re-calculated sparse point cloud) and re-calculated poses for the images.

Therein, due to the fact the features to be identified in the images, which represent the reference points, can be located in the images with higher accuracy/higher robustness and less measurement uncertainty (due to lower degree of blur in the images after de-blurring), both the positions of the reference points and the poses for the images can be determined more accurate and with less measurement uncertainty.

b) calculating a dense point cloud for the surrounding (i.e. performing the dense reconstruction or meshing) with higher accuracy and less measurement uncertainty.

Therein, either the refreshed/de-blurred series of images (comprising de-blurred images) can directly be used for the dense reconstruction. Or the step described under point a) above (i.e. re-performing the SLAM-evaluation with the refreshed series) can be prefixed and then—basing on the already re-calculated poses by performing step a) above—the dense reconstruction can be performed using the de-blurred series and the already more accurately determined poses.

This results in a higher accuracy for the determination of the dense point cloud due to the fact that in de-blurred images the identification and localisation of corresponding image points in the images (belonging to identical scene points) can be performed with higher robustness and higher precision. Hence, also the forward intersection using the identified and localized image points reveals the position of the scene point with higher accuracy/less measurement uncertainty.

Also, a higher density for the determination of the dense point cloud is achievable due to the fact that in de-blurred images more corresponding image points in the images (belonging to identical scene points) are identifiable.

c) calculating a position of single points of the surrounding (hereinbefore and -after also called "remote point measurement") with higher accuracy and less measurement uncertainty.

Analogue to the calculation of a plurality of points (i.e. a dense point cloud for the surrounding), also positions for single points can be determined with higher accuracy and less measurement uncertainty by using the refreshed/de-blurred series of images (and optionally also the already re-calculated poses).

Summed up, using de-blurred images, SfM-/SLAM-evaluation on de-blurred images can provide for better results regarding the determination of the poses and the sparse point cloud, as features will be located with higher precision (and more features may be located) due to the higher contrast in the images. If the SfM is more precise, then further steps will provide better quality (dense reconstruction, meshing). But also without a refreshed SfM-/SLAM-evaluation in prefix, the dense reconstruction can be performed with at least somewhat higher quality by using the de-blurred images compared to the scenario of using un-de-blurred images.

Orthophoto

Figure 16A:
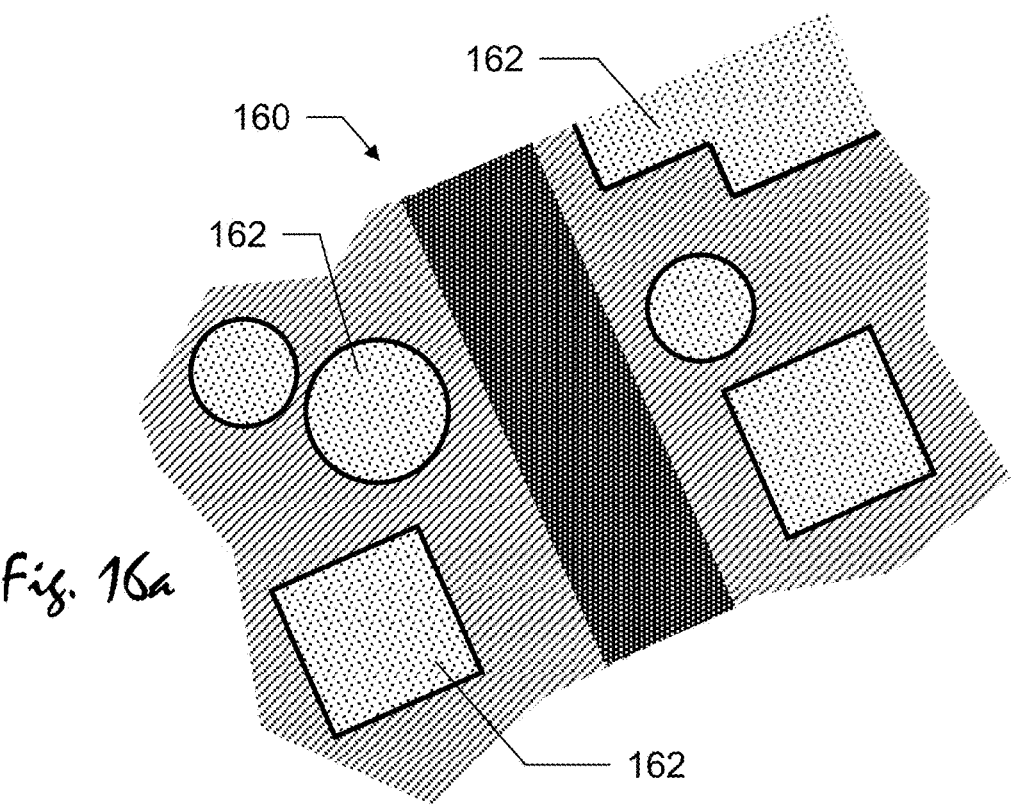
FIGS. 16a-b illustrate an exemplary embodiment of a matching of an orthophoto generated by the surveying system and a reference orthophoto.
Figure 16B:
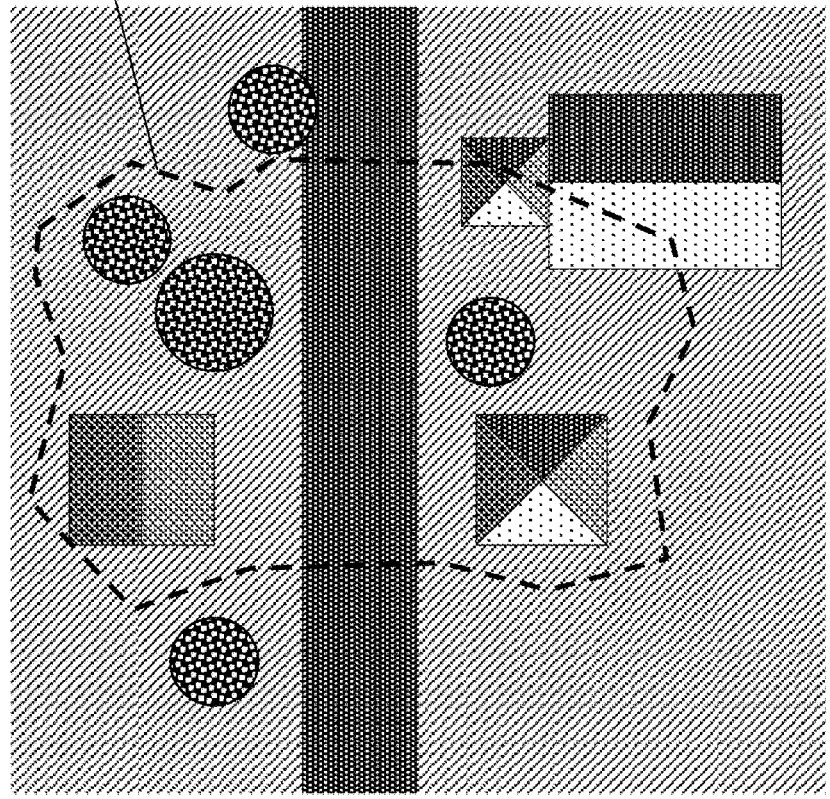

In the FIGS. 16a and 16b an exemplary embodiment of a matching of two orthophotos is illustrated, wherein one orthophoto 160 is generated by the surveying system according to the invention and one is a reference orthophoto 165, for instance an aerial image. The term orthophoto here is understood as meaning a "true" orthophoto having an orthographic view, i.e. relief and tilt have been adjusted in order to orthorectify the image.

Since the cameras may be looking downwards, or have a sufficient field of view, the ground plane will be visible. Together with a known distance to the ground, camera locations and orientations, the images can be projected to the ground plane. By using many images from different directions, one large composite image of the ground plane can be computed. Due to the texture foreshortening (perspective effect, when cameras are looking at a certain angle to the ground), the method described in the paper "Analysis-by-Synthesis Texture Reconstruction" (Liefers, Parys, Schilling, 2012) can be used to obtain a high quality texture for the ground plane. The generated orthophoto can be registered to a georeferenced aerial image in order to localize the measurements in the geographic coordinate system. In the following paragraphs, the workflow is described in detail.

The processing of the camera poses and the dense matching, i.e. the generation of the dense point cloud can be carried out on the processing unit as part of the camera module. Alternatively, the processing can be carried out on a controller (data logger) or the processing unit of the GNSS antenna which are connected to the camera module, either by a cable or via radio, Bluetooth, WiFi, etc.

Moreover, the data can be transmitted to a dedicated cloud server which is connected to the internet. The data can be transmitted directly from the camera module or via the controller or via the GNSS antenna.

Alternatively, the server can be installed in a vehicle, e.g. a car which is located close to the surveying area and communicate with the pole through a local telecommunications protocol such as Bluetooth or WiFi.

Alternatively, the server can be temporarily or permanently installed on site e.g. in a construction shed and communicate with the pole through a local telecommunications protocol.

Preferably, the transmission of the data and the processing on the cloud server starts immediately after the recording is started. In this case the processing is carried out in parallel to the data acquisition in the background which helps to keep the latency of the result short.

Alternatively, the system can include a second processing unit which is together with a power supply, e.g. batteries, carried by the operator in a backpack. The second processing unit may be equipped with a graphical processing unit (GPU) which enables massive parallel processing of the image data. Particularly, the second processing unit can be a standard portable device such as a powerful laptop, tablet computer or smartphone. The second processing unit may communicate with the pole through cable or a local telecommunications protocol.

Moreover, a combination of processing on the processing unit of the camera module, the processing unit of the controller or the GNSS antenna and external processing units such as a cloud server. For instance, the synchronized recording of the data can be carried out on the processing unit included in the camera module. Also, a pre-processing of the image data, e.g. the feature extraction or some basic image processing algorithms, can be carried out on this processing unit. The SLAM algorithm which results in the poses of the images and the coordinates of a sparse point cloud can be performed on the processing unit of the controller. The resulting camera poses and the images can then be transmitted to a cloud server where the dense matching is performed.

The results after processing can be
 a point cloud, particularly a colored point cloud;
 a surface model, particularly a textured surface model;
 an orthophoto, particularly of the ground or a façade; or
 a set of salient points, e.g. corner points, automatically derived from the point cloud.

For a completeness check the operator should receive already in the field a preview model shortly, e.g. a few minutes, after the data acquisition is finished. Based on this preview model the operator can decide whether he captured the measuring areas completely or whether some parts are uncovered. In the latter case the operator can take some additional measurements in the uncovered area to increase the level of completeness.

The completeness check can be augmented with contrast analysis of the images in order to detect areas that are missing and for which it is unlikely that they will be reconstructed (uniform surfaces). This would save time of the user trying to reconstruct this kind of areas.

The decision can be done by the operator on the basis of a visualization of the preview model, e.g. a 3D visualization. Alternatively, the visualization can be 2D as a map view, to present the user with a quicker and easier-to-understand view of the model compared with 3D models which are difficult to interpret and navigate for inexperienced users. Particularly, the missing parts are high-lighted. Moreover, the system can guide the operator to the area of missing measurements.

The preview model should be available shortly after the data acquisition is finished. In order to save time, e.g. for data transmission and processing, the preview model may have lower resolution than the final model, e.g. a point resolution on the object of 10 cm. This can be achieved by performing particularly the dense matching on images with lower resolution, e.g. after a reduction the image resolution from 1920×1080 pixels to 320×240 pixels.

In case of limited bandwidth, if the processing is carried out on a cloud server the reduction of the image resolution is carried out before the data is transmitted. Moreover, the image data can be compressed before they are sent to the processing server. Therein, the compression of image data can be carried out in a lossless way (i.e. a lossless data compression can be applied, without reducing the quality/resolution of the images) or in a lossy way (i.e., depending on the needs and circumstances of a particular situation, also a lossy data compression can be applied, including a reduction of the quality/resolution of the images).

Moreover, the data can be reduced (areas of very low contrast do not need to be transmitted) using sparse image representations.

By matching the computed orthophoto to the reference aerial image, additional location information can be derived. This can be used as the only source of geo-location or can be coupled with GNSS or prism-based terrestrial measurements in order to improve geo-location accuracy.

After the whole scene is captured, the SLAM algorithm is executed on the dataset. The structure from motion can use partial GNSS data, however this is not required. After computing the external camera parameters, the orthophoto generation algorithm is executed. This algorithm works as follows:

1) The points belonging to the ground surface are determined. This can be done using IMU to get the vertical orientation vector and detect planar surfaces that are perpendicular to this vector. Alternatively, movement directions from SLAM are used to estimate the vectors that are perpendicular to the ground.

2) After the ground surface determination, the points belonging to this surface are triangulated, for example using 2D Delaunay triangulation. Alternatively, a set of planes is fitted to the ground surface. Alternatively, the ground surface points are filtered before fitting planes or triangulating the surface.

3) Texture generation for the ground surface (now defined as a set of planes or triangles) is performed. Depending on the quality requirements, the texture can be obtained by colouring the surfaces from the point cloud. Alternatively this can be done by back-projecting the images using the determined camera projection matrices. In the most demanding case, where the highest texture quality is required, the Analysis by Synthesis approach is used. This works by back-projecting all captured images to the ground surface, averaging the colour contributions on the ground surface, then projecting the parts of the ground surface back to the cameras and computing the difference images between the captured images and projected ground surfaces. Then the difference images are back-projected to the ground surfaces, the colours are accumulated, to compute new improved textures of the ground surfaces. The process is repeated then in a loop. This allows reconstructing a high quality texture even from mages with high perspective distortions, where the ground surface is extremely foreshortened.

4) The textured ground surface is then projected onto a ground plane in order to obtain the orthophoto that can be matched to the geo-referenced orthophoto created from aerial images.

5) The camera positions are known with respect to the generated orthophoto in a local coordinate system. The generated ground image is then registered with the georeferenced aerial image using purely image based methods. The camera positions then can be computed in the geographic coordinate system, and the point cloud can be then transformed to the geographic coordinate system.

In some applications interactive geolocation without GNSS signal may be required. The following method then can be used:

1) During the data capture, only local texture is computed from a very limited number of frames. This requires running the SLAM on a possibly small subset of cameras in order to discover their relations to each other.

2) The local texture is then registered to the aerial image using image based methods (for example, feature matching)

3) The position of the camera and a model scale then can be determined from a few local cameras and the registration of a local ground texture to the aerial image.

This approach can be used for an interactive visualization of the camera position on the map on the local device's screen. The local SLAM computations may be joined and optimized for a good fitting together in order to find relations between different sub-reconstructions with SLAM.

In the case of the GNSS available, the method can be used to create a geo-referenced orthomap for use in other applications without the need of renting a plane or a UAV.

FIG. 16a shows an example orthophoto 160 generated from the images acquired at the ground level. As it can be seen, those areas 162 not captured from the ground level, such as building roofs or tree tops, are not present. FIG. 16b presents an example reference orthophoto 165 from a geo-referenced aerial image. Those two images have a different scale and orientation. By using matching of scale and rotation of invariant features the generated image can be transformed to match the scale and rotation of the reference aerial image (the borders of the orthophoto 160 from FIG. 16a are represented by the outline 166). This transformation is then used to bring the point cloud and positions of the measurement instrument to the coordinate system of the reference image 165.

Pole-Based Scale Derivation

Figure 17:
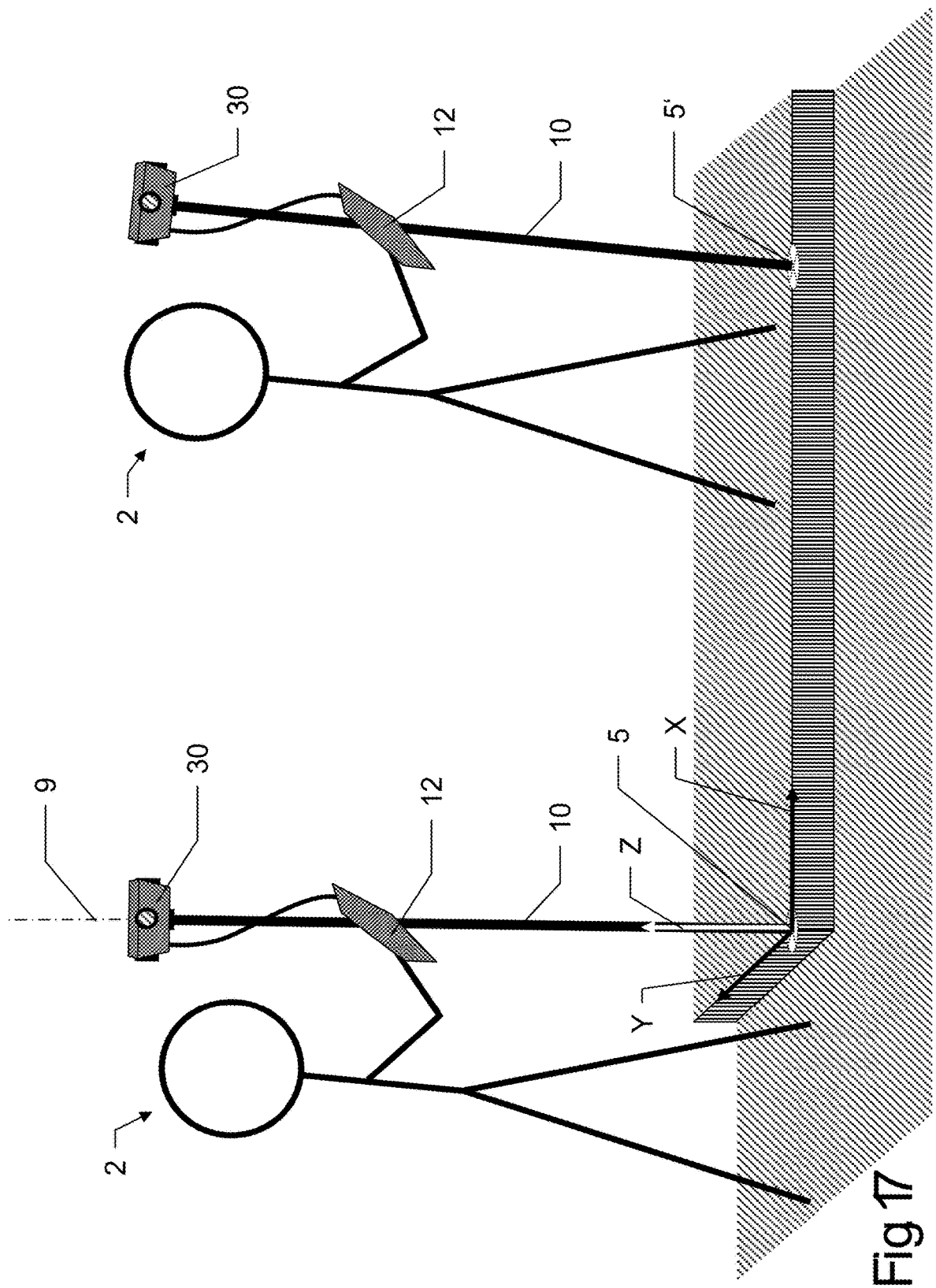
FIG. 17 illustrate an exemplary embodiment of an orientation determining functionality.

The camera module can also be used without being combined with a GNSS system or a total station, in particular in applications where no absolute geo-referencing is needed. This is illustrated in FIG. 17.

Disadvantageously, a 3D reconstruction without GNSS or total station might have an arbitrary scale. A state-of-the-art solution of this task is to use reference points with known 3D coordinates. These points are measured manually or automatically on the images. Their 3D coordinates are determined using additional measurement unit (e.g. with a total station). Alternatively, a scale bar could be used which is automatically identified in the image data.

Alternatively, a method with the following steps could be used to determine the scale:

1) The height of the camera module 30 which is mounted on a pole 10 is measured.

2) A user 2 starts recording images with a pole 10 standing on the ground.

3) A user moves along the object and records images.

4) After the data processing, a dense point cloud of the object in arbitrary scale is reconstructed. A height of the camera module above the ground is determined in the reconstructed point cloud for the first image.

5) A scale is computed by comparison of heights determined on the steps 1 and 4.

To improve an accuracy of scale computation, a user 2 could put the pole 10 onto the ground more than one time during the survey. The user could press a button on the pole to indicate the moment when the pole 10 is standing on the ground. Alternatively, this moment might be determined automatically based on comparison of sequentially recorded images or IMU information.

The whole reconstruction is done in an arbitrary oriented coordinate system. However, the user is able to define a local coordinate system by the following procedure:

1) The user 2 places the pole 10 on the ground and orients the pole vertically using an integrated bubble. After the user presses a button on a device which defines this point 5 on the ground as an origin of the coordinate system XYZ, by default the first point 5 of the whole survey is considered as an origin. The vertical axis Z of the coordinate system is defined by a current orientation of the pole 10 relative to the plumb line 9.

2) For the definition of the horizontal orientation of the coordinate system a user 2 places the pole 10 in arbitrary orientation on a second point 5' onto the ground. A vertical orientation of the pole 10 is not important in this case. A vector from the origin of the coordinate system to this second point defines the horizontal orientation, e.g. the x-axis of the coordinate system.

The user could place the pole 10 on significant and marked points to be able to set the same coordinate system XYZ in the future (e.g. later in another survey).

The height computation of the camera module 30 above the ground could be done manually or automatically in the reconstructed point cloud. In the first case, a user selects points which belong to the ground. In the second case a height is extracted based on assumption that the pole 10 is oriented vertically.

Alternatively, the height computation could also be performed in the meshed surface model.

Loop Closing

Optionally, the GNSS data in combination with a panorama camera can be used to extend the standard SLAM approach in a new way. GNSS data can be used to select two frames recorded at roughly the same position but at different times. This happens when the user crosses his own path or takes the same path multiple times. Because a GNSS pole is held vertically under normal recording conditions, the main difference between the two frames is likely a horizontal rotation, i.e. a change in azimuth angle. Such a single rotation can be determined and compensated for efficiently using the raw images or detected feature points. After or during compensation of the azimuth change, optionally a compensation of the small change in the other two orientation angles can be performed in a similar way. Once the two frames are roughly aligned, a multitude of additional matches between the images can be found between the two frames by using a tracking algorithm such as KLT. The additional matches improve the connection between the two frames that are distant and time but not in position, i.e. loop closing. This stabilizes the algorithm and enhances the accuracy by further reducing drifts (also in rotation) for large datasets.

Loop-closing—according to the invention—is based on capturing a first series of images of the surrounding with the at least one camera, the first series comprising an amount of images captured with different poses of the cameras, the poses representing respective positions and orientations of the cameras. Furthermore, an initial set of image points is identified based on the first series of images, the initial image points representing reference points 62 of an initial reference point field 65 (FIG. 14), wherein each reference point appears in at least two images of the series of images, and the poses for the images are determined based on resection using the initial image points.

According to the invention, a second series of images of the surrounding is captured with the at least one camera, reference points of the reference point field 65 appearing in at least one of the images of the second series of images are identified, a further set of image points is identified in the images of the second series of images corresponding to the identified reference points 62 of the second series of images, and the poses for the images of the second series of images are determined based on resection using the initial set and the further set of image points.

Wheel on the Bottom of the Pole

The FIGS. 18 and 19a-d show two exemplary embodiments of a wheeled surveying system according to the invention that facilitate the surveying process for the user.

Figure 18:
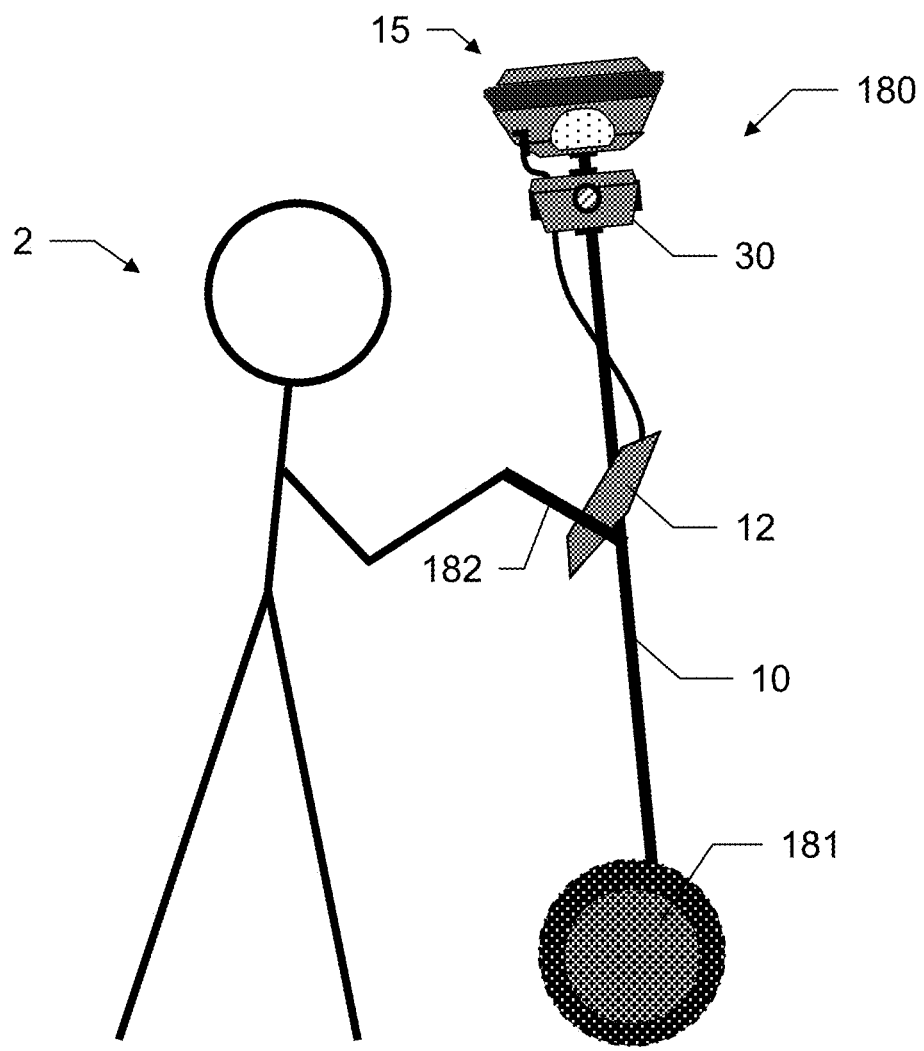
FIG. 18 shows a first exemplary embodiment of a wheeled surveying system.

The wheeled surveying system 180 depicted in FIG. 18 comprises a pole 10 comprising the features of the pole of FIG. 1. Additionally, the pole 10 comprises wheels 181 that allow the user 2 to move the pole 10 along a path through the surrounding without having to carry the pole 10. To facilitate the pushing (or pulling) of the pole 10, it is equipped with a handle 182 (or two handles).

Preferably, two wheels 181 are attached to the pole 10 in such a way that the bottom end of the pole touches the ground if the pole is vertical (i.e. in a 90° angle relative to the ground). Even more preferably, the pole 10 keeps this upright position autonomously. For moving the pole 10 it needs to be tilted (as shown in FIG. 18).

Alternatively, the bottom end of the pole 10 can be extendable in order to touch the ground.

Optionally, the wheels 181 can be actuated by a motor, particularly an electric motor. This motor e.g. can either be controlled by the user 2 by a control unit on the handle 182 or can act as a support drive for the pushing (or pulling) movements of the user 2.

The wheeled surveying system 190 depicted in FIGS. 19a-d comprises a two-wheeled, self-balancing motorized vehicle 195. This kind of vehicle is also widely known as "Segway personal transporter". The surveying system 190 comprises a pole 10 which is mounted on the vehicle 195. On the pole 10, as already described with respect to FIG. 1, a GNSS antenna 15 and a camera module 30 are provided. The surveying system 190 also comprises a control and evaluation unit 12.

Figure 19C:
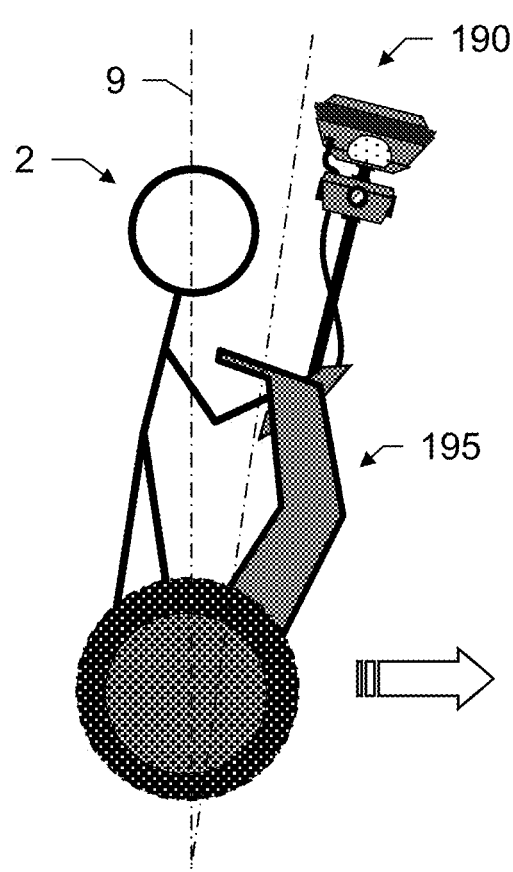
Figure 19D:
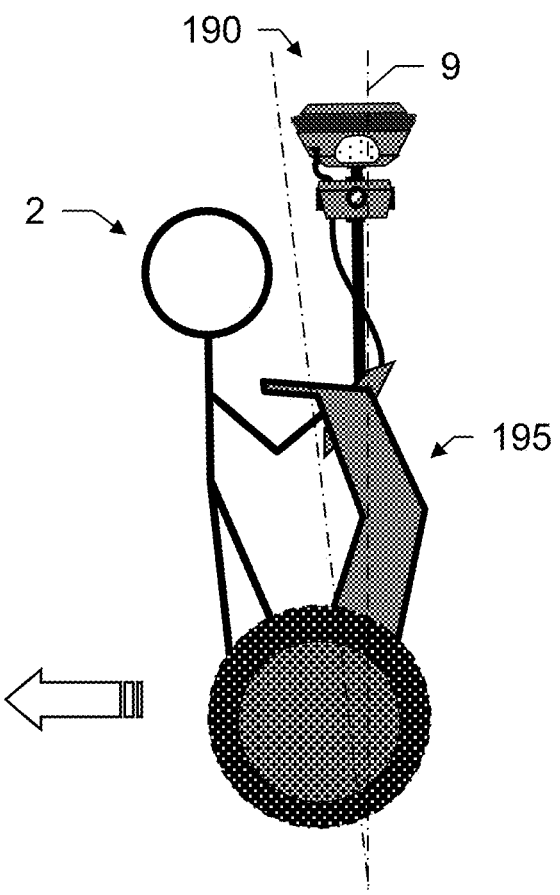

As known from similar vehicles, a motion of the vehicle 195 can be controlled by the user 2 as illustrated in FIGS. 19c and 19d: The depicted vehicle 195 is designed in such a way that the user 2 controls a forward and backward movement of the vehicle 195 by leaning the vehicle relative to a combined centre of gravity of user 2 and vehicle 195.

Optionally, the vehicle 195 can comprise measuring point marking means 192 that mark a spot on the ground as a present measuring point 5. Particularly, this spot can be an imaginary extension of the pole 10. The marking can be a laser spot or pattern which lasts only for the stay at the respective position and is intended as information for the user 2 of the surveying system 190 driving the vehicle 195. In particular, this enables the user 2 to measure exactly at predefined marked positions. Alternatively, the marking can be more durable, for instance a sprayed paint marking or a dropped flag. This allows repeating the measurements at a later point of time at the same positions.

Optionally, an IMU of the vehicle 195 can be used for determining orientations of the cameras of the camera module 30—either alternatively or additionally to an IMU of the camera module 30.

Figure 20:
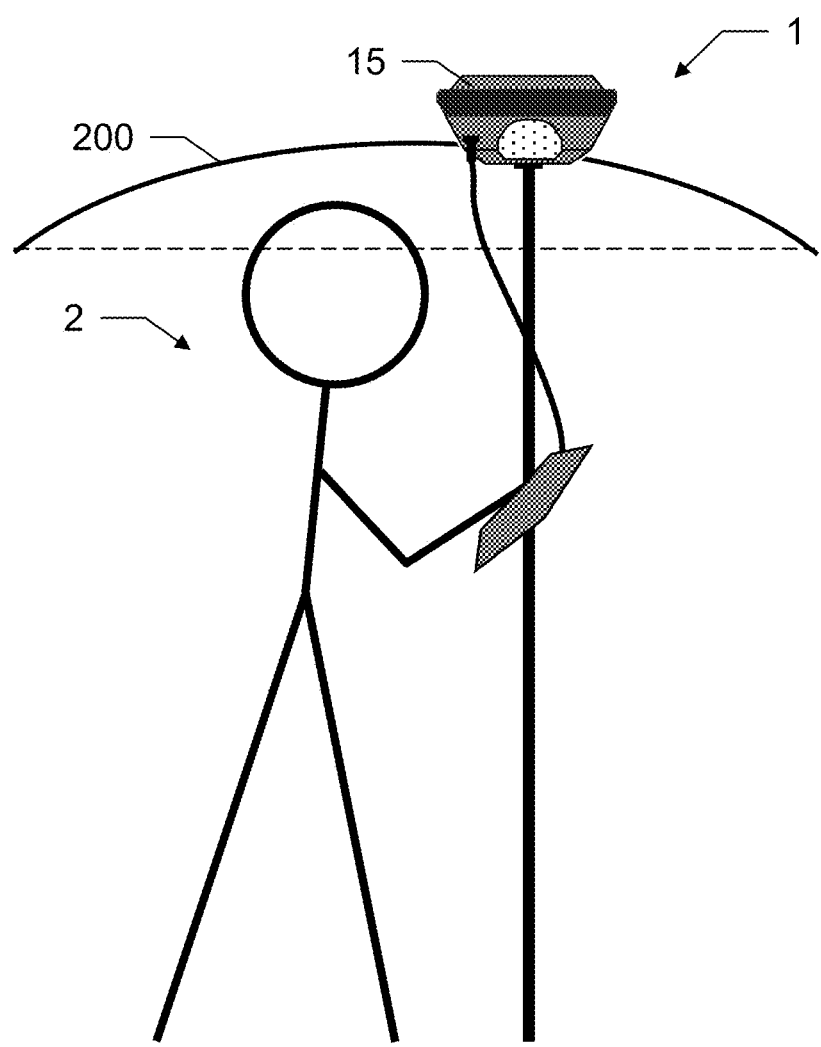
FIG. 20 shows a surveying system having a mounted umbrella.

As shown in FIG. 20, the pole 10 can be equipped with a rain and/or sun protection, e.g. an umbrella being mounted below or around the GNSS antenna 15. This does not only facilitate the working conditions for the user 2 but also protects the camera module 30 and other features of the respective surveying system 1,180,190 and improves the image quality in case of precipitation.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A surveying subsystem adapted to be used as part of a surveying system that is adapted to determine positions of a position measuring resource that is mounted on a surveying pole and includes a GNSS-antenna or a retro-reflector, wherein said surveying pole is hand-carried, the surveying subsystem comprising:
   a camera module configured to be attached to the surveying pole and having a camera and an optical element, the optical element being configured such that the camera has an angle of view of 360° in an azimuthal direction; and
   a control and evaluation unit having stored thereon a program with program code that, when executed, controls and executes a spatial representation generation functionality in which, when moving along a path through a surrounding:
      a first series of panoramic images of the surrounding is captured with the camera, the first series comprising an amount of panoramic images captured with different poses of the camera, the poses representing respective positions and orientations of the camera,
      a SLAM-evaluation with a defined algorithm using the series of panoramic images is performed, wherein a plurality of respectively corresponding image points are identified in each of several sub-groups of panoramic images of the series of panoramic images and, based on resection and forward intersection using the plurality of respectively corresponding image points,
      a reference point field is built up comprising a plurality of reference points of the surrounding, wherein coordinates of the reference points are derived, and
      the poses for the panoramic images are determined,
   wherein a position and orientation of at least one of the surveying subsystem or the camera in six degrees of freedom are derived based on one or more of the determined poses and based on a multitude of determined positions of the position measuring resource.

2. The surveying subsystem according to claim 1, wherein:
   the control and evaluation unit is configured so that the spatial representation generation functionality is controlled and executed in such a way, that the reference point field forms a sparse point cloud that serves for determination of the poses of the camera/s and thus expressly for localisation purposes and,
   based on the determined poses, a dense point cloud that includes 3D-positions of points of the surrounding is computed by forward intersection using the images of the first series of images and images of a second series of images.

3. The surveying subsystem according to claim 2, wherein,
the control and evaluation unit is configured so that the spatial representation generation functionality is controlled and executed in such a way, that:
determined positions of the position measuring resource for points that have been adopted on the path are received by the control and evaluation unit from the surveying system; and
the dense point cloud is scaled, and particularly geo-referenced, with help of the received determined positions.

4. The surveying subsystem according to claim 2, wherein,
the control and evaluation unit is configured so that the spatial representation generation functionality is controlled and executed in such a way, that a graphical reproduction is generated for the dense point cloud, the graphical reproduction being displayable by display means of the surveying system.

5. The surveying subsystem according to any claim 1, wherein,
the position measuring resource comprises a GNSS-antenna or a retro-reflector.

6. The surveying subsystem according to any one of claim 1, wherein,
orientations of at least one camera in six degrees of freedom are derived based on:
one or more of the determined poses; and
data from an inertial measuring unit of the camera module.

7. A surveying system comprising:
a hand-carried surveying pole,
a position measuring resource being mounted on the surveying pole, wherein positions of the position measuring resource are determinable by the surveying system, and
a surveying subsystem according to claim 1.

8. The surveying system according to claim 7, wherein, the position measuring resource comprises a GNSS-antenna or a retro-reflector.

9. The surveying subsystem according to claim 1, wherein, the optical element comprises a mirroring surface in form of a cone, a sphere or a curvature.

10. The surveying subsystem according to claim 1, wherein, the camera and the optical element are arranged and designed so that a surrounding to be captured is projected onto a sensor of the camera so that an image of the surrounding is provided with substantially identically sized pieces of the image covering substantially identically sized parts of the surrounding, thus providing for an image representing the captured surrounding in homogenous reproduction.

11. A surveying subsystem adapted to be used as part of a surveying system that is adapted to determine positions of a position measuring resource that is mounted on a surveying pole and includes a GNSS-antenna or a retro-reflector, wherein said surveying pole is hand-carried, the surveying subsystem comprising:
a camera module configured to be attached to the surveying pole and having a camera and an optical element, the optical element being configured such that the camera has an angle of view of 360° in an azimuthal direction; and
a control and evaluation unit having stored thereon a program with program code that, when executed, controls and executes a spatial representation generation functionality in which, when moving along a path through a surrounding:
a first series of panoramic images of the surrounding is captured with the camera, the first series comprising an amount of panoramic images captured with different poses of the camera, the poses representing respective positions and orientations of the camera,
a SLAM-evaluation with a defined algorithm using the series of panoramic images is performed, wherein a plurality of respectively corresponding image points are identified in each of several sub-groups of panoramic images of the series of panoramic images and, based on resection and forward intersection using the plurality of respectively corresponding image points,
a reference point field is built up comprising a plurality of reference points of the surrounding, wherein coordinates of the reference points are derived, and
the poses for the panoramic images are determined,
wherein a position and orientation of at least one of the surveying subsystem or the camera in six degrees of freedom are derived based on one or more of the determined poses and based on a traveling history for the moved path.

12. The surveying subsystem according to claim 11, wherein, the optical element comprises a mirroring surface in form of a cone, a sphere or a curvature.

13. The surveying subsystem according to claim 11, wherein, the camera and the optical element are arranged and designed so that a surrounding to be captured is projected onto a sensor of the camera so that an image of the surrounding is provided with substantially identically sized pieces of the image covering substantially identically sized parts of the surrounding, thus providing for an image representing the captured surrounding in homogenous reproduction.

14. The surveying subsystem according to claim 11, wherein:
the control and evaluation unit is configured so that the spatial representation generation functionality is controlled and executed in such a way, that the reference point field forms a sparse point cloud that serves for determination of the poses of the camera/s and thus expressly for localisation purposes and,
based on the determined poses, a dense point cloud that includes 3D-positions of points of the surrounding is computed by forward intersection using the images of the first series of images and images of a second series of images.

15. The surveying subsystem according to claim 14, wherein,
the control and evaluation unit is configured so that the spatial representation generation functionality is controlled and executed in such a way, that:
determined positions of the position measuring resource for points that have been adopted on the path are received by the control and evaluation unit from the surveying system; and
the dense point cloud is scaled, and particularly geo-referenced, with help of the received determined positions.

16. The surveying subsystem according to claim 14, wherein,
the control and evaluation unit is configured so that the spatial representation generation functionality is controlled and executed in such a way, that a graphical reproduction is generated for the dense point cloud, the graphical reproduction being displayable by display means of the surveying system.

17. The surveying subsystem according to any claim 11, wherein,
the position measuring resource comprises a GNSS-antenna or a retro-reflector.

18. The surveying subsystem according to any one of claim 11, wherein,
orientations of at least one camera in six degrees of freedom are derived based on:
one or more of the determined poses; and
data from an inertial measuring unit of the camera module.

19. A surveying system comprising:
a hand-carried surveying pole,
a position measuring resource being mounted on the surveying pole, wherein positions of the position measuring resource are determinable by the surveying system, and
a surveying subsystem according to claim 11.

20. The surveying system according to claim 19, wherein,
the position measuring resource comprises a GNSS-antenna or a retro-reflector.

* * * * *